United States Patent [19]

Richman

[11] 4,183,051

[45] Jan. 8, 1980

[54] COLOR TELEVISION RECEIVING SYSTEM UTILIZING MULTIMODE INFERRED HIGHS CORRECTION TO REDUCE COLOR INFIDELITIES

[75] Inventor: Donald Richman, Huntington, N.Y.

[73] Assignee: Quadricolor Technology L.P., Great Neck, N.Y.

[21] Appl. No.: 812,422

[22] Filed: Jul. 1, 1977

[51] Int. Cl.² .......................... H04N 5/21; H04N 5/14
[52] U.S. Cl. .......................................... 358/36; 358/37
[58] Field of Search ..................................... 358/36, 37

[56] References Cited

U.S. PATENT DOCUMENTS

| | | | |
|---|---|---|---|
| 2,905,753 | 9/1959 | Loughlin | 358/36 X |
| 3,778,543 | 12/1973 | Lowry | 358/36 X |
| 3,836,707 | 9/1974 | Marakami et al. | 358/36 X |
| 3,984,865 | 10/1976 | Avias | 358/36 |

Primary Examiner—Robert L. Griffin
Assistant Examiner—Aristotelis M. Psitos
Attorney, Agent, or Firm—Pennie & Edmonds

[57] ABSTRACT

A color television receiving system for NTSC-type signals is provided with signal processing circuitry and methods for reducing the visibility of color and luminance infidelities, such as incorrect or inverted highs, over-modulation and rectification which are visible in regions of sharp transitions from one color to another or in regions of concurrent high color saturation and significant high frequency detail. Such infidelities are substantially reduced by effectively supplementing either the chrominance or the primary color signals with inferred high-frequency chrominance components derived from signal information discovered to be inherently available in NTSC-type signals and their implicit constraints. Specifically, in one form of the invention it has been found that in regions of sharp color transitions and in regions of high color saturation, relevant high frequency chrominance components can be scaled from the high frequency portion of the received monochrome signals in accordance with different respective scaling algorithms. A receiving system is provided with multimode inferred highs correction circuitry responsive to a received NTSC-type signal for automatically deciding which, if any, correction modes are appropriate for a given time and frequency region of the received signal and automatically enabling correction circuitry for providing the appropriate inferred high frequency correction signals.

194 Claims, 38 Drawing Figures

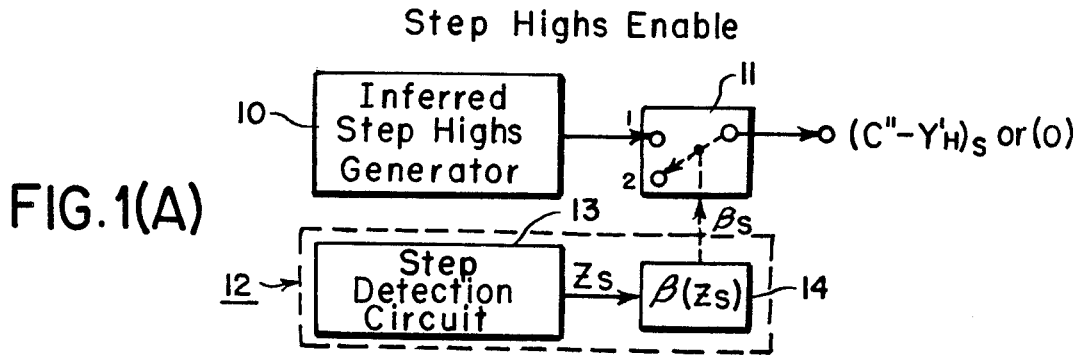
FIG.1(A) Step Highs Enable
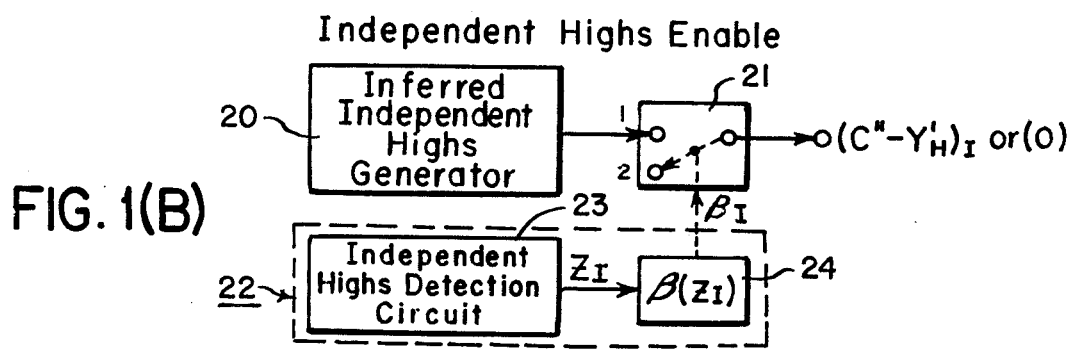
FIG.1(B) Independent Highs Enable
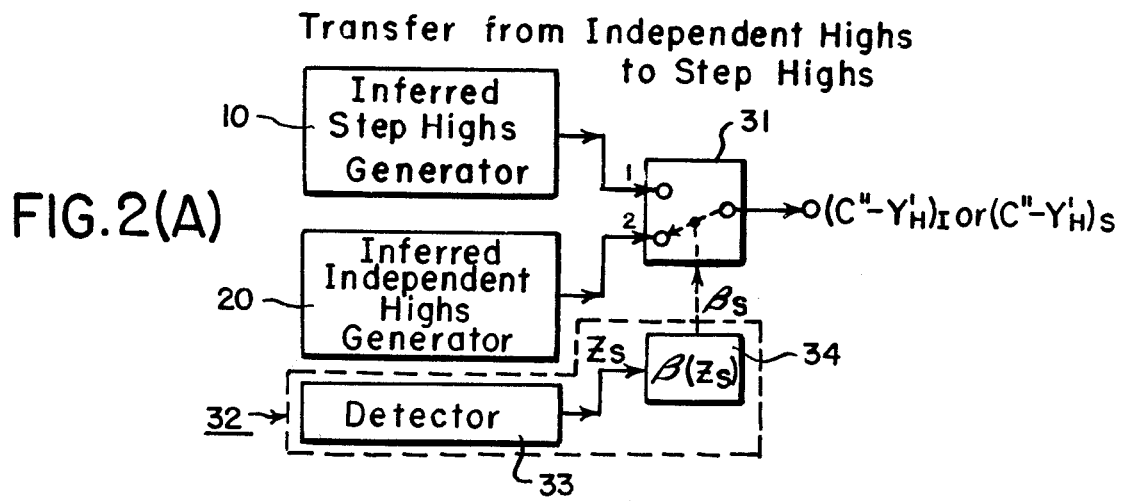
FIG.2(A) Transfer from Independent Highs to Step Highs
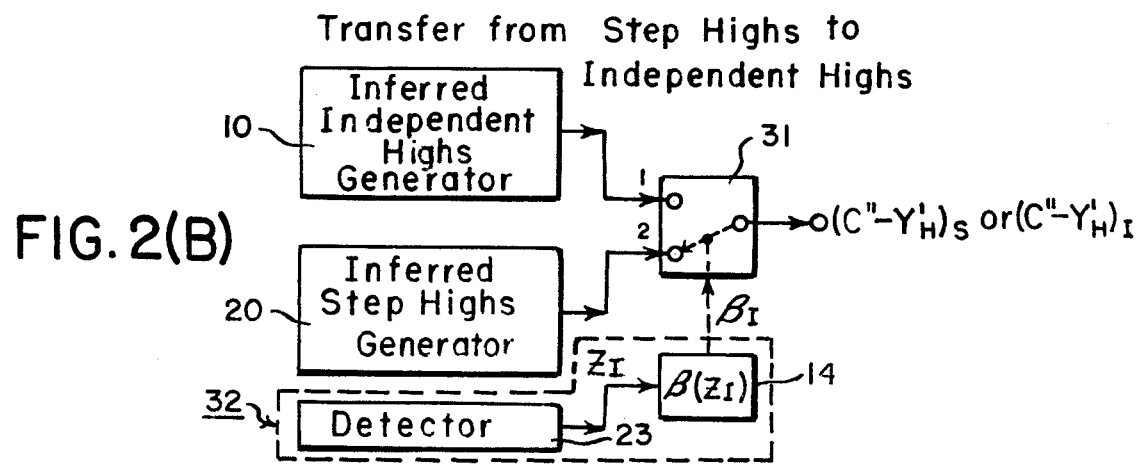
FIG.2(B) Transfer from Step Highs to Independent Highs

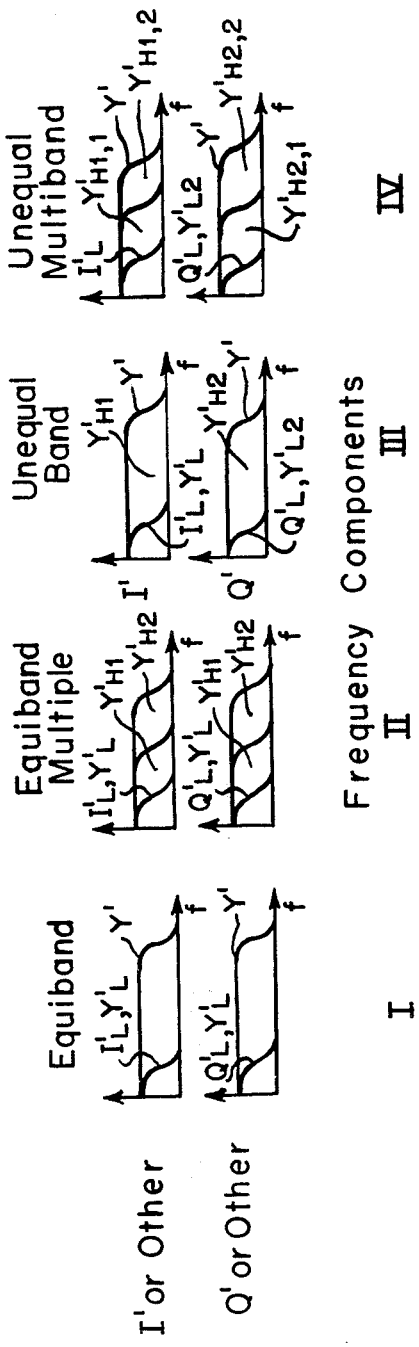
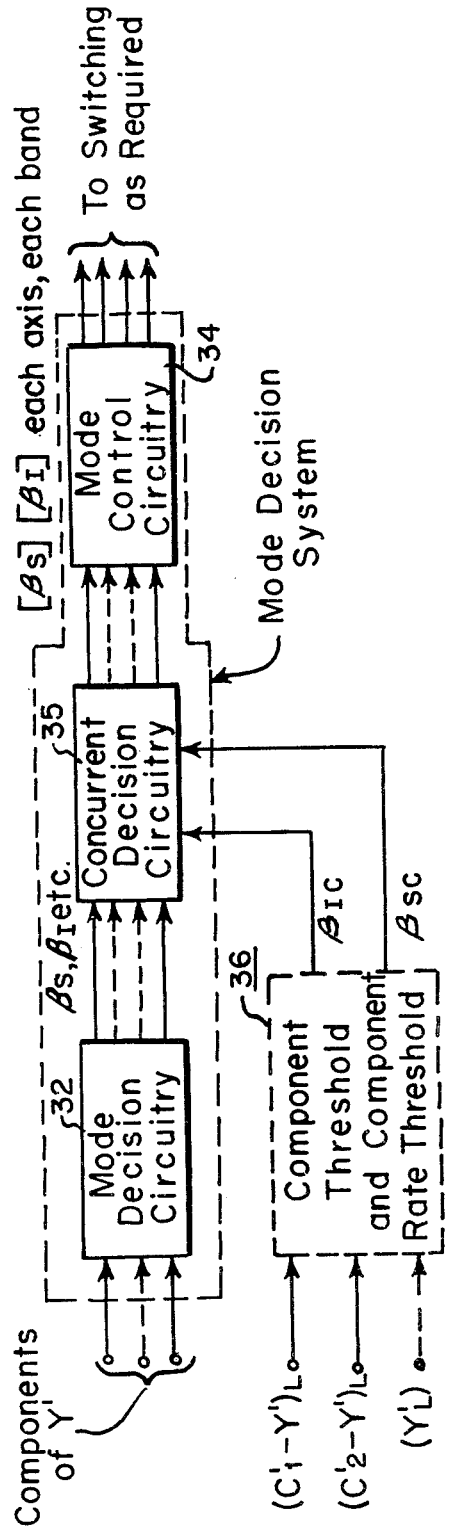

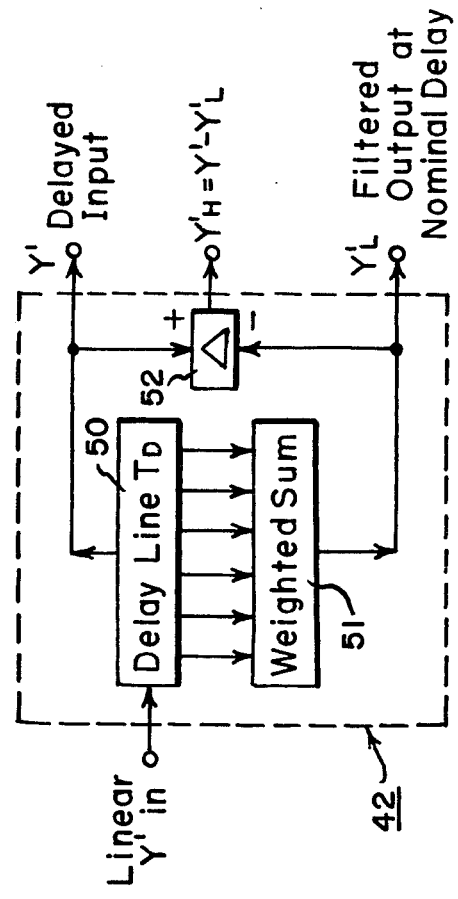
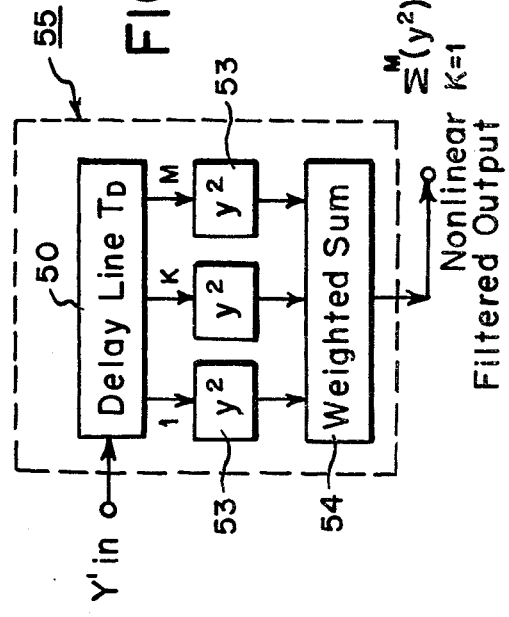
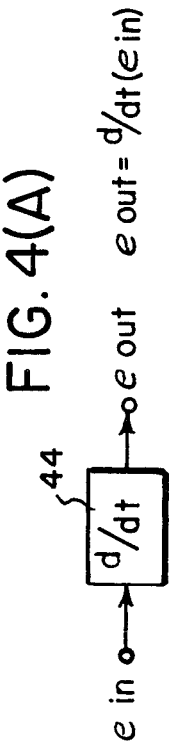

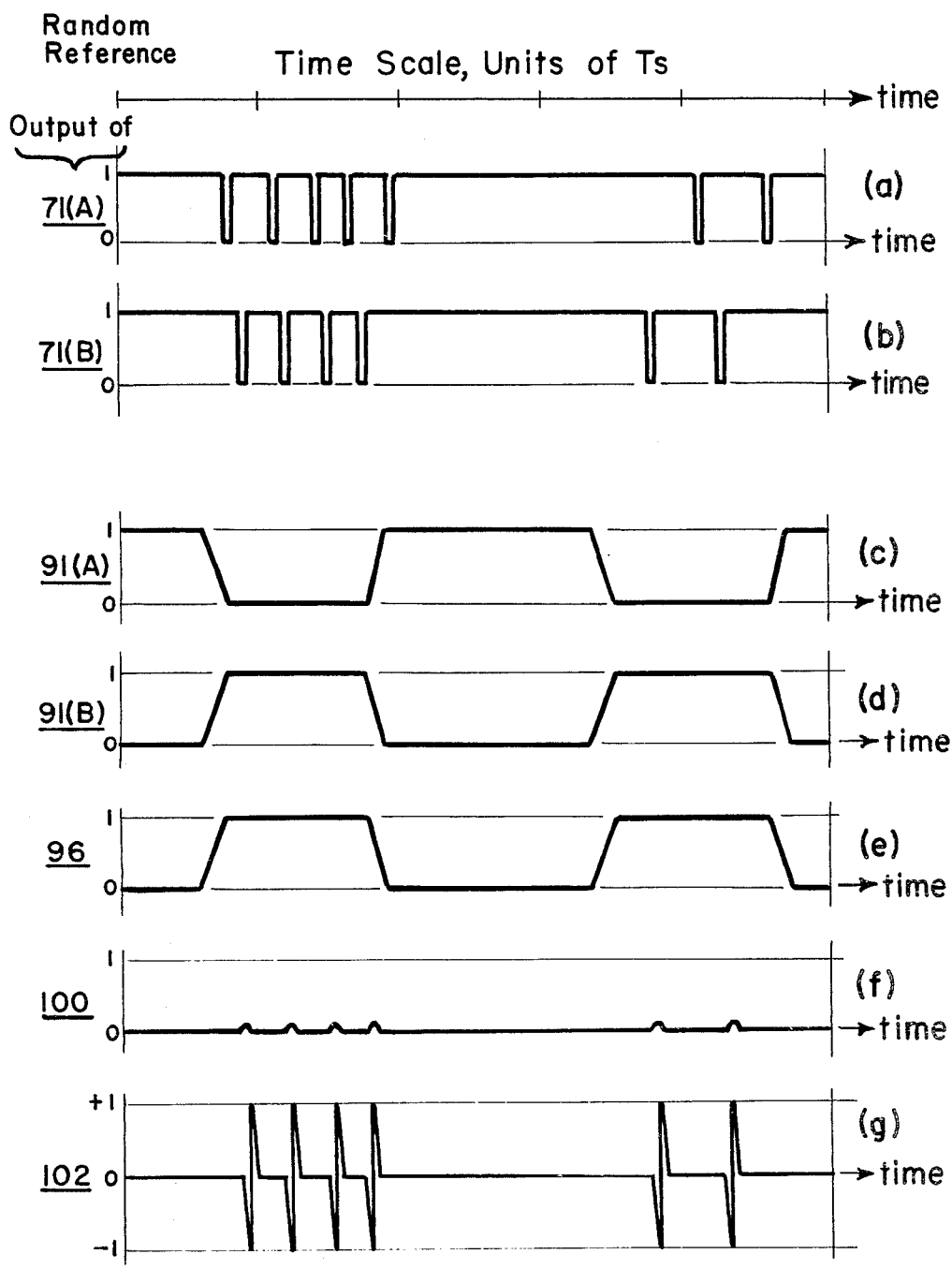

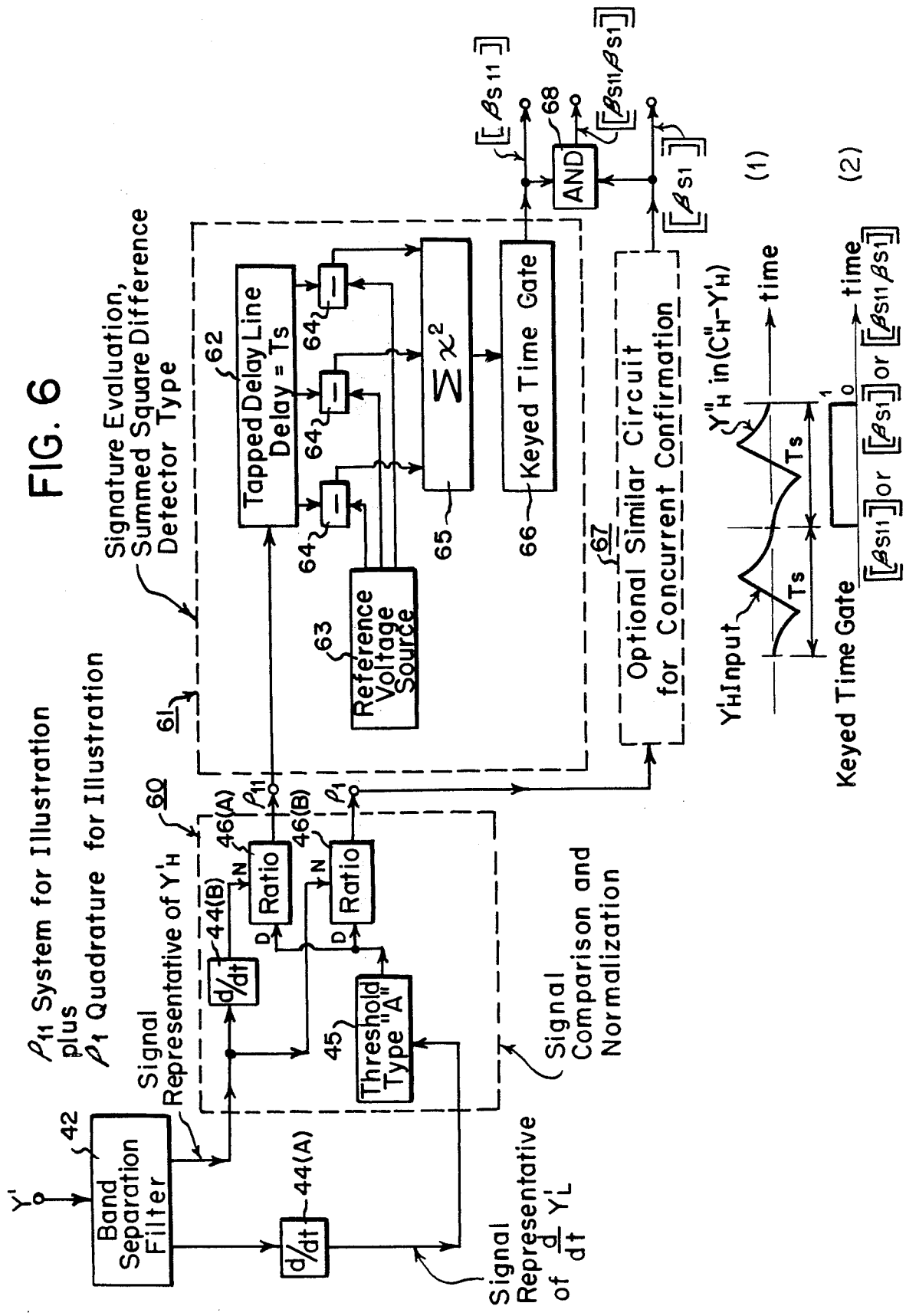

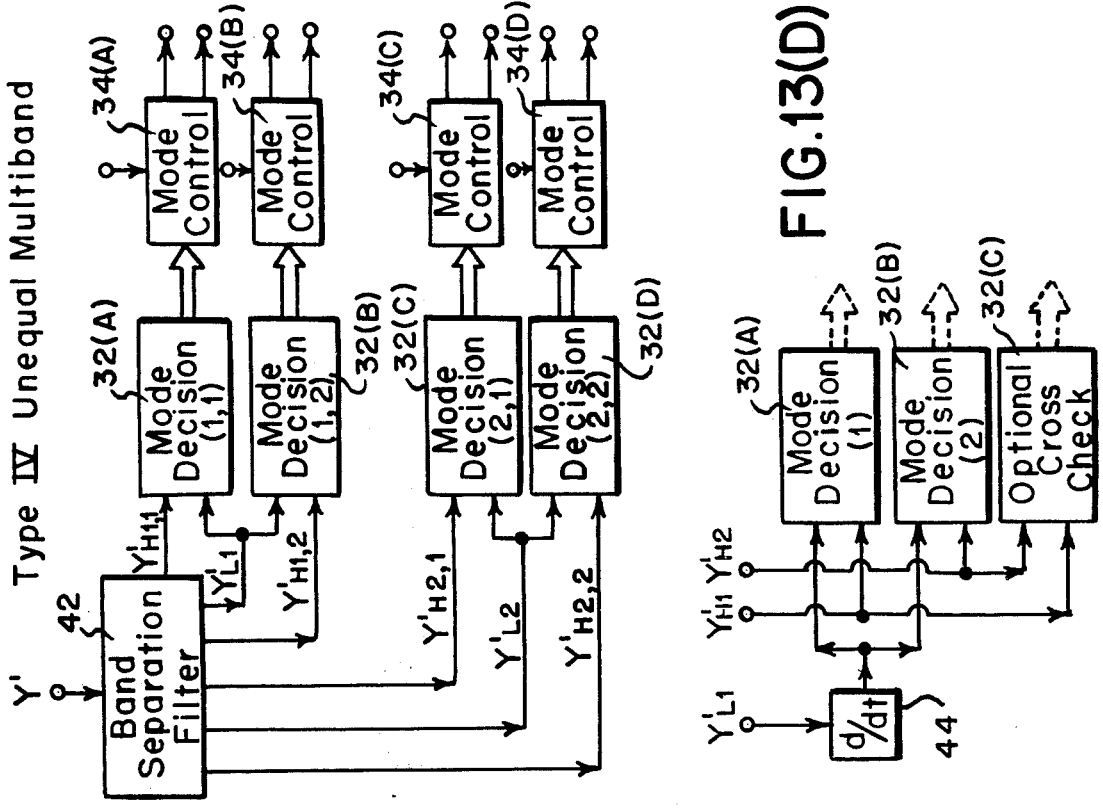
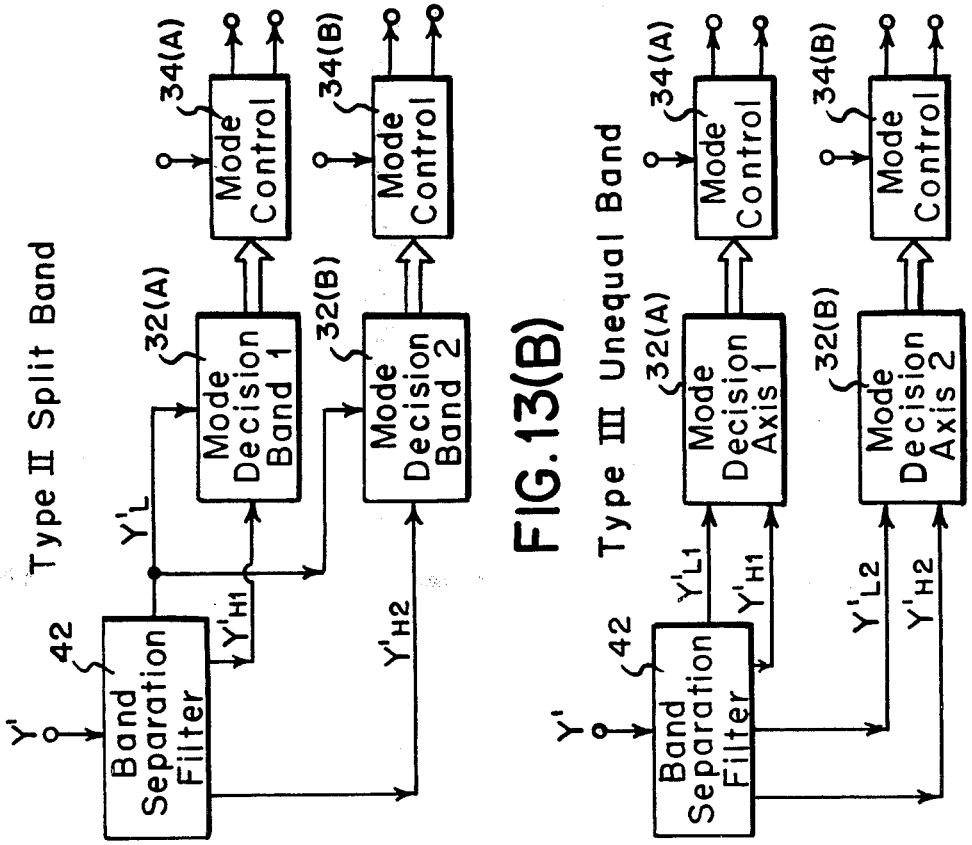

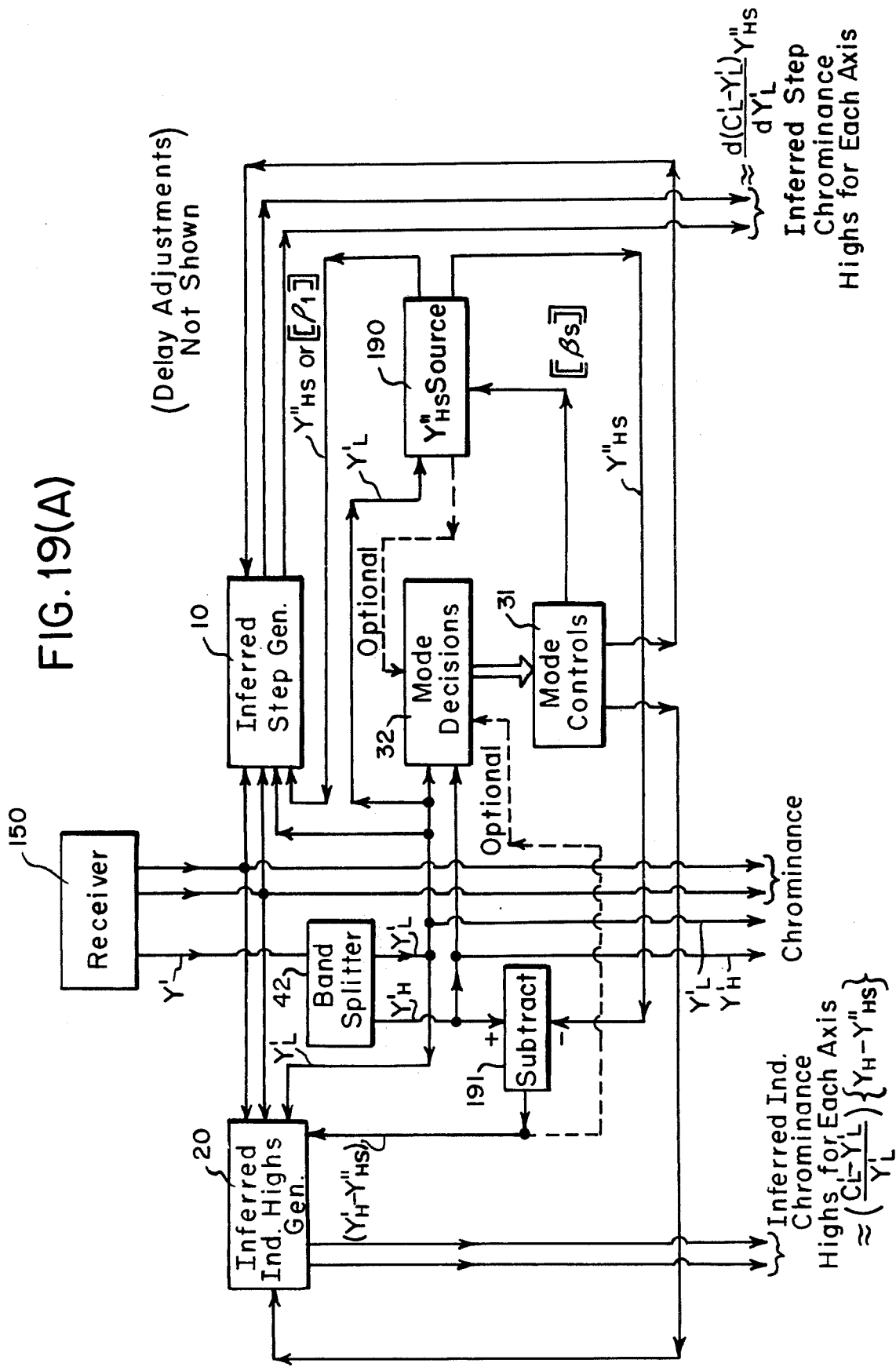

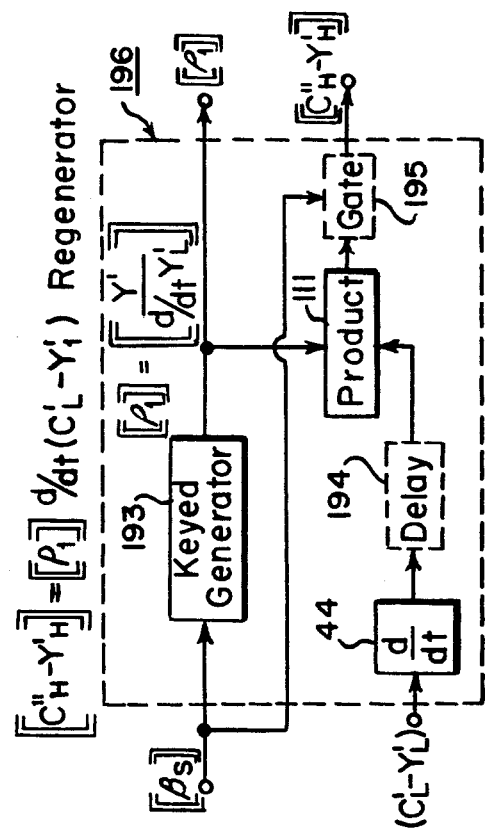
FIG. 19(C)
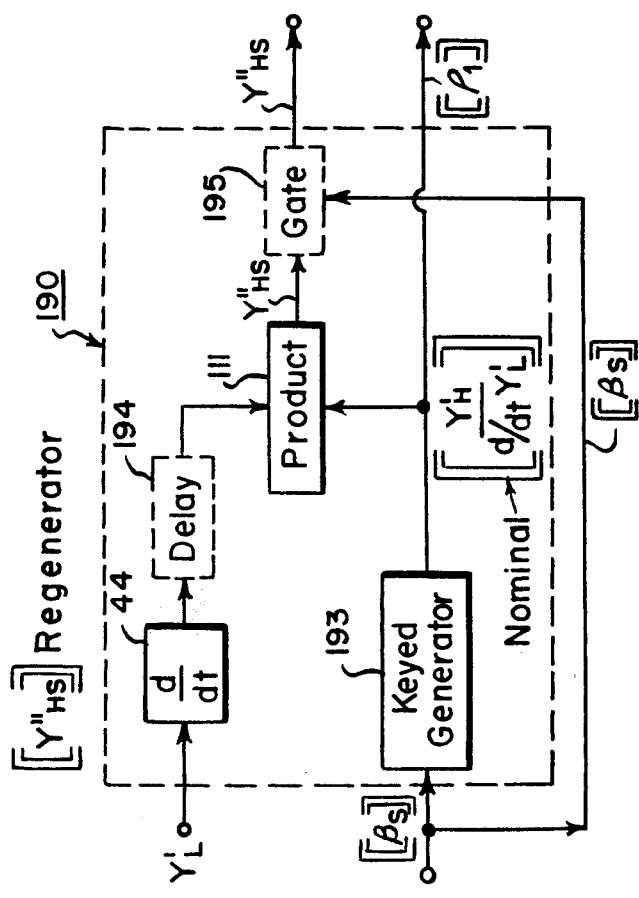
FIG. 19(B)
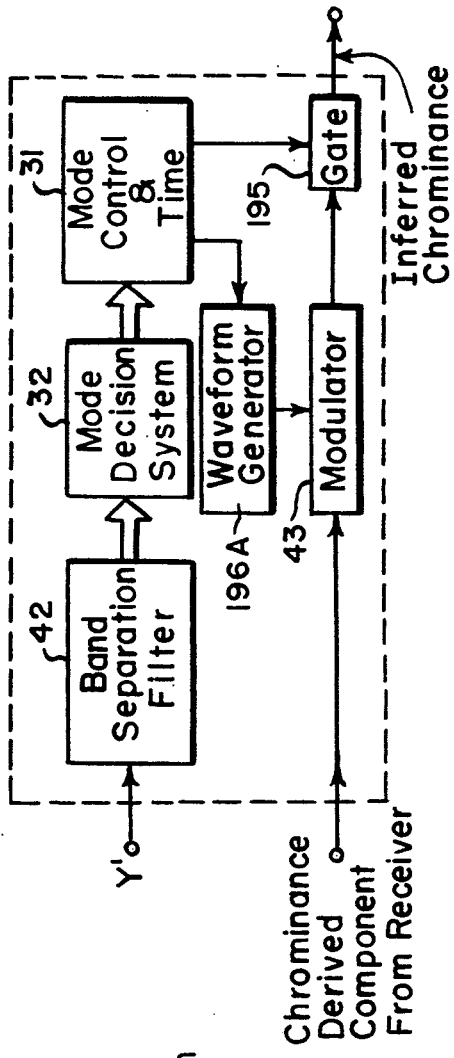
FIG. 19(D)
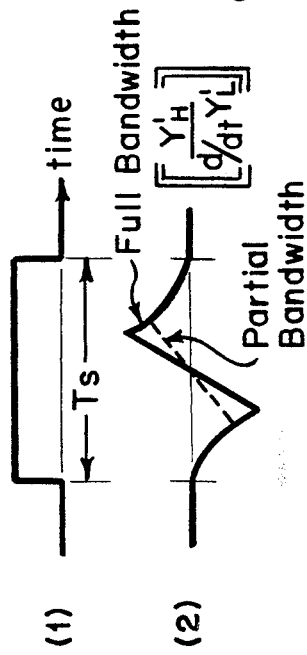

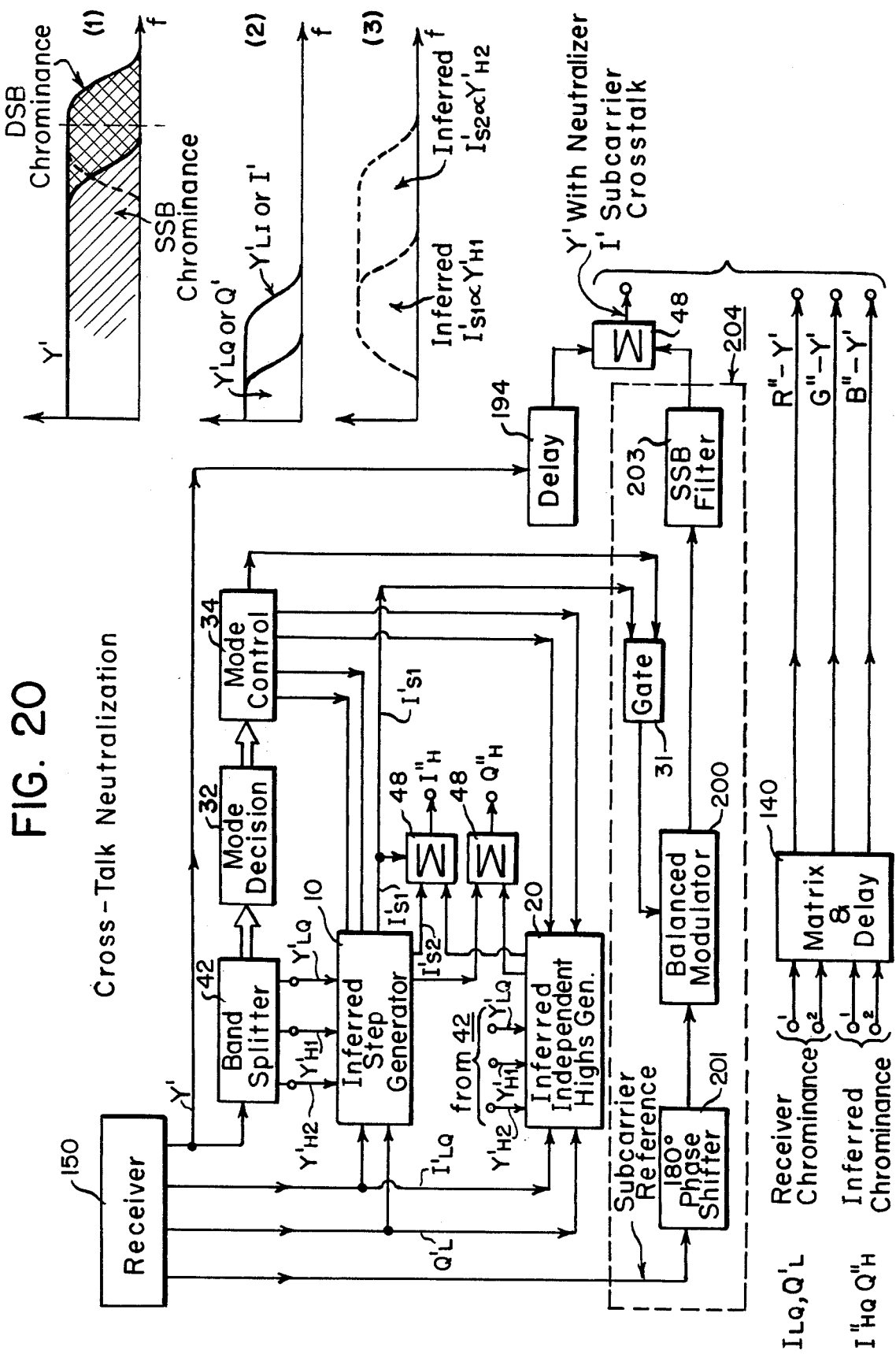

COLOR TELEVISION RECEIVING SYSTEM UTILIZING MULTIMODE INFERRED HIGHS CORRECTION TO REDUCE COLOR INFIDELITIES

BACKGROUND OF THE INVENTION

Color television transmission systems used throughout the world are based on or derived from signal specifications originally defined in the United States by the National Television Systems Committee (NTSC). Such systems, which will be referred to herein as NTSC-type systems, include the NTSC format system used in the United States and the well-known PAL and SECAM systems used abroad. These systems utilize composite color television signals comprising a wide band monochrome signal and a plurality of chrominance signals (sometimes referred to as color difference signals).

The wideband monochrome signal, generally represented by the term $Y'$, is typically a combination of three primary color signals, e.g., red, blue, and green, which have been precorrected for the power law gamma characteristic of typical display tubes. The presence of pre-correction in the constituents of a signal is conventionally indicated by designating the signal with a prime ('). The monochrome signal is typically of the form $Y' = \Sigma A_c C' = A_r R' + A_g G' + A_b B'$, wherein $C'$ represents any gamma-corrected primary color signal, $A_c$, $A_r$, $A_g$ and $A_b$ represent respective nominal relative luminance coeffiencts for primaries, and $R'$, $G'$, and $B'$ represent the gamma-corrected color signals for primaries of red, green, and blue, respectively. The monochrome signal $Y'$, as defined herein, should not be confused with the colorimetric luminance $Y$ which is a corresponding combination of the uncorrected primary signals, nor should it be considered equal to a gamma-corrected luminance signal because in the monochrome signal, it is the individual primaries which have been corrected, not the entire combination, i.e., $Y' = \Sigma A_c C'$ is *not uniquely related to $Y = \Sigma A_c C$ for typical gamma correction exponents.*

The chrominance signals in NTSC-type systems typically comprise signals representing the difference between a gamma-corrected primary color signal and the monochrome signal or a linear combination of such color difference signals. Specifically, color difference signals can be generally represented by the term $(C' - Y')_L$ wherein $C'$ represents any gamma-corrected primary. The subscript $L$ serves as a reminder that the chrominance signals are typically transmitted with a bandwidth which is relatively reduced as compared with the $Y'$ signal and that it may be further bandwidth reduced at the receiver Typical NTSC-type transmission systems are designed to transmit $Y'$ in its full wide bandwidth and linear combinations of the chrominance signals in reduced bandwidth. In the United States, for example $(R'-Y')$, $(B'-Y')$, and hence $(G'-Y')$ are transmitted in linear combination chrominance signals designated the $I'$ chrominance signal and the $Q'$ chrominance signal. The linear combination chrominance signal is measures on a particular phase of the chrominance subcarrier known as a chrominance axis. Hence, for example, the $I'$ and $Q'$ signals define separate chrominance axes. While the $I'$ and $Q'$ signals have somewhat different bandwidths, each substantially narrower than that of the $Y'$ signals, the excess portion of the relatively wider bandwidth $I'$ signal is often lost at the receivers, most of which are designed for equiband operation.

Conventional receivers use either equiband chrominance for all axes, or use in varying degrees the added intermediate bandwidth $I'$ signal transmitted as a single-sideband component.

Some receivers use simplified approximations to the nominal $I'$ passbands, while other receivers use wideband equiband systems. In order to shorten the chrominance transient epoch, these receivers accept erroneous chrominance components nominally from the single-sideband $I'$ components, and they variously proportion these erroneous components between the $I'$ and $Q'$ channels.

This specification will present the equations and circuit means relative to the substantial chrominance improvements of this invention, first for processing of equal band signals and then also for processing of $I'$ and $Q'$ chrominance signals of unequal bandwidths.

Common NTSC-type receivers demodulate and matrix the received chrominance signals into a plurality of reduced bandwidth chrominance signals $(C' - Y')_L$. The receiver then effectively adds the monochrome signal $Y'$ to each chrominance signal in order to derive a plurality of signals which include, respectively the low frequency components $C_L'$ of the primary color signals generated at the color camera and a combined high frequency component. The low frequency primary color components are sometimes referred to as the large area color signals. The high frequency monochrome components, $Y_H'$ is generally referred to as the mixed highs signal because it is transmitted and displayed only as a specific combination of the high frequency primary color components.

It has long been recognized that conventional NTSC-type receiving systems exhibit a number of visible color infidelities upon display, particularly in regions of sharp transitions from one color to another or, within a single color, in transitions from one luminance to another. When conventional NTSC-type receiver displays are compared against a reference display in which all of the primary color signals have a wide bandwidth comparable to that of $Y'$, visible color infidelities, such as incorrect highs, polarity reversals, and errors in visual luminance can be observed in regions of sharp color transitions. These infidelities are clearly visible on modern displays as resolution and luminance errors, chromaticity smear, local desaturation, and luminance notches.

In step transients within a single primary color, the highs can be too small relative to the lows.

In step transients involving more than one primary, the highs can be of incorrect amplitude to accurately reproduce even a single colorimetric coordinate such as the luminance, $Y$. Furthermore, because of the change in luminance, $\Delta Y$ is $\Sigma A_c \Delta C$ whereas $\Delta Y'$ is $\Sigma A_c \Delta C'$, the high frequency components of $Y'$ are sometimes of such polarity that the reproduced visual luminance $Y$ on a step has upside-down highs. This infidelity occurs on any step wherein $\Delta Y'$ is of one polarity and $\Delta Y$ is of the other.

In step transients from a first primary in one region to a second primary in a horizontally contiguous region, with the third primary small or absent, a conventional color television display will exhibit in the high frequency portion of the step: (1) amplitude errors in the high frequency portion of each primary; (2) reversed polarity in the high frequency component of one primary; and (3) possible rectified high frequency components in another primary, producing desaturation and spurious low frequency components therein.

And in transitions between any substantially saturated color and another color which is substantially its colorimetric complement, there appear spurious observable dark regions commonly known as luminance notches.

In regions of significant color saturation, a conventional color television display will typically exhibit: (1) a loss in detail due to inadequate high frequency components in the one or more strong primary colors and (2) over-modulation and rectification due to an excess of high frequency signal components in the one or more weak primary colors. The simplest example is that of a single saturated primary. In such case, the transmitted high frequency signal available for that primary solely from the high frequency signal $Y'$ is too small, while the same $Y'$ signal components are excessive in the other primary colors. More generally, similar infidelities generally occur and tend to be visible whenever the local color deviates significantly from white. Such infidelities are clearly visible on modern color television displays as resolution and luminance errors, chromaticity errors, and sometimes as spurious low frequency errors and local desaturation.

In common television pictures conventionally reproduced colorimetric errors of the types cited may concurrently occur differently in different parts of the frequency spectrum and also at different points in the picture.

In conventional receivers which receive at least monochrome $Y'$ portions of the transmitted signal, when color steps occur which include transmitted single sideband $I'$ components, the transmitted single sideband $I'$ components extend down significantly into the spectral region from which the $Y'$ signal is extracted for picture reproduction and may therefore be rendered visible by rectification and by the presence of noticeable patterns. This color infidelity is particularly visible on extended, near vertical edges. Use of multiline signal combination techniques tends to shift the interference to other patterns such as edges of different slope, or to produce patterns at subharmonics of field rates.

While there has been a widespread recognition that the conventional reception and display of NTSC-type signals produce the above-described color infidelities, none of the receiver correct circuits proposed in the prior art have provided satisfactory results. Typical prior art proposals for reducing such distortions have allocated the largest portion of the fault to the use of a $Y'$ signal on transmission instead of a true luminance measure, such as a gamma-corrected Y signal. Accordingly, these proposals have included the proposal to change the transmitted signal from $Y'$ to Y to the inverse-gamma power and various other proposals to otherwise precorrect the transmitted monochrome signal. All such proposals have gone unaccepted in the industry because (1) they typically failed to provide adequate color correction; (2) they typically degraded image quality in other respects; and (3) they were, in many cases, unduly complex.

The specific problem of inadequate highs has been treated, but the proposed solutions have deteriorated the image quality in other respects. For example, some prior art receivers utilized enhanced gain in the common mixed-high region of the monochrome signal. This approach, however, cannot provide polarity corrections; cannot provide the differential relative amplitudes needed in the individual primary colors; and degrades the display image by producing increased rectification and desaturation. It has also been proposed to modulate the common mixed highs by the ratio of the square of an estimated gamma-corrected luminance to the square of $Y'$. This proposal, also, fails to provide polarity correction and differential relative amplitudes, and it would introduce a major increase in rectification and desaturation as well as generate spurious high frequency signals.

SUMMARY OF THE INVENTION

In accordance with the present invention, a color television receiving system for NTSC-type signals is provided with signals processing circuitry and methods for reducing the visibility of color infidelities, such as incorrect highs, over-modulation and rectification and desaturation, which are visible in regions of sharp color transitions and in regions of high color saturation containing high frequency detail. Such infidelities are substantially reduced by effectively supplementing either the chrominance or the primary color signals with inferred high-frequency chrominance components or color components, respectively, derived from signal information discovered to be inherently availble in NTSC-type signals and their implicit constraints. Specifically, it has been found that in regions of sharp color transitions and in regions of high color saturation, high frequency chrominance components can be scaled from the high frequency portion of the received monochrome signals in accordance with different respective scaling algorithms. A receiving system is provided with multimode inferred highs correction circuitry responsive to a received NTSC-type signal for automatically deciding which, if any, correction modes are appropriate for a given time and frequency region of the received signal and for automatically enabling correction circuitry for providing the appropriate inferred high frequency correction signals.

The crosstalk of transmitted single sideband color components into normally displayed regions of the $Y'$ channel is suppressed by the the use of inferred components derived from the inferred $I'$ components on step transients to effectively neutralize the transmitted crosstalk.

Cross color, that is, crosstalk of $Y'$ into chrominance, is reducible in receivers within the scope of the present invention by using narrower chrominance passbands and using inferred chrominance components in accordance with teaching herein to enhance resolution in color and to shorten transient epochs.

UNDERLYING PRINCIPLES AND BASIC FEATURES OF THE INVENTION

A. The Principle of Inferentially De-Mixed Highs

Contrary to prior art thinking regarding the problem of correcting the above-described color infidelities, I have concluded that the use of the monochrome video signal $Y'$ is fully acceptable and that these color infidelities are caused not by the form of the $Y'$ signal but rather by the major reduction in the bandwidth of the chrominance signals at the transmitter and, to a lesser extent, by the further minor reduction at conventional equiband receivers. I have discovered that, under certain conditions and subject to the application of certain concepts, inferred high frequency chrominance components can be derived from NTSC-type signals for supplementing the reduced bandwidth chrominance or low frequency primary color signals and thereby substantially reducing the visibility of these infidelities. Such inferred components may be generated in the form of either inferred high frequency chrominance components, designated ($C_H''-Y_H'$), or corresponding inferred high frequency color components $C_H''$ may be directly generated. Effective addition of such chrominance components to either the chrominance or the color channels, or comparably, therefore "de-mixes" the highs to produce net highs $R_H''$, $G_H''$ and $B_H''$ normally different in each color in highly colored regions of the picture.

This solution to the problem of correcting the subject color infidelities has the major advantage that it is able to utilize present transmitted signals with no requirements for change and may be readily incorporated into the design of television receivers. Accordingly, it is highly compatible with existing systems and apparatus.

It is a feature of the invention that for important portions of NTSC-type signals locally appropriate inferred de-mixed high frequency components are provided which maintain fidelity to the received video signal Y', i.e., $\Sigma A_c (C_H''-Y_H')=0$. This feature is significant because of the transmitted signal components, only Y' provides a full wideband representations of the primary color signals. This fact may be seen by reference to a non-linear color space defined by Y', R'−Y' and B'−Y' measured repectively along theee orthogonal axes. In such a space, the primary colors R', G', and B' each represent specific directions and each has a positive projection on the Y' axis. And because only Y' is transmitted with full bandwidth, it is the only transmitted component which provides a true measure of the primary color signals over the full wide bandwidth. Fidelity to the received Y' signal is a necessary condition for fidelity to the primary color signals normally producible only at the camera.

It is a further feature of the invention that for important portions of NTSC-type signals inferred de-mixed highs are provided which are of such polarity and magnitude as to render the color infidelities described above substantially less visible. Specifically, the inferred de-mixed highs substantially reduce the difference between (1) the R', G' and B' signals normally produced at the receiver and (2) the wideband R', G' and B'to signals normally available only at the color camera or transmitter.

It is a principal feature of this invention that the signal components deleted by the mixed highs signal composition and which may be further deleted in equiband signal processing by suppression of the single sideband I' component, need not remain deleted at the display. Provided proper and specific signal constraints, methods and circuit means are recognized and utilized, inferred high frequency chrominance components can be derived and differentially combined to effectively de-mix the highs so as to effectively reduce visible color infidelities specifically including those discussed above.

In a concept of this invention, the bandwidth limitations of NTSC-derived color systems result from the omission of the high frequency components in the two chrominance channels, i.e., (R'−Y')$_H$ and (B'−Y')$_H$ or $I_H'$ and $Q_H'$, for example. In a conventional receiver, only the low frequency color coordinates are translated for gamma correction and display. The receiver coordinates may be generally represented as $C_R'=(C'-Y')_L+Y_L'+Y_H'=C_L'+Y_H'$ whereas the originating transmitter color coordinates may be generally represented by $C_T'=(C'-Y')+Y_L'+Y_H'=C_L'+C_H'$. It will be recognized that the signal information that is lost in the conventional transmission and equal or unequal bandwidth reception of NTSC signals is entirely in the high frequency chrominance. If the missing chrominance components (C'−Y')$_H$ could be largely restored at the receiver, the image deficiencies now observed on color receivers using shunted monochrome mixed highs signal processing would be substantially eliminated.

In accordance with a principal teaching of this invention, the missing high frequency components (C'−Y')$_H$ are inferred from available signal information in the receiver, and circuit means are provided for generating inferred high frequency components designated ($C_H''-Y_H'$) which are used separately and independently for each primary, producing different highs as required for each color. Since the inferred highs are not the same in each color and since they remove the mixed highs nature of the television signals and displayed pictures, the resulting high frequency signal components are also here referred to as de-mixed highs.

It is a further feature of this invention that when separable frequency-time portions of the composite video signal meet specific and defined conditions indicative of one or another form of dominant color highs, then effective inferred chrominance highs appropriate to each portion of the video signal may be individually generated and combined therein.

It is a further feature of this invention that when specific and defined signal conditions indicative of visible I' to Y' interference exist, then inferred components of I' may be used to reduce or tend to neutralize such interference.

B. The Principle Of Multimode Operation

The present inventor has discovered a number of factors which indicate the desirability of multimode correction. These factors include not only differences in the correction signals required to correct different portions of the received signal and the fact that the desirability of different types of correction can vary at least from one region of the received signal to another region, but the fact that signal information inherently present in available received signal components is adequate to provide decisions regarding the relative desirability of different types of correction. Such decisions can be utilized as a basis for selective control among a plurality of correction modes.

The concepts for providing inferred high frequency correction signals in regions of color transition, for example, differ from the concept for providing correction signals in regions of high color saturation and high frequency detail. While each concept involves scaling high frequency correction signals from the high frequency portion of the received monochrome signal, the scaling factors, processing algorithms and processing circuits differ appreciably.

In addition, the content of typical color television pictures varies sufficiently that a plurality of different corrections is desirable. In some instances the content of a color television picture is predominantly derived from components resulting from color steps and inferred step correction is most advantageous. In other instances the step content of the picture is visually negligible, and inferred independent highs correction is most advantageous. In yet other regions both types of correction can advantageously be effected concurrently in time or position within the displayed picture.

In view of these factors, it is an object of this invention to provide a color television receiving system having multimode inferred highs correction circuitry. Such circuitry will typically comprise a plurality of correction mode circuits responsive to the received television signal for processing inferred highs correction signals in respectively different modes, mode decision circuitry responsive to the received signal for automatically determining which among the plurality of correction modes are appropriate for correcting a given time and frequency region of the received signal, and mode control circuitry responsive to the output of the decision circuitry for automatically enabling the inferred highs generating circuitry in the correction modes determined to be appropriate.

C. The Inferred Step Highs Correction Mode (Mode A)

There are at least six main categories of correction modes useful in conjunction with the invention. These categories include: (1) an inferred step highs correction mode (Mode A); (2) an independent highs correction mode (Mode B); (3) a multiband inferred highs mode wherein Modes A and B may be individually selectable to correspond to separable subsections of the frequency-time signal components available at the receiver (Mode C); (4) an inferred waveform reconstitution mode which is illustrated here with regard to step-related components (Mode D); (5) a separated inferred highs mode wherein concurrent inferred chrominance highs may be generated from separated portions of the Y′ highs occurring in the same frequency and time interval (Mode E); and also (6) a band interlaced, inferred signal neutralization mode which is illustrated with a step signal here (Mode F).

The inferred step highs correction mode, Mode A, generally comprises signal processing methods and circuitry for processing inferred de-mixed high frequency signal components for reducing the visibility of color infidelities in regions of sharp color contrast. In a concurrently filed U.S. Patent Application, entitled "Color Television Receiving System Utilizing Inferred High Frequency Signal Components to Reduce Color Infidelities In Regions of Color Transitions", the present inventor discloses methods and circuitry for processing such correction signals as inferred high frequency chrominance components, $(C_H{''} - Y_H{'})$ nominally of the central form:

$$(C_H'' - Y_H) = Y_H \left[ \frac{d/dt(C - Y)_L}{d/dt(Y_L)} \right] \equiv Y_H N_s \quad \text{[Eq. 1(a)]}$$

$$= \left[ \frac{Y_H}{d/dt(Y_L)} \right] d/dt(C - Y)_L = \rho_1 d/dt(C - Y) \quad \text{[Eq. 1(b)]}$$

Here $Y_L'$ is a low frequency portion of Y′ having a composite frequency translation characteristic and hence transient response comparable to the chrominance component $(C' - Y')_L$ that is to be extended in bandwidth. $Y_H'$ is the portion of Y′ complementary to $Y_L'$. In simple equiband reception, $Y' = Y_H' + Y_L'$, and $(C' - Y')_L$ may be along any chrominance axis. In unequal band I′, Q′ processing then, correspondingly, $Y' = Y_{LI}' 30\ Y_{HI}' = Y_{LQ}' + Y_{HQ}'$ and the inferred chrominance highs are derived by the same matrix equation as the chrominance lows.

It can be seen from Equation 1(a) that the inferred high frequency step components are effectively scaled from $Y_H'$ by a factor $N_s$ representing, during a step, the essentially constant ratio of comparable transients.

It can also be seen from Equation 1(b) that the inferred high frequency step components are effectively scaled in proportion to the rate of change of relevant chrominance lows in accordance with a waveform ratio of components from the monochrome Y′ signal.

Alternatively and equivalently, inferred high frequency waveforms including step correction are processed as complete primary color high frequency components $C_H''$ of the form:

$$C_H'' = Y_H \left[ \frac{d/dt(C_L)}{d/dt(Y_L)} \right] \equiv Y_H(1 + N_s) \quad \text{(Eq. 2(a))}$$

$$= \left[ \frac{Y_H}{d/dt(Y_L)} \right] d/dt(C_L) = \rho_1 d/dt(C_L) \quad \text{(Eq. 2(b))}$$

wherein the signal $C_L'$ represents the low frequency component of any color. It is available from the sum of a chrominance component $(C' - Y')_L$ and a comparably spectrally filtered portion $Y_L'$ of the received composite monochrome signal Y′.

In each case it is chrominance which is effectively added. Scaling in Equations 2(a) and 2(b) is comparable to that shown in Equations 1(a) and 1(b).

The correction expressed by Equation 2(a) includes polarity since the ratio which defines $(1 + N_s)$ can be of either polarity in numerator and denominator.

This derivation of inferred de-mixed highs in regions of sharp color transients relies and is dependent upon the fact that in such regions, the ratio of the missing chrominance highs to the available luminance is substantially proportional to the ratio of the derivatives of the corresponding available low frequency components. This relationship may be considered a consequence of the fact that throughout a step transient chrominance signal vectors in an appropriately defined color space generally maintain their direction.

Operations wherein inferred chrominance components corresponding to the above algorithms are effectively added to the composite color signals can be utilized as either a "normally-on" mode or as a mode selectively operational only during specific time epochs. It can be utilized in the "normally-on" state when mode decision circuitry determines either that there is no dominant contrary signal condition or that step correction is the mode most appropriate for the signal content. In the latter case full directional correction in color space is also obtained for sinusoidal components within the frequency region of $(C' - Y')_L$ and hence $Y_L'$ which is measurably overlapped in frequency of $Y_H'$.

Epoch operation can be utilized when the mode decision circuitry determines that a step is specifically indicated for the epoch in question.

D. The Independent Highs Correction Mode (Mode B)

The independent highs correction mode (Mode B) generally comprises signal processing methods and circuitry for processing inferred de-mixed high frequency signal components for reducing the visibility of color infidelities for components other than step transients wherein the color highs are essentially independent of the color lows. Regions of particular concern for independent highs are regions of high color saturation. In a second concurrently filed U.S. Patent Application entitled "Color Television Receiving System Utilizing Inferred High Frequency Signal Components To Reduce Color Infidelities In Regions Of High Color Saturation", the present inventor discloses methods and circuitry for processing independent inferred highs. In a central and preferred form of the invention described therein, the missing high frequency chrominance components ($C_H'' - Y_H'$) are processed in accordance with the equation:

$$(C_H'' - Y_H') = Y_H'[(C' - Y')_L/Y_L'] \equiv Y_H' N_I = [Y_H'/Y_L'](C'-Y')_L \quad \text{(Eq. 3)}$$

Here again the inferred high frequency components are scaled from $Y_H'$ but by a different scaling factor $N_I'$ defined by Equation (3). Alternatively and equivalently, the inferred high frequency components can be processed as inferred high frequency primary color components of the form:

$$C_H'' = Y_H'[C_L'/Y_L']Y_H'(1+N_I) = [Y_H'/Y_L'](C_L') \quad \text{(Eq. 4)}$$

The factor $N_I$ is not necessarily constant during independent highs. Further, the factor $(1+N_I)$ in Equation 4 is normally always positive since it is the ratio of two signals of common polarity.

This mode can be utilized as a "normally-on" mode when mode decision circuitry determines either that there is no dominant contrary signal condition or that independent highs correction is most appropriate for the signal content. In that case it tends to provide approximate enhanced response to sinusoidal components in a frequency overlap region of $Y_L'$ and $Y_H'$. Alternatively, it can be utilized during only specific time epochs when independent highs are specifically indicated as acceptable.

E. Multiband Operation (Mode C)

A third alternative mode useful to minimize the visible deficiencies caused by the restricted bandwidth of directly available chrominance components comprises the case of both step and independent highs which exist concurrently, with one or another being dominant in different portions of the spectrum. As taught herein it is possible to configure special mode decision circuitry to separate the Y' signal into a plurality of components in frequency and time such that in the presence of concurrent highs wherein each has a separate region of dominance, the corresponding inferred chrominance highs appropriate for each portion are concurrently generated and effectively combined. This concurrent multiband operation is also employed in unequal band I', Q' reception with decision processes appropriate to each axis.

In all of the modes presented herein, fidelity to $Y_H'$ is obtained whenever the constraint $\Sigma A_c C_H' = Y_H'$ is complied with. Fidelity to $Y_L'$ then tends to be obtained when algorithms equal or comparable to those in Equations 1, 2, 3 and 4 are appropriately applied.

F. The Reconstitution Mode (Mode D)

A fourth alternative mode useful for example, during the time epoch when a chrominance or color step is detected involves reconstitution of a chrominance or color step. This technique is dependent upon the concept that the function defined by the ratio of the Y' highs to the time rate-of-change of the $Y_L'$ lows has substantially uniform, reconstitutable characteristics in any step. Thus, during a detected step, a partly reconstituted chrominance step highs signal ($C_{HS}'' - Y_H'$) can be generated as:

$$(C_{HS}'' - Y_H') \doteq \left[\frac{Y_H}{d/dt(Y_L)}\right]_{nominal} \times [d/dt(C' - Y')_L]_{actual}$$

or $$C_{HS}'' \doteq \left[\frac{Y_H}{d/dt(Y_L)}\right]_{nominal} \times [d/dt(C')_L]_{actual} \quad \text{(Eq. 5)}$$

wherein the nominal term is a function having the dominant universal characteristics of the ratio of the Y' highs to the time rate of change of the Y' lows, as defined below.

In this case further use is made of the fact presented in Equations 1 and 2 that for a step transition from one color to another the chrominance rate component (or corresponding color rate component) is multiplied by a waveform comprising the corresponding ratio of $Y_H'$ to (d/dt $Y_L'$) characteristic of a step; this waveform for any step bandwidth has a form a priori closely known in shape, amplitude and polarity. But as presented above it is a teaching of this invention to determine the effective bandwidth of a step when one exists. Hence it is possible, first, to regenerate or reconstitute a nominal waveform of appropriate shape, polarity, amplitude and timing and having an aggregate bandwidth automatically selected from a plurality of such bandwidths to produce a signal component representative of the received value $\rho_1$ measured by mode decision circuitry described in this specification.

It is then possible by circuit means and methods presented herein to effectively recreate composite color signals which include an effectively added component representative of the product of Y' highs and the rate-of-change of chrominance lows, and the inverse of corresponding Y' lows.

G. Concurrent Separated Inferred Highs (Mode E)

A fifth alternative mode mades use of a universal nominal ratio of components representative of signals derived from portions of the Y' signal such as illustrated above. Proceeding with this form then it is possible to define circuit means and methods for slitting of the Y' highs into portions attributable to step components $Y_{HS}''$ and into portions attributable to independent highs $Y_{HI}'$, wherein:

$$Y_{HS}'' = [\rho_{1,\,(nominal)}] \times d/dt(Y_l') \text{ actual}$$

and $$Y_{HI}' = Y_H' - Y_{HS}'' \quad \text{(Eq. 6)}$$

The circuit means and methods described herein provide the capability of applying the above concepts to any separable portion of the signal $Y_H'$. Further it is possible to similarly separate and process any comparably recognizable signal component and fully process the residual after subtraction from the composite Y' signal, in an application of the basic principle taught above. Inferred step highs correction components and inferred independent highs correction components can be derived from $Y_{HS}''$ and $Y_{HI}'$ respectively and combined with the chrominance or color signals.

H. Neutralization Mode for Suppressing Crosstalk from I' into Y' (Mode F)

A sixth mode applicable for improving reproduction of signals on color (or black and white) television receivers concerns circuit means and methods presented in this specification for suppressing or effectively neutralizing the signal sideband I' components which extend substantially into the portion of the frequency band occupied by the higher frequency components of the Y' signal. This crosstalk is rendered of increased visibility by fundamental display non-linearity associated with the use of gamma corrected signals. When multi-line signal combination is used, as by application of long delay techniques, these cross talk components are conventionally altered in pattern but not removed.

In accordance with the teachings of the present invention when a portion of $Y_H'$, e.g. the lower frequency portion $Y_{H1}'$, produces an indication in the mode decision circuitry of a correctable transient condition, such as a step which is confirmed by the existence of the rate-of-change of I' lows, then the inferred I' highs, for example, $$I_{H1}' = [d/dt\ I_L'][(Y_{H1}')_1/(d/dt\ Y_{L1}')]$$

may be inferred as appearing in the single sideband chrominance spectrum. A comparable component of opposite polarity may then be generated in the receiver by circuit means and methods taught herein to substantially suppress the crosstalk. Since single sideband components are visible partly because of non-linear processes, they may be substantially reduced by simple approximations to the full neutralization.

I. Operating Regions and Decisions

The above operating modes may be rendered selectively operating in accordance with the teachings herein with regard to mode decisions and control, and circuit means and methods to configure and operate such mode decisions and control.

The decision as to whether a relevant step exists at a particular time may be inferred by the existence of a ratio $Y_H'/(d/dt\ Y_L')$ having the shape, amplitude and polarity characteristic of a step, and the concurrent existence of a non-zero rate of change of the comparable chrominance component. This existence will be shown to be measurable in a number of ways, including the specific measurement of this waveform by precise techniques, e.g. summed square difference or by various estimation techniques or by measurement of an unambiguously related waveform, such as a ratio of a first component representative of $Y_H'$ and a second component representative of $d/dt\ Y_L'$. Underlying principles and methods as well as consequences of such measurements are presented herein.

The decision as to whether independent highs exist may be based on a measure of a ratio proportional to $Y_H'$, which must exist in substantial relative amplitude in order for the independent highs to be significant, and a measure showing chrominance components $(C'-Y')_L$ to be concurrently in existence. Further, since the independent highs are highs at or about some local color, as compared to transitions between two colors, it is appropriate to also require that $d/dt\ (C'-Y')_L$ be concurrently relatively small. However, since only the Y' signal is fully available at the receiver without bandwidth restriction, the scaled reference ratio $Y_H'/(d/dt\ Y_L')$, which is derived from components of Y', may be used, along with the concurrent existence of local, non-zero chrominance $(C'-Y')_L$.

Thus, the same decision measure may be used for independent highs as for the step but subject to specific different criteria. This applies also to measures based on a signal representative of $Y_H'$ as measured relative to a signal representative of $d/dt\ Y_L'$.

In the case of independent highs such a measure may be expected to exceed a threshold. Where a direct linearly processed waveform ratio is used, this measure may be exceeded except at (or very close to) the zero amplitude points of signal $Y_H'$. Here it is noted that first $(C_H''-Y_H')$ goes to zero also, by the basic algorithms, and second that amplitude threshold devices may exhibit very short spikes during these intervals; the spikes or short impulses are easily removed by a number of conventional circuit means.

The circuits which perform the above measurements are called mode decision circuits and are described herein in detail. The outputs of these circuits are nominally mode control signals and for convenience these may be represented symbolically by symbols $\beta_s$ for control of a step mode and $\beta_I$ for control of independent highs (however each is applied), where $\beta=1$ represents an on or enabled condition and $\beta=0$ represents an off or disabled condition. Both simple and complex controls are described herein.

As will be shown, these decision processes may be derived with respect to one or more axes or for equal or unequal band operation. The corresponding highs may be measured or evaluated with regard to a complete band complementary to the corresponding Y' lows, or the highs may be divided into a plurality of sections such as a $Y_{H1}'$ and $Y_{H2}'$.

In all cases a clear distinction has been made between time delay, which can be compensated conventionally, and time spreading which can cause undesirable signal overlap; curcuit means and methods are shown which tend to suppress spreading of waveforms in time. The relevance to mode decision and timing is represented in Table 1 by the following symbols:

$\beta_s \to 1$ for step enabling or acceptance
$(1-\beta_s) \to 1$ for step disabling
$[[\beta_s]] \to 1$ for step enabling and precise timing
$\beta_I \to 1$ for independent highs enabling or acceptance
$(1-\beta_I) \to 1$ for independent highs disabling Some of the specific Mode Decision Circuits presented in the specification in illustration of the principles outlined above, and discussed in further detail with regard to the circuits shown, include those defined in Table 1. The circuits may be shown to be effectively representable as having circuit means and methods for both signal comparison and normalization and also for signature evaluation. Illustrative waveforms which are representative of the components as stated above are: $Y_H'$, $Y_L'$ and hence $(d/dt)\ Y_L'$, optional components $Y_H''$ and $Y_L''$ constrained to be separated in frequency, components $Y_{H1}'$, $Y_{H2}'$ as appropriate, and generally the ratios $\rho_1 = Y_H'/[d/dt(Y_L')]$, $(\rho_1) = Y_H''/[d/dt(Y_L')]$, $\rho_{11} = [d/dt(Y_H')]/[d/dt(Y_L')]$ and $\rho_2 = Y_H'/[d^2/dt^2(Y_L')]$ It will be understood that signals representative of $Y_H'$ may have passbands intermediate $Y_H'$ and $Y_H''$.

In some cases a plurality of waveforms may beneficially be used concurrently, and this is also taught and illustrated. The nominal transient (step) epoch for the relevant $Y_L'$ is here generically represented as $T_s$, although $T_s$ may be different for unequal Q' and I' band systems. The existence or non-existence of a minimum time spreading is fully discussed in the embodiments herein and is indicated in simplified form in Table 1.

TABLE I

| TYPE OF DECISION PROCESS | KEY SIGNALS ILLUSTRATED | ORDER OF NOMINAL TIME DELAY | ORDER OF TIME SPREADING | PRIMARY DECISION UTILITY |
|---|---|---|---|---|
| Complete Signature Recognition (Summed square difference) | $\rho_1, \rho_{11}$ | $\doteq T_s$ | none | $[[\beta_s]]$ |
| Signature recognition, and/or quadrature channels | $\rho_{11}$ and $\rho_1$ | $\doteq \dfrac{T_s}{2}$ | none | $[[\beta_2]]$ |
| Simple amplitude window | $\rho_{11}$ and $\rho_1$ optional | $\doteq 0$ | none | $(1-\beta_s)$ or $(1-\beta_I)$ and complements thereof |
| Continuous Verification | $\rho_{11}$ and $\rho_1$ | $\doteq 0$ | none | $[\beta_s]$ |
| Non-linear integrator | $\rho_{11}, \rho_2$ or $(\rho_1)$ | $\doteq \dfrac{T_s}{2}$ | $\doteq \dfrac{T_s}{2}$ | $\beta_s, \beta_I$ or complements |
| Comparative integrated measure | Components of $(\rho_1)$ or other | $\doteq \dfrac{T_s}{2}$ | $\doteq \dfrac{T_s}{2}$ | $\beta_I$ $(1-\beta_s)$ |
| Roughly matched filter | $\rho_1$ or other | $> \dfrac{T_s}{,}$ | $> \dfrac{T_s}{2}$ | $[[\beta_s]]$ |

I. Mode Decision Controlled Inferred Highs Generation

Representative illustrations are presented in Table 2 of mode decision controlled inferred highs generation forms in accordance with the teachings of the invention.

The effective inferred highs are there represented as $N_S Y_H'$ or $N_I Y_H'$ for simplicity, unless another form is of such primary relevance as to mandate another form.

In this table the symbols $\beta_s$ and $\beta_I$ or $(1-\beta_s)$ or $(1-\beta_I)$ may be used to represent single mode decisions. The double bracketed symbol $[[\beta_s]]$ is used to represent a precisely timed enabling gate of appropriate duration $T_s$. The single bracketed symbols $[\beta_s]$ and $[\beta_I]$ are used to represent time-delay-aligned concurrent controls in accordance with the equations $$[\beta_S] = [\pi_K \beta_{SK}][\pi_J(1=\beta_{IJ})]$$

and $$[\beta_I] = [\pi_{IJ}\beta_{IJ}][\pi_K(1-\beta_{SK})]$$

where $\pi_K$ or $\pi_J$ represents a product over the indicated index K or J. These need not necessarily use identical combinations. The several modes of operation are further explained herein in terms of previous specific embodiments.

Forms illustrated in Table 2 include the following:
1. Step mode algorithm enabled full time;
2. Time-gated step operation during a designated epoch, $T_S$;
3. independent mode algorithm enabled full time;
4. Quiescent independent highs operation with step algorithm alternately enabled during all periods of general waveform compatibility with step operation;
5. Quiescent independent highs operation with step algorithm specifically keyed (alternately) during step epochs of duration $T_S$;
6. Quiescent step algorithm operation with independent algorithm alternately enabled during all periods of general waveform compatibility with independent operation;
7. Simple step algorithm quiescent operation with aperiodic disabling as indicated by signal information;
8. Simple independent algorithm quiescent operation with aperiodic disabling as indicated by signal information;
9. Simple concurrent combined dual enabling and transfer disabling;
10. Multiplex concurrent operation illustrated for a plurality of $Y_H'$ subsections for any axis with both step and independent modes enabled as controlled by time-delay equalized concurrent decisions for each subsection of the $Y_H'$ signal;
11. Identified and keyed step operation within a time epoch $T_S$ with separate decisions controlling subsections of the highs, and output signals wholly responsive to input signals;
12. Reconstituted step in Y' highs comprising separate decisions for each separable portion thereof;
13. Separated processing where $Y_H'$ is separated into concurrent portions allocated to step highs or independent highs;
14. Reconstituted step in inferred chrominance highs with separate reconstituted and controlled separated sections;
15. Inferred transitional step I' for use in crosstalk neutralization of I' single sideband into Y' illustrated with $Y_{HI}'$ for the bulk of the benefit;
16. Inferred reconstituted step I' for use in crosstalk neutralization of I' single sideband into Y', illustrated the $Y_{HI}'$ for the bulk of the benefit, (but optionally extendable to include $Y_{H2}'$);
17. Illustration of control signal application wherein input signals are controlled rather than output signals or a scaling factor, to provide operation generally as in 5 above;
18. Illustration of control signal application wherein input signals are controlled rather than output signals or a scaling factor, to provide operation generally as in 6 above.

16. Illustration of control signal applications where input signals are controlled rather than output signals or a scaling factor, to provide operation generally as in 10 above.

Where unequal band chrominance processing is used, these forms are representable to appropriate $I_L'$ and $Q_L'$ and related bandwidths for decision processes for each axis.

Some of the above forms may be combined in accordance with the teachings herein:

It is feasible to achieve comparable operation by algebraic manipulation of terms in Table 2. For example, noting that $$\{N_s[\beta_s]+N_I[\beta_I]\}Y_H'+Y_H'=\{N_s[\beta_s]Y_H'+N_I[\beta_I]Y_H'+Y_H'$$
$$=(1+N_s)[\beta_s]Y_H'+N_I[\beta_I]Y_H'=N_s[\beta_s]Y_H'+(1+N_I)[\beta_I]Y_H',$$

it is clearly possible to add chrominance from either generator to add (or not add, as controlled) an inferred chrominance input to a signal from the other generator which may at any time represent either $Y_H'$ or the effective sum of $Y_H'$ and inferred chrominance, as appropriately controlled.

Since the resulting composite color signals so produced are effectively the same as those defined in Table 2 these do not represent different modes of operation.

Other combinations are algebraically derivable. Specifically, Table 2 effectively defines specific forms of the displayed color pictures, or of the aggregate or effective composite color signals provided for display, that is R'', G'' or B'' or the components thereof, to produce signals to which have been effectively added inferred chrominance components controlled in accordance with the teachings herein.

TABLE 2

| TYPE OF OPERATION | PRIMARY CONTROL SOURCE | EFFECTIVE TYPE OF CORRECTION |
|---|---|---|
| 1. Full time step | none | $\{N_s\}\,Y_H'$ |
| 2. Time gated step | $[[\beta_s]]$ | $\{[[\beta_s]]\,N_s\}\,Y_H'$ |
| 3. Full time independent | none | $\{N_I\}\,Y_H'$ |
| 4. Time enabled step with quiescent independent | $\beta_s$ | $\{N_s\beta_s+N_I(1-\beta_s)\}\,Y_H'$ |
| 5. Time gated step with quiescent independent | $[[\beta_s]]$ | $\{N_s[[\beta_s]]+N_I(1-[[\beta_s]])\}Y_H'$ |
| 6. Signal enabled independent with quiescent step | $\beta_I$ | $\{N_s(1-\beta_I)+N_I(\beta_I)\}Y_H'$ |
| 7. Simple step with disabling | $(1-\beta_s)$ | $\{N_s(1-(1-\beta_s))\}Y_H'$ |
| 8. Simple independent with disabling | $(1-\beta_I)$ | $\{N_I(1-(1-\beta_I))\}Y_H'$ |
| 9. Simple concurrent enabling and transfer disabling | $\beta_s$ $\beta_I$ | $\{N_s\beta_s(1-\beta_I)+N_I\beta_I(1-\beta_s)\}Y_H'$ |
| 10. Multiplex concurrent operations with plurality of $Y_H'$ subsection on any axis, illustrated for $Y_H'=Y_{H1}'+Y_{H2}'$ | $[\beta_s]_1$ $[\beta_s]_2$ $[\beta_I]_1$ $[\beta_I]_2$ | $\{N_s[\beta_s]_1 + N_I[\beta_I]_1\}\,Y_{H1}'$ $+\{N_s[\beta_s]_2 + N_I[\beta_I]_2\}\,Y_{H2}'$ (concurrence optional) |
| 11. Identified step of specific bandwidth illustrated for $Y_H'=Y_{H1}'+Y_{H2}'$ | $[[\beta_s]]_1$ $[[\beta_s]]_2$ | $\dfrac{Y_{H1}'[[\beta_s]]_1+Y_{H2}'[[\beta_s]]_2}{(\frac{d}{dt}Y_L')}\cdot\dfrac{d}{dt}(C'-Y')_L$ |
| 12. Reconstituted step in Y' of specific bandwidth, illustrated for $Y_H'=Y_{H1}'+Y_{H2}'$ | $[[\beta_s]]_1$ $[[\beta_s]]_2$ | Component for multiplication by a chrominance rate component is $\left[(\dfrac{Y_{H1}'}{\frac{d}{dt}Y_{L\,nominal}'})\,[[\beta_s]]_1\right.$ $\left.+(\dfrac{Y_{H2}'}{\frac{d}{dt}Y_{L\,nominal}'})\,[[\beta_s]]_2\right]\dfrac{d}{dt}Y_{L\,actual}'$ |
| 13. Separated processing where $Y_H'=Y_{HS}'+Y_{H1}'$ concurrently. Illustrated for simplicity with a single Y' band | $[[\beta_s]]$ | $\{N_sY_{HS}'[[\beta_s]]$ $+N_I(Y'-Y_{HI}')(1-[[\beta_s]])\}$ where $Y_{HS}'=(\dfrac{Y_H'}{\frac{d}{dt}Y_{L\,nominal}'})\cdot(\dfrac{d}{dt}Y_{L\,actual}')$ and $N_sY_{HS}'=(\dfrac{Y_H'}{\frac{d}{dt}Y_{L\,nominal}'})\cdot\dfrac{d}{dt}(C'-Y')_L$ |
| 14. Reconstituted step in inferred chrominance highs | $[[\beta_s]]_1$ $[[\beta_s]]_2$ | $\left\{(\dfrac{Y_{H1}'}{\frac{d}{dt}Y_{L\,nominal}'})\,[[\beta_s]]_1\right.$ $\left.+(\dfrac{Y_{H2}'}{\frac{d}{dt}Y_{L\,nominal}'})\,[[\beta_s]]_2\right\}\dfrac{d}{dt}(C'-Y')_L$ |

TABLE 2-continued

| TYPE OF OPERATION | PRIMARY CONTROL SOURCE | EFFECTIVE TYPE OF CORRECTION |
|---|---|---|
| 15. Inferred step I' for use in crosstalk neutralization illustrated with $Y'_{H1}$ for bulk of benefit | $[[\beta_s]]_1$ | $I'_{H1} = \left( \dfrac{Y'_{H1}}{\frac{d}{dt} Y'_L} \right) \dfrac{d}{dt} I'_L [[\beta_s]]_1$ |
| 16. Inferred reconstituted step I' for similar purpose to 15. | $[[\beta_s]]_1$ | $I'_{H1} = \left( \dfrac{Y'_{H1}}{\frac{d}{dt} Y'_{L \, nominal}} \right) \dfrac{d}{dt} I'_L [[\beta_s]]_1$ |
| 17. Simple input signal controlled version of 5 | $[[\beta_s]]$ | $\left\{ \dfrac{(\frac{d}{dt}(C'-Y')_L)[[\beta_s]] + (C'-Y')_L(1-[[\beta_s]])}{(\frac{d}{dt}(Y'_L))[[\beta_s]] + Y'_L(1-[[\beta_s]])} \right\} Y'_H$ |
| 18. Simple input signal controlled version of 6 | $\beta_I$ | $\left\{ \dfrac{(1-\beta_I)\frac{d}{dt}(C'-Y')_L + \beta_I(C'-Y')_L}{(1-\beta_I)\frac{d}{dt}(Y'_L) + \beta_I(Y'_L)} \right\} Y'_H$ |
| 19. Generalized input signal controlled, plural band | $[\beta_s]_1$ $[\beta_s]_2$ $[\beta_I]_1$ $[\beta_I]_2$ | $\left\{ \dfrac{[\beta_s]_1 \frac{d}{dt}(C'-Y')_L + [\beta_I]_1(C'-Y')_L}{[\beta_s]_1 \frac{d}{dt} Y'_L + [\beta_I]_1 Y'_L} \right\} Y'_{H1} +$ $\left\{ \dfrac{[\beta_s]_2 \frac{d}{dt}(C'-Y')_L + [\beta_I]_2(C'-Y')_L}{[\beta_s]_2 \frac{d}{dt}(Y'_L) + [\beta_I]_2 Y'_L} \right\} Y'_{H2}$ |

J. Responses to Sine Waves and Mode Switching

When the central algorithms for step mode or independent mode inferred chrominance highs are maintained in a quiescent enabled state, it is relevant to consider response to sinusoidal waveforms appearing in the chrominance passband. These passbands may commonly have gradual amplitude cutoffs associated with minimal time spreading of transients. For such components which appear in both the $Y_L'$ and complementary $Y_H'$ signals, the step mode has the effect of flattening or squaring off the effective passband response, while still producing full transitional correction. The independent mode, consistent with its basic operation on independent highs which appear in $Y_H'$ alone, produces a full correction on pure primary colors but only partial correction when there is a residual, masking multicolor background.

The quiescent-on modes are available, as discussed herein. The step mode may be keyed on by $[[\beta_s]]$, for quiescent independent mode operation. For quiescent step highs operation with switching to independent highs it is feasible to provide decision and control systems which can maintain the step mode in a quiescent enabled state for sinusoidal components below a selected frequency near the upper end of the frequency band of $(C'-Y')_L$ and $Y_L'$, and to switch to the independent highs mode at that point.

Let the effective chrominance passband have a shape below a nominal frequency $f_1$, defined by $F_L(f)$ for $f \leq f_1$. Then $Y_L'$ has the same passband shape and $Y_H'$ has one which is the complement, $(1 - F_L(f))$ for $f \leq f_1$. Let $F_L(f) = F_{Lo}$ at $f = f_o$, and let $W_o = 2\pi f_o$.

For the various control measures defined by $\rho_{11}$, $(\rho_1)$ and $\rho_2$ as described in various sections of this specification, the general mode decision parameters including but not restricted to $\beta_I$ can be set to maintain the step mode activated for sinusoidal components over a major portion of the $Y_L'$ passband, and to switch the independent algorithm for higher frequency components. For example, if $$F_L(f) \cong \cos^2 \dfrac{\pi}{2} \dfrac{f}{f_1} \text{ then } (1 - F_L(f))_{f < f_1} \cong \sin^2 \left( \dfrac{\pi}{2} \dfrac{f}{f_1} \right),$$

and $\rho_{11}$ is proportional to $$\tan^2 \left( \dfrac{\pi}{2} \dfrac{f}{f_1} \right),$$

which is a constant dependent on the frequency f.

For $(\rho_1)$, which is bandwidth limited to prevent overlap in frequency, the mode is maintained for the entire chrominance lows passband. Other, moderately filtered versions of signals $(\rho_{11})$ or $(\rho_2)$ can be designed to make the transition point at or close to $f_1$. The non-linear processing provides switching transitions which are effectively rectangular but without undesirable delay and transient effects conventionally produced with sharp transitions.

The use of non-overlapping passbands or of co-linear phasing of the components in the numerator and denominator for Y' derived mode decision controls tends to constrain performance when sinusoidal components exist in $Y_H'$ with complementary amplitudes in the overlap region with $Y_L'$. This processing method tends to prevent a quadrature relationship between the numerator and denominator functions, whether processed linearly or non-linearly in the mode decision system.

Consider a single primary color having a low frequency sine wave defined as $C_1' = C_{1o}' + C_1' \sin W_o t$ at the transmitter; then $C_{1L}' = F_{Lo} C_1' \sin W_o t$, $Y_L' = A_1 C$-

$1_o' + A_1 F_{Lo} \sin W_o t$ and $Y_H' = (1 - F_{Lo})A_1 C' \sin W_o t$ Conventionally $C_{1L}' + Y_H = C_{1o}' + C_1' \sin W_o t$ $(F_{Lo} + A_1(1 - F_{Lo}))$ and the sine wave amplitude is reduced because of amplitude rolloff or taper of the chrominance channel response. This gradual taper is used to minimize time smear and prevent ringing. Wideband chrominance receivers tend at least to pick up more cross-color energy from Y' into the chrominance channel. With the inferred step algorithm $$C_{1L}' + C_{1H}'' = C_{1o}' + F_{Lo}C_1' \sin W_o t + A_1 C_1'(1 - F_{Lo}) \sin W_o t [C_1'F_{Lo}W_o \cos W_o t / A_1 C_1' F_{Lo} W_o \cos W_o t] = C_{1o}' + C_1' \sin W_o t$$

and the gain is restored, that is, the effective passband response is effectively squared off without incurring time delay, or time spreading, and certainly without degrading response to step transients.

The same can be comparably shown if the sine wave is comprised of a plurality of primary color components. For a single primary, with the independent algorithm, $$C_{1L} + C_{1H}' = C_{1o} + F_{Lo}C_1 \sin W_o t + A_1 C_1 (1 - F_{lo}) \sin W_o t \left( \frac{C_{1o} + C_1 F_{Lo} \sin W_o t}{A_1 C_{1o} + A_{1i} C_1 F_{Lo} \sin W_o t} \right) = C_{1o} + C' \sin W_o t.$$

When there are non-zero color values in the other primaries, the correction is less complete but the effect is masked by those colors anyway.

K. Relation To Cross Color Due To Band Sharing

By providing television receiving systems with enhanced resolution as compared to current receiving systems, the present invention reduces the necessity to rely on portions of the chrominance band subject to cross talk, and thus can permit reduction of cross color due to band sharing.

Cross color represents a significant problem in current television receiving systems. Cross color results from the use of band sharing wherein the Y' signal occupies a band concurrently with a chrominance signal. Cross talk from the Y' signal into the chrominance channel produces spurious chrominance which is rendered more visible by non-linear processing on display. A high resolution image, which may be colorless, can have detail picked up as cross color, averaging purple. It has residual luminance due to rectification by the display gamma characteristic, and if the image moves, it can produce low frequency luminance flicker which is highly noticeable to the human eye.

In addition to providing improved performance at the receiver, the present invention could permit future transmission practice to further reduce interference by constraining the I' bandwidth to the double-sideband Q' bandwidth at the transmitter and by constraining the Y' bandwidth so that it does not overlap the chrominance.

L. Relation To Color Primaries

Ideal correction for change of colorimetric primaries for use in color television signal displays in which the primaries are not the same as those used at the transmitter for NTSC-type signals, generally would involve the following steps:

(1) Derive $C_1'$, $C_2'$, $C_3'$;
(2) Derive $C_1$, $C_2$, $C_3$;
(3) Matrix to $C_a$, $C_b$, $C_c$;
(4) Reapply gamma to get $C_a'$, $C_b'$, $C_c'$
and apply to picture display.

Various approximations are commonly used to simplify the correction algorithms.

The present inventions are not incompatible with such approximations, and, by providing more accurate signals $C_1''$, $C_2''$ and $C_3''$ in the full monochrome bandwidth $f_w$, these inventions can improve the limit of potentially available performance.

BRIEF DESCRIPTION OF THE DRAWINGS

The advantages, nature, and various additional features of the present invention will appear more fully upon consideration of the illustrative embodiments now to be described in detail in connection with the accompanying drawings in which:

FIGS. 1(A) and 1(B) are simplified functional diagrams illustrating the operation of single-mode inferred high frequency correction circuits with automatic enabling and disabling;

FIGS. 2(A) through 2(C) are simplified functional diagrams illustrating the operation of simple multimode inreferred high frequency correction and decision circuits;

FIGS. 4A-4G illustrate the transfer characteristics of the main circuit elements used in the embodiment of FIG. 3 and in other embodiments described herein;

FIGS. 6-10 illustrate alternative mode decision circuits useful in multimode inferred high frequency correction systems;

FIGS. 12-13A-13D pertain to mode decision circuitry for multiple band multimode correction and for unequal band receiver processing with multimode correction; and FIGS. 14-20 are block circuit diagrams of alternative embodiments of receiving systems employing multimode correction circuitry in accordance with several aspects of the invention.

For convenience of reference, similar elements are given the same reference numerals throughout the drawings.

Figure 3:
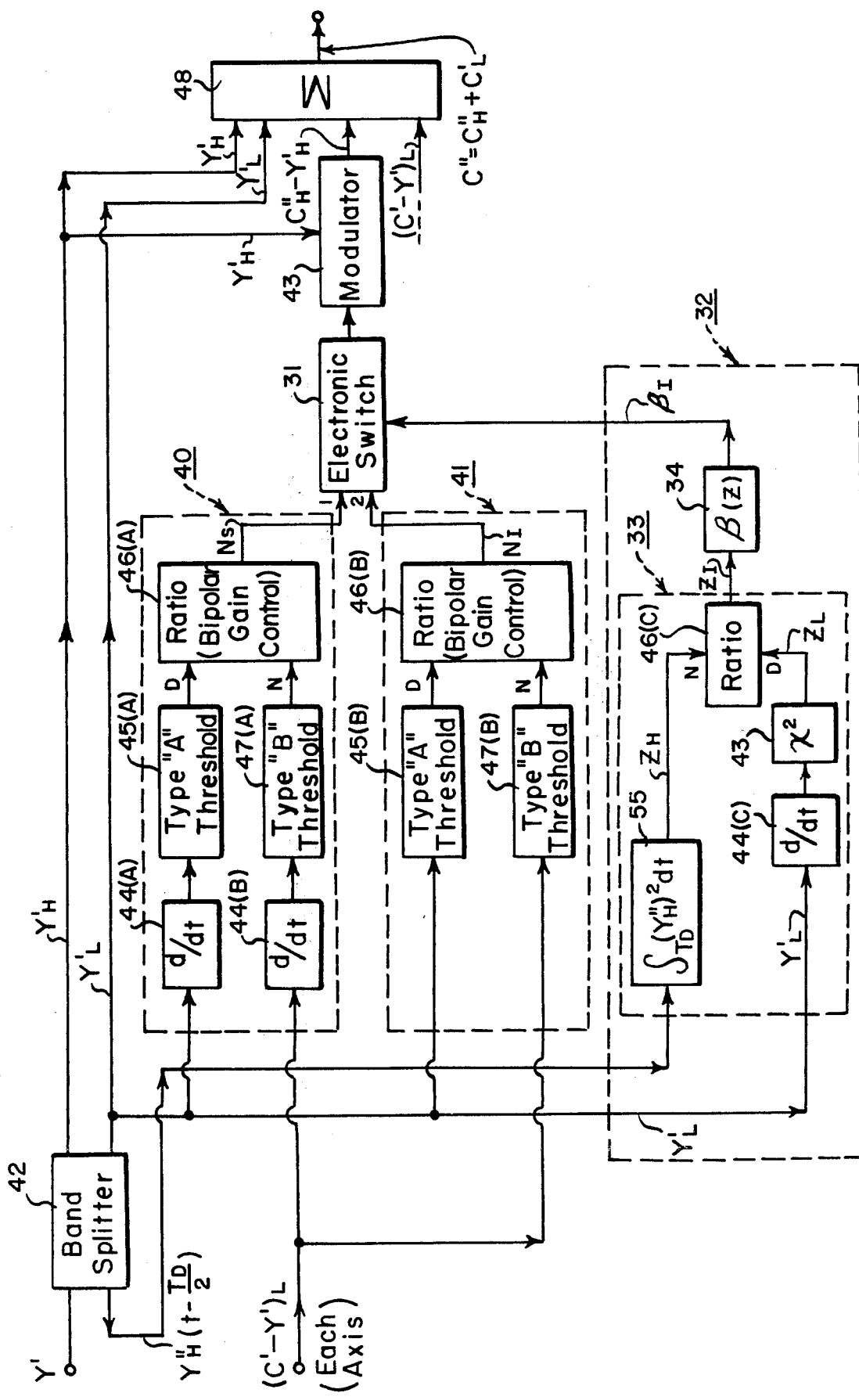
FIG. 3 is a block circuit diagram of a first exemplary embodiment of a receiving system employing a multimode inferred high frequency correction circuit in accordance with the invention.

DETAILED DESCRIPTION (a) Inferred High Frequency Correction Circuits With Automatic Enabling and Disabling (FIGS. 1(A) and 1(B).

While automatically enabled and disabled inferred high frequency generators are described in applicant's concurrently filed applications referenced hereinabove, a brief description of their operation is useful in understanding the present invention.

Referring to the drawings, FIGS. 1(A) and 1(B) are simplified functional diagrams illustrating the operation of inferred high frequency correction circuits with automatic enabling and disabling.

FIG. 1(A) illustrates the operation of an inferred high frequency step correction generator 10 which can be automatically switched between an operating mode and a non-operating mode through an electronic switch 11 responsive to a step mode decision circuit 12. Step mode decision circuit 12 comprises detection circuit means 13 and switching signal generator 14. Detector 13, responsive to components of the received television signal, produces an output signal $Z_s$ whose value is indicative of the existence of measures, based on one or more signals, of a relationship either characteristic of a step, or compatible with, or incompatible with the activation of effective inferred chrominance highs comparable to those described by the inferred step algorithms. Switching signal generator 13 converts this detector output signal into a binary switching control signal $\beta_s = 1$ or zero, as defined by a predetermined threshold on $Z_s$, corresponding to the existence or non-existence of a measure indicative of the desirability of operation of the inferred step highs algorithm. These control signals are applied to switch 11 for effectively enabling or disabling the step correction generator 10 in accordance with the value of the measure. An automatically enabled correction circuit of this type is described in greater detail in FIG. 13 of applicant's concurrently filed application entitled "Color Television Receiving System Utilizing Inferred High Frequency Signal Components To Reduce Color Infidelities In Regions Of Color Transitions."

FIG. 1(B) illustrates the operation of an inferred independent high frequency correction circuit 20 which can analogously be switched between an operating mode and a non-operating mode through a switch 21 responsive to an independent highs mode decision circuit 22.

Independent highs mode decision circuit 22 comprises detection circuit means 23 and switching signal generator 24. Detector 23, responsive to components of the received television signal, produces an output signal $Z_I$ whose value is indicative of the substantial presence or absence of independent high frequency components in the received signal relevant to mode control. Switching signal generator 24 converts this detector output signal into a binary switching control signal $\beta_I = 1$ or zero, as defined by a predetermined threshold on $Z_I$, corresponding to the existence or non-existence of a measure indicative of the desirability of operation of an inferred independent highs algorithm. These control signals are applied to switch 21 to accordingly enable or disable the inferred independent highs correction circuit 20. An automatically enabled independent highs correction circuit of this type is described in greater detail in FIG. 11 of applicant's concurrently filed application entitled "Color Television Receiving System Utilizing Inferred High Frequency Signal Components To Reduce Color Infidelities In Regions Of High Color Saturation."

(b) Simple Multimode Inferred High Frequency Correction Circuits for Equiband Receiving Systems (FIGS. 2, 3 and 4)

FIGS. 2(A) and 2(B) are simplified functional diagrams illustrating the operation of simple multimode inferred high frequency correction circuit in accordance with one embodiment of the invention. The multimode correction circuit comprises an inferred high frequency step correction circuit 10, an inferred high frequency independent highs correction circuit 20, a mode control switch 31 for switching between correction circuits 10 and 20, and mode decision circuit 32. Mode decision circuit 32 comprises detection circuit means 33 and switching control signal generator 34. The detection circuit accepts components of the received signal and produces one or more output signals indicative of the dominance of a measure of preferred operation of the effective generation and combination of inferred chrominance highs in accordance with either the step algorithm or the independent algorithm. The switching signal generator 34 accepts the output of detector 33 and converts it into a switch control signal for enabling through switch 31, either the step highs generator 10 or the independent highs generator 20 in accordance with a preselected mode control strategy. For example, as shown in FIG. 2(A), switch 31 can normally enable the independent highs correction circuit 20 unless mode decision circuit 32 produces a switching signal value of $\beta_s = 1$, or $[[\beta_s]] = 1$.

Alternatively, as shown in FIG. 2(B), switch 31 can normally enable the step highs correction circuit 10 unless mode decision circuit 32 produces a switching signal of value $\beta_I = 1$.

FIG. 2(C) is a functional block diagram illustrating the operation of a more generalized mode decision and control system utilizing a plurality of mode decision circuits for increased reliability. Here a band splitter, not shown, provides a plurality of signals representative of different frequency portions of the Y' signal to a compound mode decision circuit 32 for providing a plurality of mode selection signals of the forms $\beta_s$, $\beta_I$, $(1-\beta_2)$, $(1-\beta_I)$ or $[[\beta_s]]$. The several mode decision signals can be constrained to a desired level of time concurrency by appropriate time delay elements (not shown). The signals from element 32 can be combined in concurrent decision element 35 which provides a plurality of mode decision signals of from $[\beta_s]$ and $[\beta_I]$ to mode control circuitry 34 to control switching as required. In addition, further control can be obtained by requiring concurrence with further mode decision signals $\beta_{SC}$ and $\beta_{IC}$ from element 36. Element 36 accepts chrominance lows signals and an optional Y' lows signal as inputs. It applies thresholding to determine for $\beta_{SC}$ when at least one component rate-of-change exceeds a preselected threshold. Parametric selection permits use of thresholding then in one, two, or three-dimensional color space for $\beta_{IC}$ and in one, two or three-dimensional color rate-of-change space for $\beta_{SC}$. The control signal $\beta_{IC}$ is applicable for concurrent thresholding of $[\beta_I]$, while the control signal $\beta_{SC}$ is applicable for concurrency thresholding of $[\beta_S]$. Thus FIG. 2(C) includes circuit means and methods for mode decision and control jointly responsive to components derived from the wideband Y' signal and components derived from the chrominance lows. Specific examples of mode decision and control circuits are described in detail hereinbelow.

(c) Receiving System Employing Multimode Inferred Highs Correction (FIG. 3)

FIG. 3 illustrates in greater detail a specific example of a receiving system employing multimode inferred highs correction of the type described in connection with FIG. 2. In FIG. 3, the preceding portions of the color television receiver (not shown) supply reduced bandwidth chrominance signals (referred to as the chrominance lows) to a step highs control signal generator 40 of an inferred step highs generating circuit and also to an independent highs control signal generator 41 of an inferred independent highs generating circuit. The receiver also provides components of the monochrome video signal Y', through band splitter 42, to control signal generators 40 and 41 and to mode decision circuit 32.

Figure 5A:
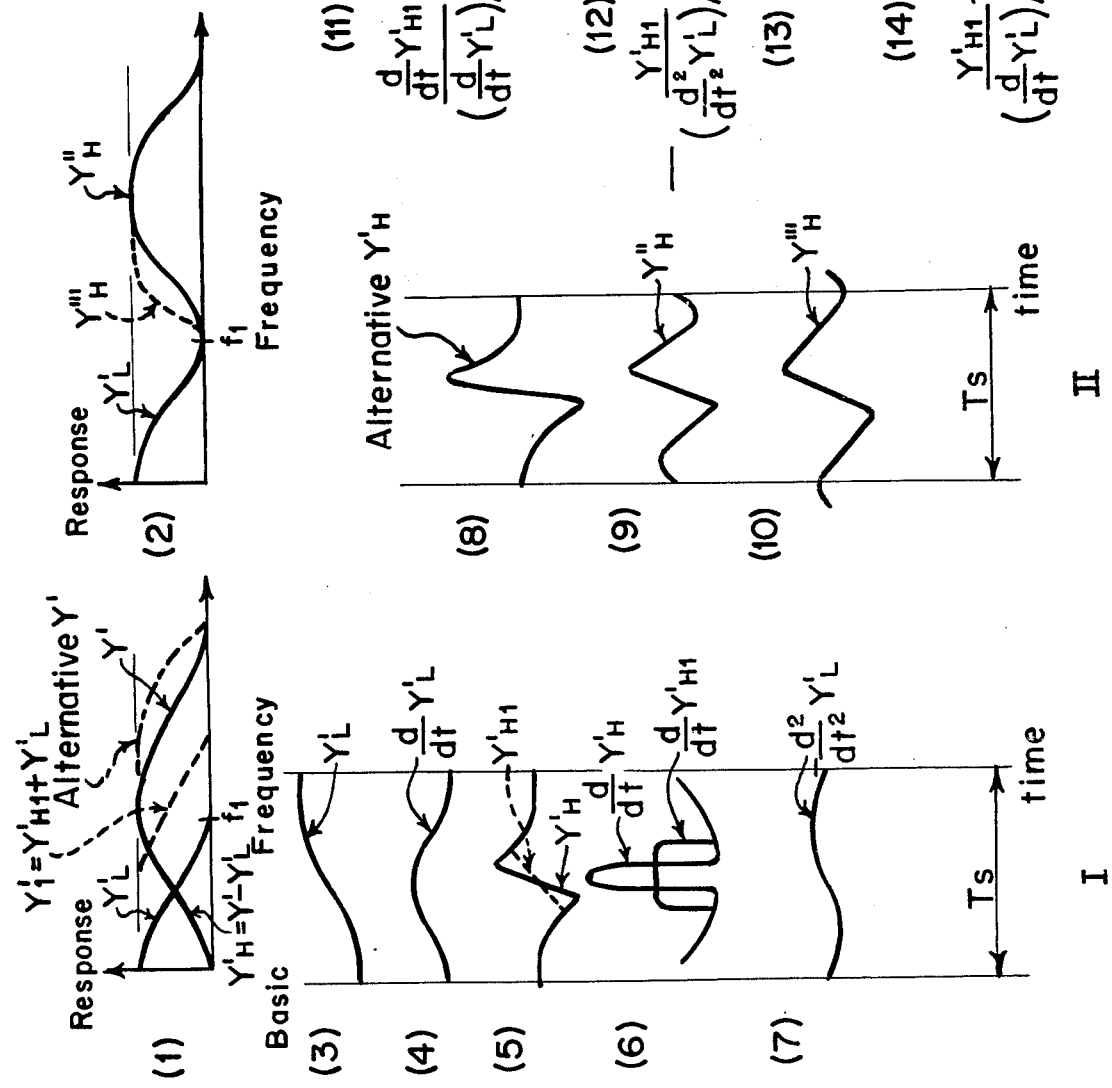
FIG. 5 illustrates passbands and waveforms pertinent to mode decisions.

Mode decision circuits are described in detail in general and specific embodiment forms in this specification, particularly with regard to FIGS. 2(C), 5(A) and (B), 6, 7, 8, 9 and 10. The form of mode decision circuit shown in element 32 of FIG. 3 is an illustrative form based on the circuit of FIG. 9. Any of the circuits shown in the several figures and described thereunder may be applied in the receiver of FIG. 3. In each case, the input signals shown or described may be applied as stated, and with appropriate relative timing. The mode decision circuit 32 shown here is one form of wideband decision circuit in accordance with the teachings of the invention. It includes a first signal component derived from $Y_H'$ and a second signal component representative of or derived from $(d/dt)Y_L'$ depending on the specific form used. Signal relationships between the two components are used to determine the wideband decision measure for mode of operation. Alternative forms, some with specific advantages, may be used in place of the one illustrated. The appropriate specific forms of $Y_H'$ and $(d/dt)Y_L'$ derived input signals are supplied from preceeding receiver sections. Various specific elements which appear in FIG. 3 are further defined in FIG. 4.

As illustrated in FIG. 3, band splitter 42 splits the monochrome signal Y' into at least two components, a low frequency component $Y_L'$ (referred to as the Y' lows) comparable in bandwidth and frequency range to the reduced bandwidth chrominance signals and a complementary high frequency portion $Y_H'$ (referred to as the Y' highs). For reasons which will be explained, in this particular embodiment the band splitter also provides to mode decision circuit 32 in place of $Y_H'$, a component designated $Y_H''$ $(t-T_D/2)$ generally representative of $Y_H'$ but earlier in time and restricted in bandwidth in order to reduce frequency overlap with $Y_L'$.

The inferred step mode correction control generator 40 comprises circuitry for processing an inferred high frequency chrominance step correction component $(C_H'' - Y')$ which is proportional to the product of the Y' highs and the time rate-of-change of the chrominance lows all divided by the time rate-of-change of the monochrome lows, i.e., $$(C_H'' - Y_H) = Y_H \frac{d/dt(C' - Y')_L}{d/dt(Y_L)} = Y_H N_s$$

Here $N_s$, as defined by the equation, can be referred to as a step mode correction control signal. The inferred high frequency step mode correction circuitry may be seen to comprise band splitter 42, step mode correction control signal generator 40 and modulator 43. Control signal generator 40 accepts the Y' lows from band splitter 42 and the chrominance lows from preceding receiver circuits and generates a control signal of the form:

$$N_s = \frac{d/dt(C' - Y')_L}{d/dt(Y_L)}$$

Specifically, the monochrome lows are applied to time differentiator 44A and the resulting rate-of-change signal is applied, through a type-A threshold 45(A), to the denominator input of a ratio circuit 46(A). The chrominance lows are applied to a differentiator 44(B), and the resulting chrominance rate-of-change signal is applied through a type-B threshold 47(A) to the numerator input of ratio circuit 46(A). The output of the ratio circuit is the inferred step highs control signal $N_s$ as defined above.

The control signal from generator 40 is applied, through switch 31 to modulator 43 where, when enabled by switch 31, it modulates the Y' highs provided by band splitter 42, to produce inferred high frequency step correction components. The inferred components are generally designated $C_H'' - Y_H'$ and are additively combined in 48 with signals $Y_H'$, $Y_L'$ and $(C' - Y')_L$ for the specific color to produce $C'' = C_H'' + C_L''$. In accordance with conventional matrixing methods, alternative forms may be utilized to matrix $(C_H'' - Y_H')$ from two chrominance axes to produce three color components in accordance with the conventional matrix equation, $\Sigma A_c(C'' - Y') = 0$, which is thus used for matrixing of inferred chrominance highs as well as received chrominance lows.

The inferred independent highs mode correction circuitry comprises band splitter 42, independent highs correction control signal generator 41 and modulator 43. The monochrome lows from band splitter 42 are applied through type-A threshold 45(B) to the denominator input terminal of ratio circuit 46(B). The chrominance lows from the receiver are applied to the numerator terminal of the ratio circuit through type-B threshold 47(B). The output independent highs control signal, $$N_I = (C' - Y')_L / Y_L'$$

is applied through switch 31 to modulator 43. When the independent highs control signal generator is enabled by switch 31, the modulator 43 produces inferred independent high frequency chrominance correction components $(C_H'' - Y_H')$ defined by $$(C_H'' - Y_H) = Y_H \frac{(C' - Y')_L}{Y_L} = Y_H N_I$$

These correction components are combined with the signals to be displayed in summing circuit 48' or comparably as stated above.

The form of mode decision circuit 32 as illustrated here comprises signal comparison and normalization means 33 and signature evaluation and control signal generator 34. Circuit means 33, which can respond to signal components indicative of either steps or independent highs, receives portions of the monochrome signal representative of the Y' highs and the Y' lows, compares their relative values and produces a comparison signal indicative of the preferred operation of step mode or independent mode for the inferred highs. In this specific embodiment, an integrated monopolar measure, $Z_H$, of the monochrome highs is compared with a monopolar measure, $Z_L$, of the time rate-of-change of the monochrome lows in ratio circuit 46(C). Specifically, the monochrome lows from band splitter 42 are applied to differentiator 44(C); the resulting lows rate of change signal is rendered of positive polarity in squaring circuit 43; and the result is applied to the denominator input terminal of ratio circuit 46(C). The monochrome highs signal $Y_H''$ is applied to time integrator 55 for integrating the square thereof over a time interval $T_D$, and the integrated output is applied to the numerator terminal of the ratio circuit 46(C). Because the integrator has a nominal time delay of $T_D/2$, the time advanced $Y_H''$ signal is used rather than the $Y_H'$ signal. The result is to bring the integrator output into time coincidence with $Y_L'$ as well as with $(C'-Y')_L$ and $Y_H'$.

The output $Z_I$ of ratio circuit 46(C) provides a measure of the independent highs content of the received signal. Signal $Z_I$ is applied to mode switch control signal generator 34 which generates switch control signal $\beta_I$ of unity value when $Z_I$ exceeds an empirically selected threshold level and of zero value when $Z_I$ is below the threshold level. Signal $\beta_I$ is applied to electronic mode switch 31 which, in response, provides to modulator 43 a composite control signal of the form:

$$\{\beta_I N_I + (1-\beta_I) N_S\}$$

When $\beta_I$ is unity, corresponding to the detection of significant independent highs the control signal equals $N_I$ and when $\beta_I$ is zero, it equals $N_S$.

Thus, by selecting switch 31 to maintain the step correction mode normally on, the system will have a quiescent mode of operation in which the step correction mode is normally operable. But during any period of time which $Z_I$ exceeds a predetermined threshold, $\beta_I$ approaches unity and the switch transfers operation to the independent highs correction mode.

This operation illustrates Mode 6 of Table 2. Alternatively, by using an output complementary to that of element 34, the operation can be modified to Mode 4. Use of other mode decision circuits described herein to provide switch control signals $(\beta_s)$, $(1-\beta_s)$, $(\beta_I)$, $(1-\beta_I)$, $[[\beta_s]]$, or $[\beta_s]$ and $[\beta_I]$ can provide operation in Modes 4, 5, 6, 9, 10 (single band) and 11 (single band) of Table 2.

In the receiving system of FIG. 3, mode decision circuit 32 provides wideband mode decision control. Thresholds 47(A) and 47(B) effectively apply a concurrency constraint whereby it is necessary that a received component of chrominance lows supplied to 47(B) or the signal representing the rate-of-change of chrominance lows supplied to element 47(A) exceeds a selected threshold in order for relevant inferred chrominance highs to be activated.

(d) Transfer Characteristics of Illustrative Circuit Elements (FIG. 4)

FIG. 4 illustrates the transfer characteristics of the main circuit components used in the embodiment of FIG. 3. FIG. 4(A), for example, illustrates the transfer characteristic of the differentiating circuits 44, which can preferably be a combination of short delay line and a subtraction circuit for measuring the difference between the input at time $(t+\Delta t)$ and the input at time t for a delay $\Delta t$ which is small compared to the reciprocal of the input signal bandwidth. This is in accordance with the normal mathematical definition of a derivative. Transfer characteristics illustrative of type-A and type-B thresholds 45 and 47 are defined in FIGS. 4(B) and 4(C), respectively. The type-A element of FIG. 4(B) represents a generalized bipolar or polarity sensitive translator which includes a threshold, that is defined in location by the parameter $A_o$ and in sharpness by the exponent A. Below the threshold it translates polarity at limit amplitude $A_o$, but above the threshold, in either polarity it approaches linear translation and equality of input to output. The type-B element of FIG. 4(C) represents a generalized bipolar or polarity sensitive translator which also has a threshold defined by $B_o$ and a sharpness defined by an exponent B. Below the threshold the output is small or zero, and above the threshold, for either polarity, it approaches linear translation and equality of input to output. The transfer characteristics of the ratio circuit 46 are stated in FIG. 4(D). The transfer characteristics of switch control generator 34 which are defined and illustrated in FIG. 4(E) generally provide a monopolar monotonic translator with a threshold and a slope, and output values of zero or unity as indicated by the equation.

FIG. 4(F) shows an exemplary form of basic linear filter applicable for functional or circuit definition of band splitter 42 as used herein. The Y' signal is shown applied to tapped delay line 50. The summed tap outputs from 51 provide $Y_L'$. Y' at a comparable delay is derived from an appropriate tap on delay line 50. $Y_L'$ is subtracted from Y' in difference amplifier 52 to provide a complementary $Y_H'$ signal. Alternative taps, appropriately centered and summed can conventionally provide any of the other needed signals derivable from Y'.

FIG. 4(G) illustrates a means for effectively implementing element 55. A similar tapped delay line provides inputs to squaring circuits 53, the outputs of which are summed in 54 to approximate the particular integral shown. Any desired gain constant may be provided in 54. While square law signal processing is illustrated in circuit 55, it is not so restricted in operation.

(e) Waveforms Pertinent To Mode Decisions (FIG. 5)

In order to illustrate the structure and operation of the mode decision signal processing circuitry, it is useful to consider time waveforms pertinent to typical decisions as they appear in various signal processing circuits. Specifically, it is useful to examine certain waveforms as they appear during a step transition epoch, or as they appear during the existence of dominant independent highs. Generally the step related waveforms are specific and represent (for any signal bandwidth) waveforms fully identifiable in amplitude, shape and polarity. These are illustrated in FIG. 5(A). Waveforms related to measurement of independent highs in the wideband Y' signal can take many forms and it is useful to use measures which exceed a threshold either over a period or essentially constantly except for zero-crossing points, when dominant independent highs are present. Therefore, as shown in FIG. 5(B) independent highs waveform illustrations are conveniently represented by the characterizations shown for illustrative waveforms at specific circuit points.

FIG. 5(A) shows two frequency passband figures designated (1) and (2), and four columnar groups of time waveforms as they appear during step transitions. Column I illustrates basic waveforms numbered (3)–(7). Column II illustrates waveforms numbered (8)–(10) resulting from alternative frequency filtering. Column III illustrates waveforms numbered (11)–(14) useful in mode decision processing; and Column IV shows waveforms numbered (15)–(18) pertinent to correction in a plurality of portions of the $Y_H'$ band.

The plural portions will be more fully described in connection with FIG. 12, which illustrates relevant passband shapes for separation of the $Y_H'$ passband into at least two frequency regions. Those shown are consistent with minimization of time spreading and this feature appears in the waveforms of FIG. 5(A).

Referring now to the frequency passbands shown in passband FIG. 5(A) (1), the $Y_L'$ passband, as illustrated, has a nearly cosine-squared tapered shape and approaches zero at frequency $f_1$. The Y' passband as illustrated has a generally similar tapered shape but a substantially higher bandwidth, consistent with low timer dispersion, and $Y_H'$ is illustrated as the difference between the bands of Y' and $Y_L'$. Also illustrated are an intermediate bandwidth signal $Y_1' = Y_{H1} + Y_L'$ and an alternatively shaped Y' having a more nearly square frequency response.

In passband (2) of FIG. 5(A), there are again shown the frequency passband of $Y_L'$ and an additional passband for a signal $Y_H''$, which is constrained (a) not to overlap the band of $Y_L'$, and (b) not to have a sharper slope with frequency than $Y_L'$. A third passband of $Y_H''$ shown dotted has the former constraint but not the latter.

Referring now to the waveforms of Column I, waveform (3) represents the component $Y_L'$ during a positive step transition, and waveform (4) represents d/dt ($Y_L'$) during the same step. Waveform (5) represents the alternating bi-polar transition component $Y_H'$ and also shows the narrower band transition component $Y_{H1}'$. Waveform (6) represents d/dt ($Y_H'$) and d/dt ($Y_{H1}'$), and waveform (7) represents $d^2/dt^2(Y_1')$. The waveforms in this column and in the remaining columns of FIG. 5(A) are all shown during the transition epoch, $T_s$ of a step transition.

It is important to note that because $Y_H'$ and $Y_{H1}'$ tend toward zero both at the beginning and the end of the transition epoch, a time gate which merely enables the basic inferred step highs correction signal to pass through for a period of approximately $T_s$ need not have critical timing requirements such as may be applied for timing or keying which defines the specific position of the central transition slope of $Y_H'$.

Referring to the waveforms in Column II, waveform (8) the alternative $Y_H'$, can have a larger amplitude than $Y_H'$ in the transition region near the step. Waveform (9), corresponding to $Y_H''$, is generally constrained to the epoch $T_s$ by the slope constraint. Waveform (10) for $Y_H''$ can spread out and occupy a longer time.

Waveforms having the characteristics of (8) appear in the monochrome channels of some receivers which use edge enhancement in the monochrome channel. in addition to the fact that such signal processing does not conflict with the use of the basic algorithms, they are fully compatible with mode decision circuit means herein. Also, when a restricted band signal such as $Y_{H1}'$ is used for mode decision purposes the additional components in (8) tend to be suppressed.

It is a distinguishing and separating feature among step mode decision circuits that some respond over a step epoch such as $T_s$, while others respond over a longer period of time. Those which occupy the minimum time are preferable. Differences in absolute time delay also exist in processing as will be shown.

Mode decision circuits illustrated here which respond to wideband Y' signals and which derive mode decision information concerning possible applicability of keying, enabling or disabling of inferred chrominance algorithms in accordance with step mode or independent mode algorithms or combinations of or variations of these as described herein have certain characteristic features. As shown by the circuit forms presented here, these mode decision circuits perform signal processing operations including signal comparison and normalization, which is effectively followed by signal or signature evaluation.

Such circuits can use one or more ratio signal waveforms, referred to as mode decision waveforms and during step transitions these take forms such as those shown in Column III. Waveforms (11) are designated $\rho_{11}$ and are illustrated for two different bandwidths of $Y_H'$ useable for decision purposes. Waveforms (12) are designated $\rho_2$ and are similarly illustrated for two bandwidths. Waveforms (13) are obtained with use of the $Y_H''$ signal component illustrated as waveform (9). Waveforms (14), shown for two bandwidths of $Y_H'$, are designated $\rho_1$. The subscript A on the denominator terms indicates a preferred but not absolutely necessary processing method which constrains the denominators to non-zero values, while permitting the ratios to go to zero.

It can be seen that waveforms (11), (12), (13), and (14) are not dependent on the polarity or direction of the step.

A step transition of any bandwidth is fully defined in these ratio waveforms in terms of the following characteristics:
(1) shape,
(2) polarity,
(3) amplitude, and
(4) timing.

Thus the existence of a step can be determined from separable portions of the wideband Y' signal and can be confirmed by the concurrent existence of color-space-rate or chrominance rate components.

Column IV shows waveforms relevant to step existence determination in the passband corresponding to the signals $Y_{H2}' = Y_H - Y_{H1}'$. These are relevant to mode decision and control for a plurality of signal components as discussed with regard to FIG. 12. Waveform (15) shows the basic waveform for a step such as illustrated in (5). Then (16), (17) and (18) represent ratio waveforms when modified waveforms $\rho_{11}, \rho_2$ and $\rho_1$ are derived from $Y_{H2}'$ instead of $Y_H'$ or $Y_{H1}'$. These waveforms may be seen to be constrained in time as well as in frequency. Their existence may be evaluated with circuit means comparable to those used for the waveforms of Column III.

The decision as to whether independent highs exist can be based on a measure of a ratio proportional to $Y_H'$, which must exist in substantial relative amplitude in order for the independent highs to be significant, and a measure showing chrominance components $(C' - Y')_L$ to be concurrently in existence. Further, since the independent highs are highs at or about some local color, as compared to transitions between two colors, it is appropriate to also require that d/dt $(C' - Y')_L$ be concurrently relatively small. However, since only the Y' signal is fully available at the receiver without bandwidth restriction, the scaled reference ratio $\rho_{11} = Y_H'/d/dt Y_L'$ , may be used, or a reasonable measure of the state of existence such as $(\rho_1)$ or $\rho_{11}$, the concurrent existence of local, non-zero chrominance $(C'-Y')_L$ may be used as automatic or thresholded confirmation and control.

Thus, the same forms of decision circuits used in determining applicability of step mode algorithm operation can be used for controlling the independent mode algorithm operation but subject to specific different criteria. This applies generally to the use of measures based on a signal representative of $Y_H'$ as measured relative to a signal derived from d/dt $Y_L'$. This does not preclude the use, within the inferred independent highs generator, or inconcurrence therewith, of signal measures different from those used in inferred step mode control. For example, independent mode may be disabled when $Y_H'$ is excessively large compared to $Y_L'$. Alternatively, a form of inferred independent highs may be controlled by the ratio of a measure of $Y_H'$ to one or more measures of chrominance lows.

Composite measures based on a plurality of components derived from Y' may also be used. Specifically, if a measure of the high frequency content of any locally separable portion may be shown to exist and be significantly different from a step, the measure may be used to enable independent highs.

In the case of independent highs common measures may be expected to exceed a threshold. Where a direct linearly processed waveform ratio is used. This measure may be exceeded except at (or very close to) the zero amplitude points of signal $Y_H'$. The exception is of little consequence because first, $(C_H'' - Y_H')$ goes to zero also, by the basic algorithms, and second, while amplitude threshold devices may exhibit very short spikes or short impulses during these intervals, these spikes are easily removed by a number of conventional circuit means, or may be so short that switching elements may not respond to them at all.

FIG. 5(B) illustrates output waveforms for several of the mode decision circuits of subsequent Figures.

In FIG. (B) a randomly located time scale is provided to indicate possible duration of epochs of time duration $T_s$. Curves (a) and (b) show possible spikes out of bi-level translators 71(A) and 71(B) of FIG. 7. These are interleaved in time because relevant components derived from $Y_H'$ are in quadrature as explained. The short spikes are easily removed by short pulse rejection or pulse-width discriminator circuits of conventional form. Curves (c), (d) and (e) represent non-linearly integrated measures as processed by essentially bi-level devices 91(A) and 91(B) of FIG. 8 and 96 of FIG. 9 in the presence of independent highs or the absence of highs. Curves (f) and (g) similarly relate to FIG. 10 and specifically to possible outputs from elements 101 and 102 thereof.

Thus the components of Y' have a variety of recognizable features that are relevant to control of step mode and also to control of independent mode of operation of inferred luminance highs.

The circuit means and methods shown herein can use these recognizable features to provide available circuit means to ensure that a specific signal mode exists when signal conditions so determine.

(f) Wideband Mode Decision Circuits (FIGS. 6–10)

Wideband mode decision circuits applicable as element 32 of FIG. 2(C) and in other embodiments described herein are illustrated in FIGS. 6, 7, 8, 9 and 10. These circuits each show means and methods for deriving control signals of the basic forms $\beta_s$, $1-\beta_s$, $\beta_I$, $1\beta I$, or $[[\beta_s]]$ as described in Table 2 and in connection with the various embodiments described herein. Controls $[\beta_s]$ and $[\beta_I]$ may be produced by concurrent measurements in accordance with the principles discussed with regard to elements 35 and 36 of FIG. 2(C).

Figure 7:
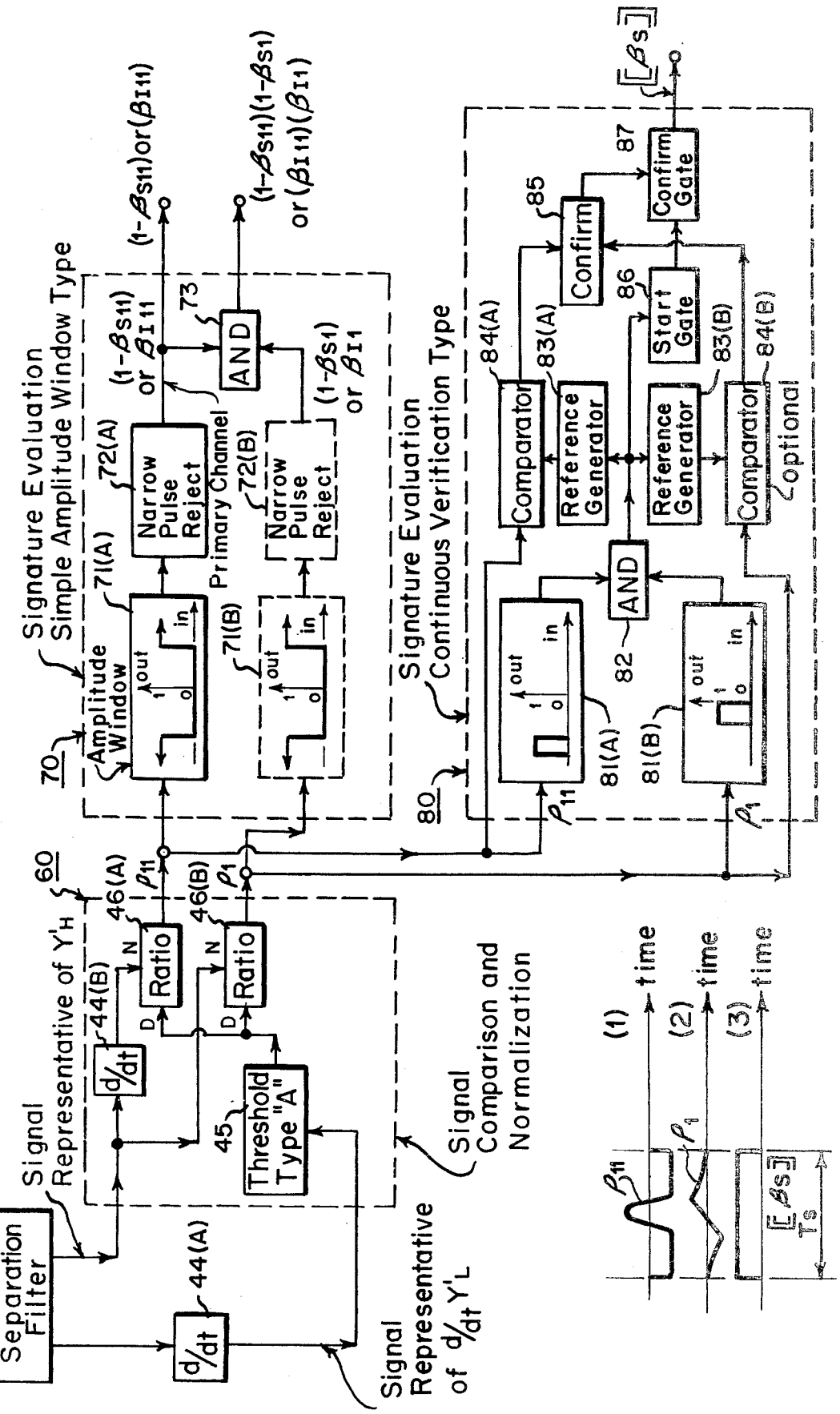
Figure 8:
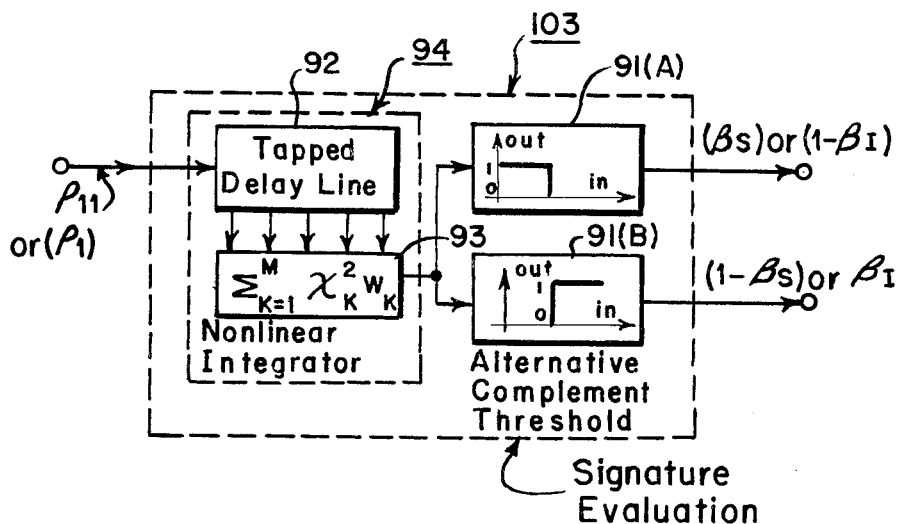

Specifically in FIG. 6, circuits 60 and 61 together perform the functions of element 32, while addition of elements 67 and optionally 68 provide additional forms of element 32. In FIG. 7, circuits 60 and 70 and 80 perform the functions of element 32. Element 32 may also be comprised of an element 60 plus an element 103 as shown in FIG 8; elements 104 and 105 shown in FIG. 9; or element 60 plus element 106 shown in FIG. 10.

In order to illustrate the relative performance of the wideband mode decision systems of FIGS. 6, 7, 8, 9, and 10, the waveforms specifically have been restricted to a small group. In regard to FIGS. 6 and 7, the same waveforms are used for specific purposes of circuit comparison.

The embodiment of FIG. 6 can provide a reliable detection of the existence and timing of a step characterized by the $\rho_1$ component of the basic step mode algorithm. The summed square difference circuit shown is one form of measure which tends to null only in the presence of the selected waveform at the correct timing. Thus it recognizes the step and rejects independent highs or noise in determining $[[\beta_s]]$. Any signal ratio which has a specific characteristic shape, amplitude and polarity at a time defined by step occurrence when $\rho_1$ has its characteristic shape, amplitude and polarity may be comparably used.

In a null or integrated monopolar difference type detector of which 61 (FIG. 6) is one illustrative form, any of the waveforms $\rho_1$, $(\rho_1)$, $\rho_{11}$, $\rho_2$ or others uniquely related may be comparably used. However there are differences in other circuits which approximate or are less restrictive on signal measures.

Specifically in FIg. 7, circuit 70 can be used in place of element 61 of FIG. 6 or in place of elements 61, 67 and 68 of FIG. 6, as will be explained in further detail. In this mode of operation, circuit 70 can provide a step mode disabling signal of general form $(1-\beta_s)$ or an independent mode enabling signal of general form $\beta_I$, or complements to either or each. Here $\rho_{11}$ and $(\rho_1)$ are preferred forms and $\rho_1$ is shown as a secondary or concurrence waveform. Verification circuit 80 can utilize the same waveforms to produce $[[\beta_s]]$. Thus the choice of $\rho_{11}$ in FIG. 6 is to simplify operational comparison with FIG. 7.

Figure 9:
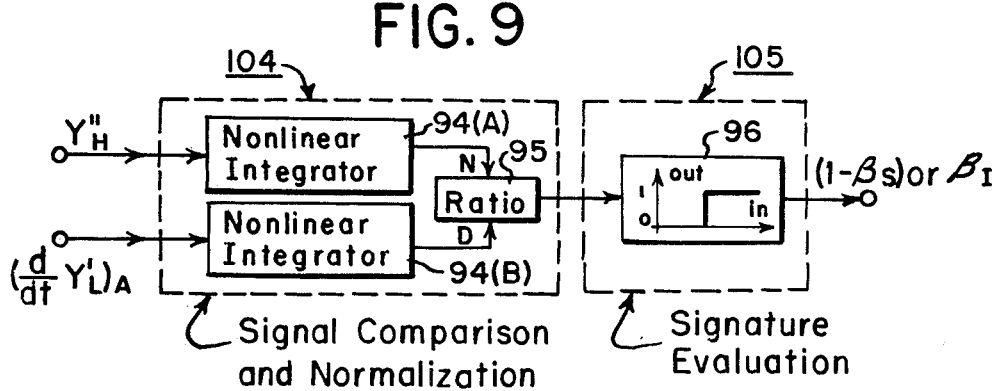
Figure 10:
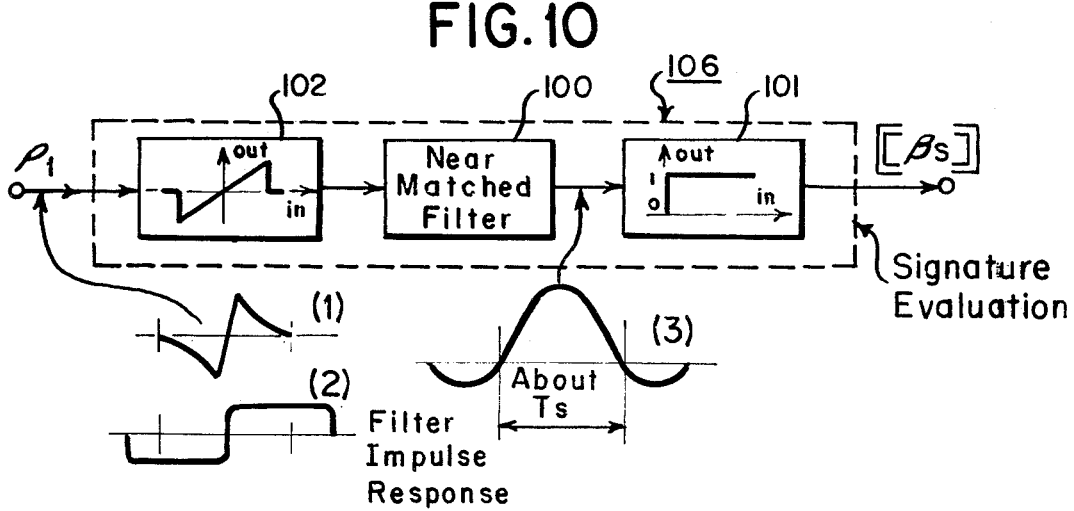

FIGS. 8, 9 and 10 illustrate other processors which are responsive to a first component derived from $Y_H'$ and a second component preferably representative of $(d/dt)Y_L'$ but alternatively derived therefrom to provide measures representative of the applicability of inferred chrominance mode controls for modes of operation comparable to those described in Table 2.

FIG. 6 then illustrates one preferred form of mode decision circuit for generation of step time keying signals of the type $[]\beta_s]]$. It comprises signal comparison and normalization circuit 60 responsive to components of the received monochrome video signal Y' for processing one or more normalized comparison signals where in steps appear as substantially universal waveforms hving specific characteristic features. Evaluation circuitry 61 responsive to these comparison signals is utilized to determine the presence of absence of these specific characteristic features and thus determine the desirability of enabling, disabling or keying an inferred step correction circuit or an inferred independent highs correction circuit in accordance with the invention.

In the specific decision circuit of FIG. 6, the received monochrome signal Y' from preceding portions of the receiver (not shown) is separated in band splitter 42 into a low frequency component representative of $Y_L'$ and a high frequency portion representative of $Y_H'$. The low frequency component representative of $(d/dt)Y_L'$ generated by 44(A) comprises a dynamic signal derived from $Y_L'$ which does not include the DC component thereof and preferably is not spread in time. Signals meeting these requirements include $(d/dt)Y_L'$, which is preferred, and alternative signals derivable therefrom such as $$\frac{d^2}{dt^2} Y_L, \text{ or } \sum_{K=1}^{M} A_K \frac{d^k}{dt^k} (Y_L)$$

where M is desirably a low integer.

The $Y_H'$ signal, which has no DC component, is otherwise similarly constrained. Signals meeting such requirements include:

$$Y_H, \frac{d}{dt} Y_H, \frac{d^2}{dt^2} Y_H, \text{ or } \sum_{K=1}^{M} A_k \frac{d^k}{dt^k} (Y_H)$$

Where $Y_H'$ is replaced by a $Y_H''$ or another signal constrained not to frequency overlap with the band of $Y_L'$, any pair may in principle be used, although low order derivatives are preferred. When $Y_H'$ is not so constrained it is desirable that the phase characteristics be colinear as in the cases illustrated. The step decision bandwidth for $Y_L'$ is not constrained to be precisely comparable to that of the chrominance $(C'-Y')_L$.

The Y' highs and lows may then be applied to comparison and normalization circuit 60 for processing of one or more normalized comparison signals. In the embodiment shown, $$\rho_{11} = \frac{d/dt(Y_H)}{d/dt(Y_L)}$$

is processed as the primary decision signal and optionally $$\rho_1 = \frac{Y_L}{d/dt(Y_L)}$$

is used as a quadrature supplementary signal. In the alternative circuits where $\rho_1$ is used as a single or primary decision signal, the non-overlapping passbands shown in FIG. 5(A), (2) are desirable to provide ($\rho_1$).

In circuit 60, signal $[(d/dt)Y_L']$ from differentiating circuit 44(A) is applied, through a type-A threshold 45, to the denominator inputs of ratio circuits 46(A) and 46(B). The Y' highs in one branch are applied in the primary circuit through differentiator 44(B) to the numerator terminal of ratio circuit 46(A). Also, optionally, the Y' highs are applied to the numerator input of ratio circuit 46(B). The respective outputs of ratio circuits 46(A) and 46(B) are the normalized comparison signals $\rho_{11}$ and $\rho_1$, respectively. $\rho_{11}$ is applied to evaluation circuit 61.

The evaluation circuit shown is a signature evaluation circuit responsive to a normalized comparison signal for ascertaining the time of occurrence of a waveform characteristic of a step. The specific evaluation circuit shown is a summed-square-difference detector comprising a tapped delay line 62, a source of reference voltages 63, a plurality of subtraction circuits 64, and a combined summing and squaring circuit 65 which performs the functions of elements 53 and 54 of FIG. 4(G). Preferably delay line 52 has a nominal total delay time of $T_s$ corresponding to the time epoch of transitions related to a relevant chrominance bandwidth.

In operation, the comparison waveform $\rho_{11}$ is applied to tapped delay line 62, which, in turn, provides a plurality of discrete outputs, separated by time differentials which are small compared to $T_s$ such as less than $(f_1/f_w)T_s$. These plural outputs are subtracted from respective reference level amplitudes characteristic of a step provided by reference voltage source 63 in a plurality of difference circuits 64, and the summation of the squares of these respective differences is computed in circuit 65.

When a step is centered in the delay line, the summed square output of circuit 65 will approach zero, a condition which can be used to activate keyed time gate 66 to provide a step timing pulse designated [[$\beta_{s11}$]] with a precise time delay of $T_s$. The double brackets indicate a timed enabling signal as compared to a long term modal acceptance state. Here, the numerical subscripts are placed inside the brackets to identify the reference waveforms whereas in Table 2 the subscripts are placed outside the parentheses or brackets to identify the relationship to particular frequency bands.

It should be noted that precise centering of an enabling gate is not critical to the operation of the inferred high frequency step correction circuitry because the inferred step chrominance highs tend, as previously illustrated, toward zero at both the beginning and the end of the period $T_s$. The triggering of a waveform generator however, requires greater precision of timing. circuits Optionally, a similar signature evaluation circuit 67 may be utilized to provide concurrent confirmation by evaluation of another waveform such as $\rho_1$. Such a circuit provides a second step timing pulse designated [[$\beta_{s1}$]], and the requirement of concurrence of the two pulses is established by an optional AND gate 68, which generates a concurrent step timing pulse designated [[$\beta_{s11}\beta_{s1}$]].

The waveforms on time scales (1) and (2) of FIG. 6 show the relative timing of the $Y_H'$ output, the delayed $Y_H''$ in $(C_H''-Y_H')$ and the position of the keyed time gate. The time delay can be reduced at the cost of a potential reduction in decision reliability by using a shorter delay line of duration $T_s/M$, where M is greater than one. In the limit, there can be only one effective time sample, and the delay can be made vanishingly small. This approach leads to the signature evaluation circuits of FIG. 8 which have substantially no time delay. These circuits are also free of time spreading in that the entire decision process is constrained to within the time epoch $T_s$.

The decision circuit of FIG. 6 has the further property that in severe thermal noise at marginal signal levels the sum of squared differences may be of sufficient magnitude to automatically turn off the band-widening inferred chrominance signals.

FIG. 7 illustrates alternative mode decision circuits comprising a signal comparison and normalization circuit 62 substantially identical to that described in connection with FIG. 6 and a pair of substantially delay-less evaluation circuits 70 and 80. Normalized comparison signals $\rho_{11}$ and $\rho_1$ from circuit 60 are each applied to evaluation circuits 70 and 80.

Evaluation circuit 70, which can be characterized as an amplitude window type, receives at least one comparison signal such as $\rho_{11}$ and evaluates it for an amplitude compatible with or incompatible with a step by application to amplitude window 71(A). This window advantageously produces a unit output signal for input amplitudes in a range in excess of the step compatible amplitude range and zero output for input amplitudes within the range that is incompatible with step presence. A pulse width discriminator circuit 72(A) is advantageously provided to reject very narrow spikes in the amplitude window outputs, and the resulting output signal for the $\rho_{11}$ channel is a disabling signal, indicative of a condition contrary to presence of a step, which can be designated $(1-\beta_{s11})$ or $(\beta_{I11})$.

Advantageously, a second comparison signal such as $\rho_1$ is concurrently processed by amplitude windows 71(B) and discriminator 72(B) in order to produce a second step disabling signal designated $(1-\beta_{s1})$. The two disabling signals can then be applied to an optional AND gate 73 to produce a joint or concurrent step disabling signal $(1-\beta_{s11})$, $(1-\beta_{s1})$ or $(\beta_{I11})$ $(\beta_{I1})$.

Alternatively, it is feasible to process the complement of one of the outputs of circuit 70, e.g., $[1-(1-\beta_{s11})]$ for step enabling or use a completely complementary circuit.

The evaluation circuit 80, which can be characterized as a continuous verification type, uses a pair of comparison signals such as $\rho_{11}$ and $\rho_1$ to generate an enabling signal [[$\beta_s$]] when the rspective amplitudes of $\rho_{11}$ and $\rho_1$ are within the amplitude window ranges shown. As can be seen by reference to time charts (1), (2), and (3) and amplitude windows 81(A) and 81(B), $\rho_{11}$ and $\rho_1$ are within these amplitude ranges concurrently, for step transitions, only during the initial intervals, at which time $Y_H'$ and the corresponding $C_H''-Y_H'$ have been shown to be near zero, so that error in timing is not critical. Specifically $\rho_{11}$ and $\rho_1$ are applied to respective amplitude windows 81(A) and 81(B) chosen to provide unity outputs only when the respective signals have the step characteristic related concurrent amplitudes shown. The amplitude window outputs are applied to AND gate 82 which produces an output for concurrent input signals.

Comparison of one or both input signals with generated references waveforms controlled by AND gate 82 can be used to confirm the existence of a step. Specifically, the AND gate output can be used to activate reference waveform generators 83(A) and 83(B) for generating waveforms similar to the $\rho_{11}$ and $\rho_1$ step characteristic waveforms shown in time charts (1) and (2). The respective signals received are compared against these reference waveforms in comparators 84(A) and 84(B), respectively, and the respective comparator outputs are applied to confirmation circuit 85 for confirming the concurrent detection of step characteristic waveforms. In its simplest form, circuit 85 can comprise a simple AND gate.

The output of AND gate 82 also keys a start gate 86 of pulsewidth up to $T_s$ which is applied to a confirmation gate 87 responsive to the output of confirmation circuit 85. The output of confirmation gate 87 is a step timing and enabling pulse [[$\beta_s$]] having a duration which continues so long as waveform shape is confirmed.

Alternatively, the continuous verification circuitry can be combined with a limited multi-sample circuit such as a foreshortened form of detector circuit 61 used in FIG. 6, to derive mode decision circuits having various time delays from zero to $T_s$ and based upon various numbers of signal sample points. Specifically, the pair of amplitude windows 81(A) and 81(B) and the AND gate 82 can be replaced by a short, multitap, delay line and sum of squared differences threshold of the type shown in FIG. 6.

Because the step signal has a known shape, amplitude and polarity, it is easily recognized. Independent highs may have many forms and are most simply treated in mode decision circuitry by other dominant features. However, specific shapes of independent highs can be recognized by use of null type waveform recognition circuit means and methods such as those illustrated in element 60 of FIG. 6, and as approximated in element 80 of FIG. 7. Thus a minor extension of waveform recognition circuits may be achieved by using supplementary independent highs recognition circuits for waveforms where independent highs may exist such that $\rho_1$ or representative measures thereof may actually be in the amplitude range characteristic of a step, but the $Y_H'$ components may be generally of opposite polarity to or generally in quadrature with those of a step. A control signal [[$\beta_I$]] could then optionally be similarly generated and applied.

FIG. 8 illustrates an alternative signature evaluation circuit comprising a non-linear integrator 94 for obtaining an integrated monopolar measure of a comparison signal and a threshold 91(A) and 91(B) for determining whether or not the integrated value is less than a selectable threshold level indicative of possible presence of a step or exceeds a threshold level indicative of independent highs. Specifically, the integrator comprises a tapped delay line 92 for receiving a comparison signal such as $\rho_{11}$ or $(\rho_1)$ and producing a plurality of K outputs at small time differentials. The plural outputs are applied to a squaring and summing circuit 93 for producing an output signal of the form $$\text{Output} = \sum_{K=1}^{M} X_K^2 W_K$$

wherein $X_K$ is the signal at the $K^{th}$ tap and $W_K$ is an amplitude weighting coefficient. When the time intervals between successive delay line outputs are small compared to one-half of the maximum signal frequency, this sum closely approximates an integral. Non-linear translators with other than square law transfer characteristics may also be used.

The output of squaring and summing circuit 93 is applied to threshold 91(A) which is an amplitude window. Amplitudes of less than a preselected value are compatible with a step and produce an enabling signal $(\beta_s)$ or $(1-\beta_I)$. The output of circuit 93 can also be applied to a complementary amplitude window 91(B). An output signal from this window is indicative of a condition incompatible with a step but compatible with independent highs, and can be used as a step disabling signal $(1-\beta_s)$ or as an independent highs enabling signal $(\beta_I)$.

FIG. 9 illustrates an alternative evaluation circuit using a pair of non-linear integrators 94(A) and 94(B) for effecting non-linear integration of components of $Y'$ before signal comparison and normalization in ratio circuit 95. In this example, the $Y''$ highs and the rate of change of the $Y'$ lows, respectively, are integrated and compared. The output of ratio circuit 95 is then applied to amplitude window 96 for determining whether or not it exceeds an empirically preselected value indicative of a condition contrary to the presence of a step. In this example, the amplitude window produces a disabling signal $(1-\beta_s)$ when the ratio of integrals exceeds a preselected level.

It should be noted that the delay epochs of the non-linear integrators 94(A) and 94(B) need not be equal. For example, the integrator of $Y_H''$ can have a longer delay epoch than that of $d/dt(Y_L')$, as was illustrated in FIG. 3.

FIG. 10 illustrates alternative evaluation circuit comprising limited range translator 102, a near-matched filter 100 and a complementary threshold amplitude window 101. The operation of this circuit can be illustrated by reference to an exemplary $\rho_1$ input signal and the waveforms illustrated in time charts (1), (2) and (3) which show a $\rho_1$ step characteristic waveform, the impulse response of filter 100, and the filter output for a $\rho_1$ step waveform respectively. As can be seen, the filter 100 then provides a strong positive output pulse for the central region of duration about $T_s$, with leading and lagging negative sidelobes. Window 101 detects the positive region and provides a step timing and enabling signal [[$\beta_s$]].

The evaluation circuits illustrated in FIGS. 8, 9 and 10 all incur delay and have inherent time spreading, whereas circuits in FIGS. 6 and 7 do not. With appropriate delay adjustments for concurrency, various forms can be combined to provide composite mode decisions with conventional switching circuitry. Waveforms at key points in these circuits relevant to independent highs are illustrated in FIG. 5(B).

(g) Mode Decision Control System Utilizing Plural Concurrent Mode Decision Signals (FIG. 11)

Figure 11A:
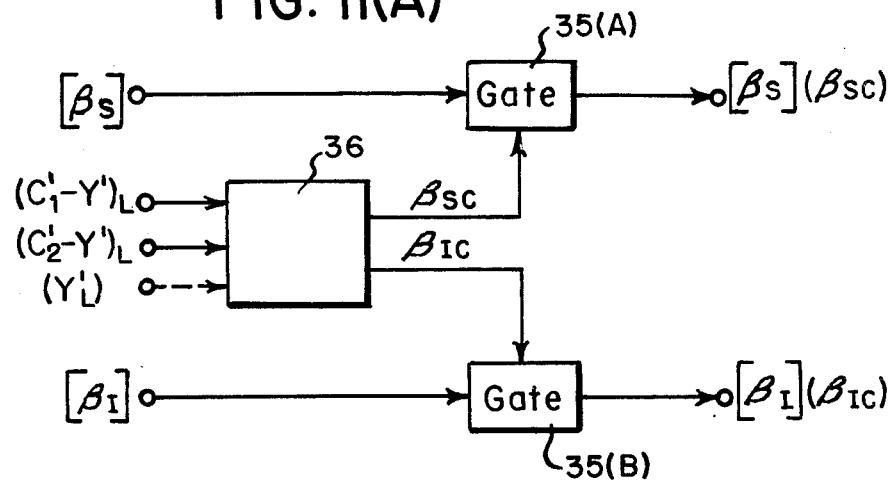
FIGS. 11(A)-(C) are simplified functional diagrams illustrating the operation of mode decision circuits concurrently responsive to monochrome and chrominance signal components.

FIGS. 11(A), (B) and (C) are block functional diagrams illustrating the operation of a mode decision system utilizing a plurality of signal components derived from both the wideband monochrome signal and components derived from the chrominance lows to provide increased decision reliability. Element 36 illustrates a multi-dimensional color space theshold suitable for use in the generalized mode decision and control system shown in FIG. 2(C) to generate concurrent mode decision signals $\beta_{SC}$ and $\beta_{IC}$. As shown, element 36 has a pair of non-linear matrices 36A and 36B the inputs of which are supplied with chrominance signals $(C_1'-Y')_L$ and $(C_2'-Y'')_L$ and optionally with a monochrome lows signals $Y_L'$ as shown (FIG. 11C). As illustrated the respective input signals to 36B are supplied through differentiating circuits 44B and 44A. Matrix 36B processes these rate-of-change input signals into a non-linear combination representative of a multi-dimensional contour in chrominance rate space. The matrix circuit can, for example, process a weighted sum of squares representative of a low order contour or a more complex non-linear combination representative of a more complex contour. Matrix 36A similarly processes the input signals into a non-linear combination representative of a multi-dimensional contour in chrominance space. The output of matrix 36A is supplied to type-B threshold device 34 which generates independent mode decision signal $\beta_{IC}$. The output of matrix 36B is similarly processed by a type-B threshold element 34 to generate a step mode decision signal $\beta_{SC}$.

Figure 11B:
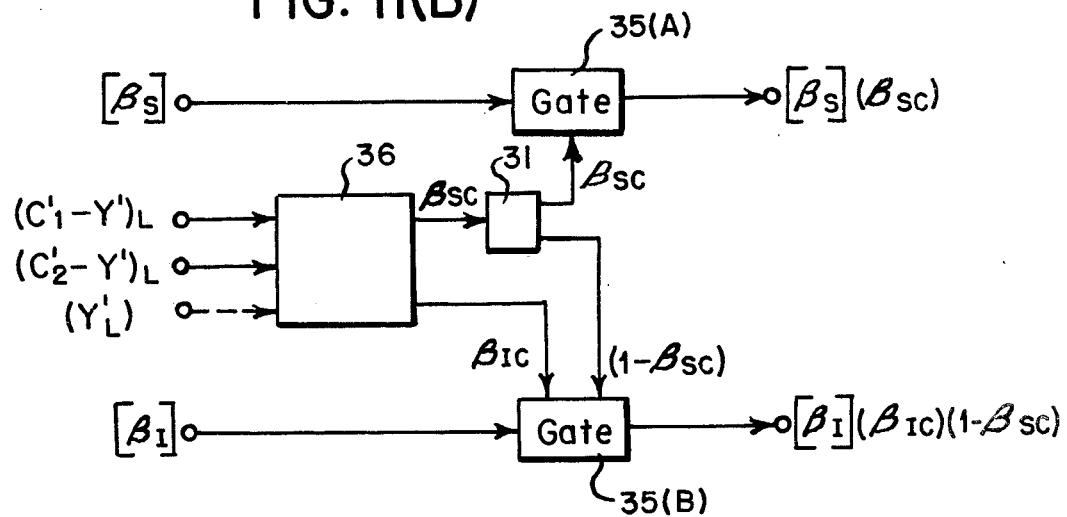
Figure 11C:
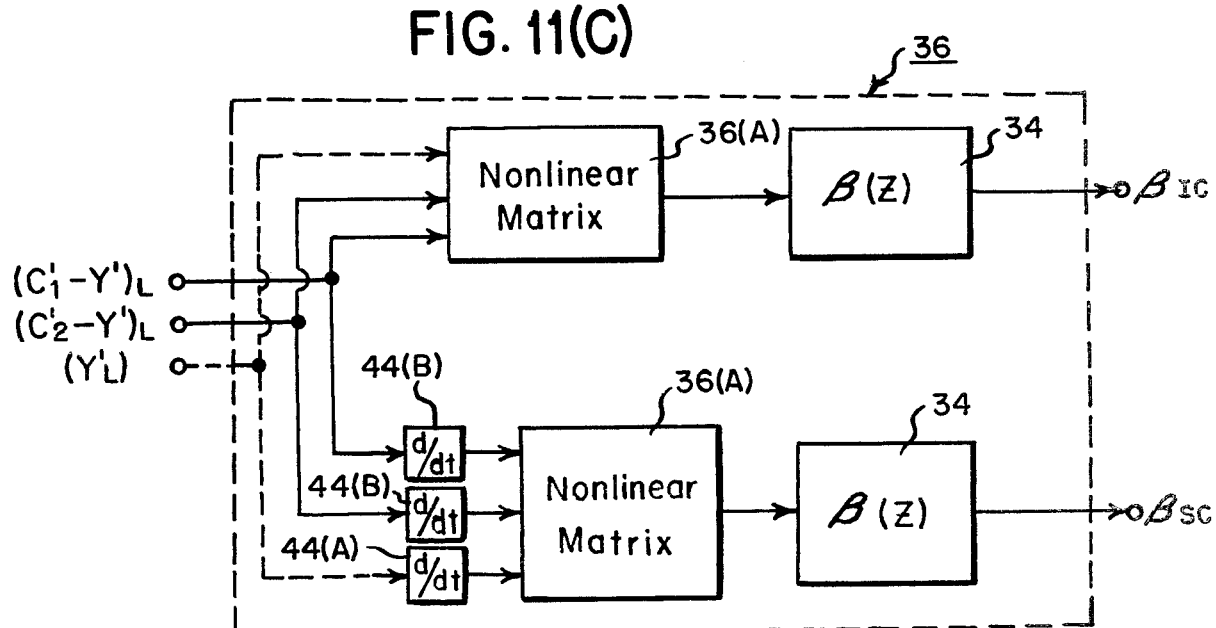

As shown in FIGS. 11(A) to (B), control signal $\beta_{SC}$ is supplied to concurrent decision gate 35A together with control signal $\beta_S$ to provide a concurrent step mode decision control signal $[\beta_S][\beta_{SC}]$. Similarly, control signal $\beta_{IC}$ is supplied to concurrent decision gate 35B with control signal $\beta_I$ to provide the desired concurrent independent mode decision control signal $[\beta_I](\beta_{IC})$. As shown in FIG. 11(B), control signal $\beta_{SC}$ may optionally be processed by switch 31 to produce a complementary output signal $(1-\beta_{SC})$ supplied as a third input to gate 35B which produces a concurrent independent mode decision signal $[\beta_I](\beta_{IC})(1-\beta_{SC})$.

(h) Equal and Unequal Band Processing Systems Including A Plurality of Frequency or Concurrent Frequency Time Components (FIGS. 12 and 13)

FIG. 12 presents illustrative passbands and FIG. 13 illustrates basic circuit configurations relevant to use of those passbands for equal and unequal band processing systems including a plurality of frequency or concurrent frequency time components.

FIG. 12 illustrates various frequency passbands of the Y' and chrominance signals pertinent to operation of multimode correction circuits in accordance with the invention. Passband diagrams in I illustrates passbands pertinent to the simple case of equiband receiver processing and single-band correction processing. Here the receiver processed chrominance signals, I' and Q' or $(C_1'-Y')_L$ and $(C_2'-Y')_L$, and the monochrome lows are all of substantially the same reduced bandwith as compared to the monochrome video signal Y'. The monochrome highs $Y_H'$ band constitutes the difference between the Y' band and the $Y_L'$ band.

Passband diagram II illustrates passbands pertinent to the case of equiband receiver processing and multiple-band correction processing. Here the chrominance signals and the monochrome lows are all of the same effective reduced bandwith as compared to the monochrome signal Y', but the monochrome highs are divided into a plurality of portions, here illustrated by $Y_{H1}'$ and $Y_{H2}'$. Mode decision circuitry can be provided for separately analyzing these separate monochrome highs portions and inferred high frequency correction signals can be separately scaled from these respective portions in the correction mode most appropriate for each portion. Thus, in appropriate instances, inferred high frequency correction components in one mode can be scaled from $Y_{H1}'$ and inferred components in another mode can be scaled from $Y_{H2}'$, and the combined correction components then added to the signal to be displayed to satisfy the dominant requirements concurrently.

Passband diagram III illustrates passbands pertinent to the case of unequal band receiver processing, with a single $Y_H'$ complementary to the $Y_L'$ for each axis. Here the receiver processed chrominance signals are of unequal bandwidth, but each is substantially smaller than the bandwith of Y'.

Passband diagram IV illustrates passbands pertinent to the case of unequal band processing, with a plurality of $Y_H'$ components for each axis. Here, for each of the chrominance axes, the Y' highs are divided into two portions designated $Y_{H1,1}'$ or $Y_{H2,1}'$ and $Y_{H2,1}'$ or $Y_{H2,2}'$. Separate mode decisions are made for each axis with respect to each high frequency monochrome portion, and separate appropriate inferred highs mode correction signals are controlled for each axis from the respective high frequency portions.

FIG. 13 illustrates mode decision and control arrangements used in embodiments of this invention wherein the chrominance and hence the Y' derived decision bands involve a plurality of frequency or axis related components.

FIG. 13(A) shows the basic elements of a mode decision and control arrangement suitable for the case illustrated in Passband Diagram II involving multiple band correction of equal band receiver processing. Specifically, band separation filter 42 provides signals representative of the Y' lows and the first band of Y' highs, designated $Y_{H1}'$, to a first mode decision circuit 32(A) for determining the correction mode appropriate for highs in the first band and applying its decision signal to a first mode control circuit 34(A). Control circuit 34(A), in turn, controls circuitry (not shown) for generating inferred highs scaled from $Y_{H1}'$ in a plurality of selectable modes and, in response to the output of decision circuit 32(A), switches to the appropriate mode. Similarly, signals representative of the Y' lows and the second band of Y' highs designated $Y_{H2}'$ are supplied to a second mode decision circuit 32(B) and the output decision signal for band 2 is applied to mode control circuit 34(B). Control circuit 34(B) switches a second multimode inferred highs generator to the mode indicated for selectively controlling inferred highs for band 2, and the inferred highs for bands 1 and 2 are subsequently combined with the signals for display.

FIG. 13(B) illustrates a mode decision and control arrangement suitable for the case illustrated in Passband Diagram III involving control of a single complementary high frequency band for each axis in the case of unequal band receiver processing. The circuitry illustrated has a number of elements comparable to those described in connection with FIG. 13(A), except that instead of providing separate decision circuits and control circuits for two bands, FIG. 13(B) provides separate decision circuits and control circuits for each axis. Signals representative of the monochrome lows and highs for axis 1, i.e., $Y_{L1}'$ and $Y_{H1}'$, are applied to mode decision circuit 32(A) for axis 1, which may be the I' axis, and corresponding signals for axis 2, then the Q' axis, are applied to decision circuit 32(B). Separate inferred highs in separately determined appropriate modes are controlled for each respective axis and combined thereby.

FIG. 13(C) illustrates mode decision and control circuitry for the case illustrated in Passband Diagram IV involving multiple band correction of unequal bandwidth receiver processing. Here separate mode decision circuits 32(A) through 32(D) are provided for each monochrome highs band in each axis, e.g., mode decision circuit 32(B), designated (1,2) receives the signals appropriate for determining the correction mode appropriate for axis 1, Y' highs band 2 of axis 1. Separate inferred highs correction signals are controlled in the appropriate mode for each band of each axis, and in combining circuits (not shown), the inferred high frequency correction signals for each mode inferred from received signals from each band for each separate axis are effectively combined with the received chrominance lows for that axis.

FIG. 13(D) shows a form of optional, cross-check between the highs in a first band and the highs in a second band. Specifically, if independent highs exist, they may exist only in band 2. However, if there are no highs in band 1 then there should not be highs in band 2 and the cross-check decision circuit is useful for this purpose.

Figure 14:
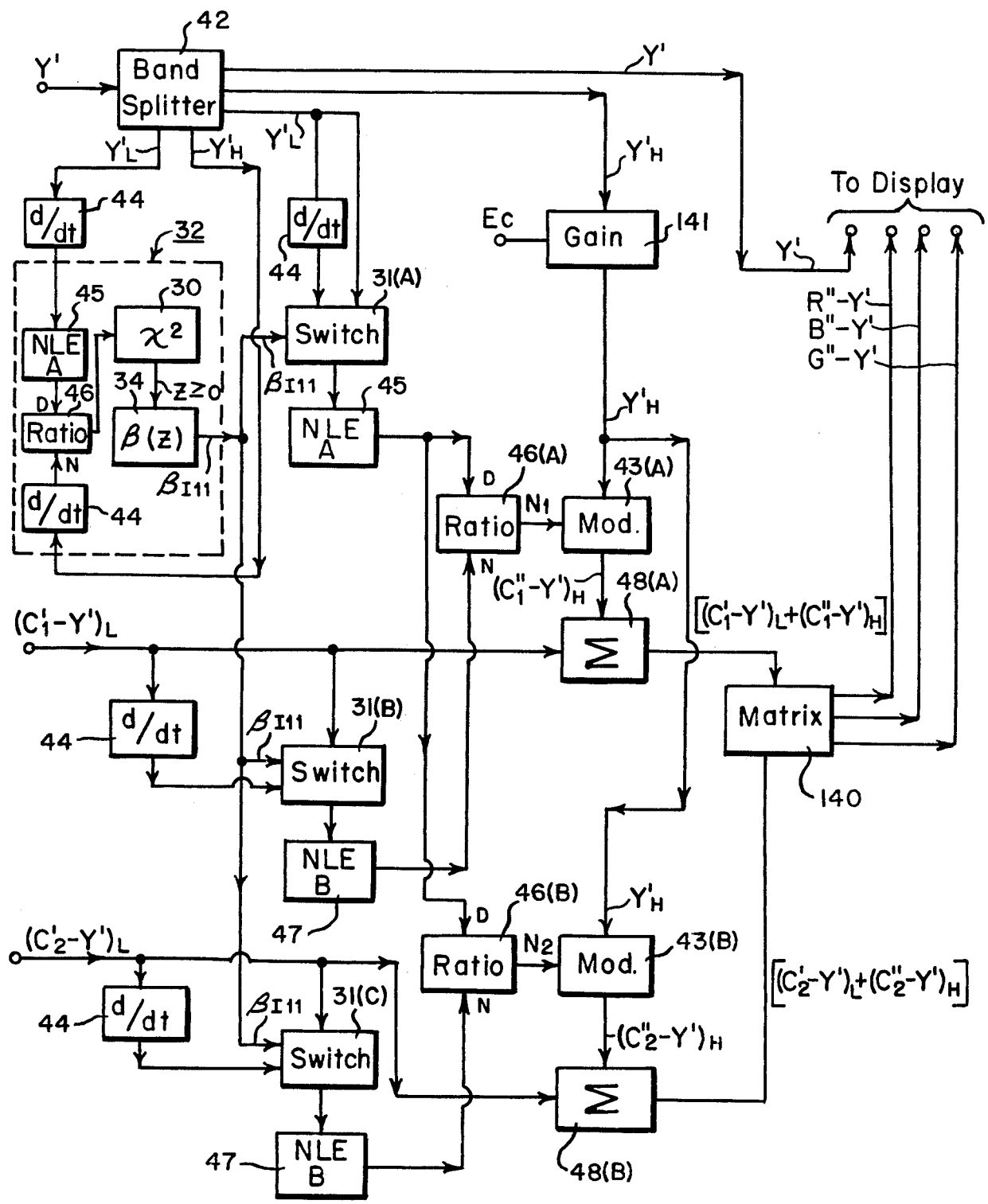

(i) Mode Controlled Receiver with Switching of Component Lows at Inferred Highs Generator Inputs (FIG. 14)

FIG. 14 is a block diagram of an embodiment of a receiving system in accordance with the invention wherein a control from a mode decision system, element 32 is applied to control of chrominance and monochrome lows at the input to an inferred highs generator. In this receiver, multimode inferred high frequency correction components are processed from two chrominance axes and the corrected signal for the third axis is processed by matrixing. Specifically, the monochrome lows and the time differentiated monochrome lows are switchably provided to denominator inputs of respective ratio circuits 46(A) and 46(B), through switch 31(A). Similarly, for a first chrominance axis, the chrominance lows and the time differentiated chrominance lows are switchably provided to the numerator input of ratio circuit 46(A) through switch 31(B); and the corresponding signals for the second chrominance axis are provided through switch 31 (C) to the numerator input of ratio circuit 46(B).

Each of switches 31(A), 31(B) and 31(C) is controlled by a mode decision circuit 32, which is here shown to be a delay-less form in accordance with the principles explained earlier with regard to elements 60 and 70 of FIG. 7. In the element 32 of FIG. 14, a signal $Y_L'$ is differentiated in element 44 and passed through type-A non-linear element 45 to the denominator input of ratio element 46. A signal $Y_H'$ is passed through element 44 to the numerator input of ratio circuit 46. The output of 46 is rendered monopolar in squaring element 30 and bi-level in element 34. A control signal $\beta_{I11}$ is applied to switch from quiescent step mode to independent mode when $\beta_{I11}$ is unity. Any short spikes, that is as short as a zero crossing epoch in $Y_H'$, may be rejected by the switches 31(A), 31(B) and 31(C), although $Y_H'$ applied to element 43 is zero at these times anyway. A mode decision signal $\beta_{I11}=0$ ensures that switches 31(A), 31(B) and 31(C) interconnect the respective rate of change signals to ratio circuits 46(A) and 46(B), thereby ensuring that the ratio circuit outputs, which are control signals $N_1$ and $N_2$ for axes 1 and 2, respectively, are inferred step highs correction control signals.

On the other hand, upon a decision that the independent highs mode should be operable, a mode decision signal $\beta_{I11}=1$ ensures that the instantaneous values of the respective signals are applied to the ratio circuits, producing respective axis control signals for the independent highs correction.

This control system can be represented by the relations:

(1) $[d/dt\,(C-Y)_L](1-\beta_{I11})+(C-Y)_L(\beta_{I11})$ and (2) $[d/dt(Y_L')](1-\beta_{I11})+Y_L'(\beta_{I11})$ Alternatively, any of the mode decision circuits previously shown could be utilized to provide $\beta_s$, $1-\beta_s$, $\beta_I$, $(1-\beta_I)$, $[\beta_s]$, $[\beta_I]$, or $[[\beta_s]]$ as shown earlier. The components $Y_H'$ and $(d/dt)\,Y_L'$ supplied to 32 may be delay-compensated in the band splitter 42 or comparably, to provide concurrence of the switch control signal and the component lows and highs.

Inferred high frequency chrominance correction components for axes 1 and 2 in the determined appropriate mode are scaled from the Y' highs in modulators 43(A) and 43(B), respectively, and combined with the respective reduced bandwidth chrominance signals in summing circuits 48(A) and 48(B) to produce corrected chrominance signals for two chrominance axes.

The corrected signal for the third chrominance axis is then processed by conventionally matrixing the two correction signals in matrix circuit 140, in accordance with the requirement of maintaining fidelity to the received monochrome signal. This is achieved, first by satisfying the relationship $\rho A_c(C_H'' - Y_H') = 0$. This is obtained with any components proportional to the nominal ones as defined by the stated algorithms. Use of substantial equality suppresses overmodulation and rectification conventionally existing in mixed-highs receivers, and maintains fidelity to $Y_L'$. The resulting signals are translated to conventional summing and display circuitry (not shown).

An optional selectable gain control device 141 is shown disposed in the $Y_H'$ channel for permitting adjustment of the amplitudes of the inferred high frequency components in response to a control voltage $E_c$. This may for example be used to turn down the gain under excessively noisy conditions.

The elements 47 comprising type-B threshold devices of selectable threshold level apply a concurrent chrominance or chrominance rate constraint to the inferred chrominance components on each axis. Separately selectable thresholds may be achieved by the use of multiple type 47 elements before the switches 31, and these may optionally be followed by separately adjustable gain control elements.

FIG. 14 illustrates an equiband system. For a non-equiband system, separate $Y_H'$ and $Y_L'$ signals are used for each axis, and dual axis enabling is used in accordance with FIG. 13(B). Split highs may be incorporated by element replication and use of control in accordance with FIGS. 13(A) or 13(C). Optionally, dual gates may be employed instead of switches for elements 31(B) and 31(C) and these may be operated in dual enabling modes to provide either $Y_H'$ or $(C_H''-Y_H')_{step}$ or $(C_H''-Y_H')_{independent}$ at any time, for either axis, as indicated to be most appropriate by the mode decision system.

The particular mode decision circuit 32 shown utilizes the ratio of a pair of signals, one representative of the $Y'$ highs and $d/dt(Y')$ lows, respectively, as a result of linear filtering which is non-dispersive in time. During a step, the ratio is wholly within a first amplitude range and during independent highs it is generally within a second amplitude range, with the possible exception of very short spikes or pulses. In the absence of dominant highs it may remain within the amplitude range compatible with operation of the step mode algorithm as discussed earlier in this specification.

Figure 15:
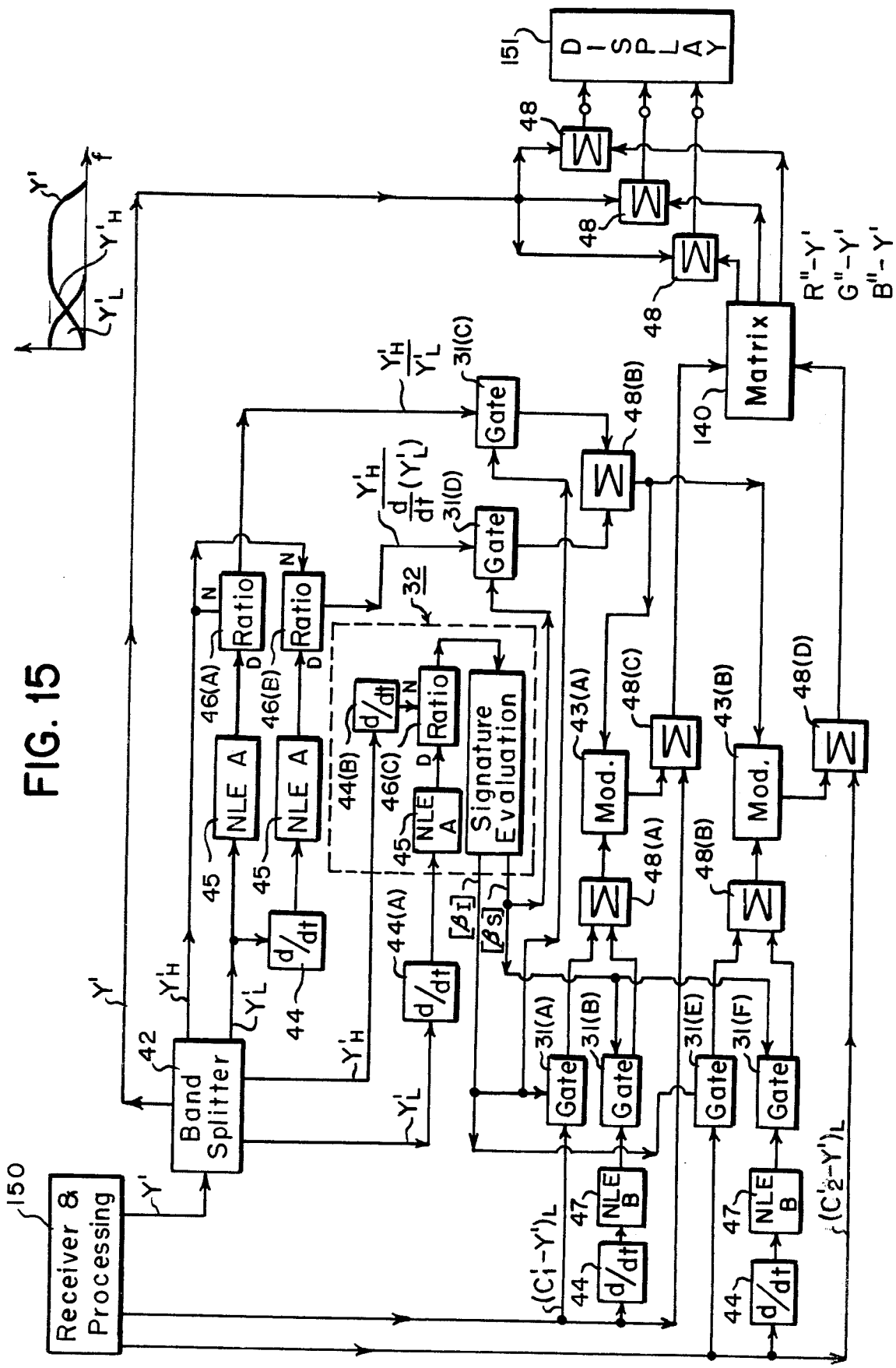

(j) Multimode Inferred High Correction System with Switching Control in Wideband Monchrome and Narrowband Chrominance (FIG. 15)

FIG. 15 is a block diagram of an alternative embodiment of a receiving system having multimode inferred highs correction in accordance with the invention. In this embodiment, the inferred high frequency correction components are processed by modulating a chrominance processed signal by a ratio processed from the monochrome signal. Specifically, the inferred high frequency correction components for each of two chrominance axes are produced in modulators 43(A) and 43(B). The mode decision circuit used herein is of a type described in detail earlier. Specifically, element 32 receives signals representative of $Y_H'$ and $(d/dt)Y_L'$ from the band splitter 42 and differentiating circuit 44(A). The output of 44(A) is supplied to the numerator input of ratio circuit 46(C) through B-type threshold 45. While not restricted thereto, in the form shown, the signature evaluation circuitry may be of one or more of forms 61, 70, or 103, to provide [[$\beta_s$]] or $1-$[[$\beta_s$]], or $\beta_s$ and $(1-\beta_s)$ or $\beta_I$ and $(1-\beta_I)$ or [$\beta_s$] and [$\beta_I$]. While specific processing of $\rho_{11}$ and subsequent signature evaluation is shown, any of the forms of circuits described in connection with FIGS. 6, 7, 8, 9, or 10 may be used.

The complementary pair of outputs from element 32 in FIG. 15 are indicated as [$\beta_s$] and [$\beta_I$] and one keys, enables or disables a step mode algorithm while the other enables or disables an independent mode algorithm. While an equiband system is illustrated, unequal $I'$, $Q'$ band processing may be utilized by using separate $Y_{LI}'$, $Y_{LQ}'$ and $Y_{HI}'$ and $Y_{HQ}'$ components, and by use of the mode decision circuit of FIG. 13(B).

In the first chrominance channel from receiver 150, the chrominance and chrominance rate of change signals are applied through gates 31(A) and 31(B), respectively, to a summing circuit 48(A) and thence to one input of modulator 43(A). Correspondingly, the ratio of the $Y'$ highs to the $Y'$ lows from ratio circuit 46(A) and the ratio ofth $Y'$ highs to the $Y'$ lows rate of change from ratio circuit 46(B) are applied, through gates 31(C) and 31(D), respectively, to summing circuit 48(B) and thence to the other input terminal of modulator 43(A).

When mode decision circuit 32 provides a mode decision signal indicative of operation of the independent mode algorithm, gates 31(B) and 31(F) disable the chrominance rate of change channels and the ratio of $Y'$ highs to the $Y'$ lows rate of change. Gates 31(A) and 31(C) enable the chrominance channels and the ratio of $Y'$ highs to $Y'$ lows, respectively, resulting in inferred independent highs ($C_H'' - Y'$) from modulator 43(A) of the form:

$(C_H'' - Y_H') = (C_1' - Y')_L (Y_H'/Y_L')$

When mode decision circuit 32 provides a mode decision signal indicative of operation of the step mode algorithm, gates 31(A) and 31(C) disable the chrominance channel and the $Y_H'/Y_L'$ channel, and gates 31(B) and 31(D) enable the chrominance rate channel and the $Y_H'\, d/dt(Y_L')$ channel. The result is an inferred step highs correction component $(C_H'' - Y_H')$ of the form:

$$(C_H'' - Y_H') = d/dt(C_1 - Y')_L \frac{Y_H}{d/dt(Y_L)}$$

Corresponding correction components for the second chrominance axis are processed in modulator 43(B) in the same manner, using gates 43(E) and 43(F). Summing elements 48(A) and 48(B) accept and translate any components supplied thereto to elements 43(A) and 43(B) at least proportionally and preferably equal to those as defined by the central algorithms.

The inferred correction signals for each chrominance channel are then combined with the respective chrominance lows for the channel in summing circuits 48 (C) and 48 (D), respectively, and the two supplemented chrominance signals are matrixed in matrix circuit 140 to provide the three corrected color difference chrominance signals. Use of conventional matrixing coefficients produces the three components $R''-Y'$, $G''-Y'$, and $B''-Y'$ as shown. The matrixing of the inferred chrominance components insures fidelity to $Y_H''$. The use of the specific inferred chrominance components for the inferred step mode or inferred independent mode prevents over-modulation, rectification, desaturation and spurious lows, and thereby maintains fidelity to $Y_L'$.

In final processing, the respective color difference signals are combined with the monochrome signal in respective summing circuits 48 to produce primary color signals for the display 151.

Figure 16:
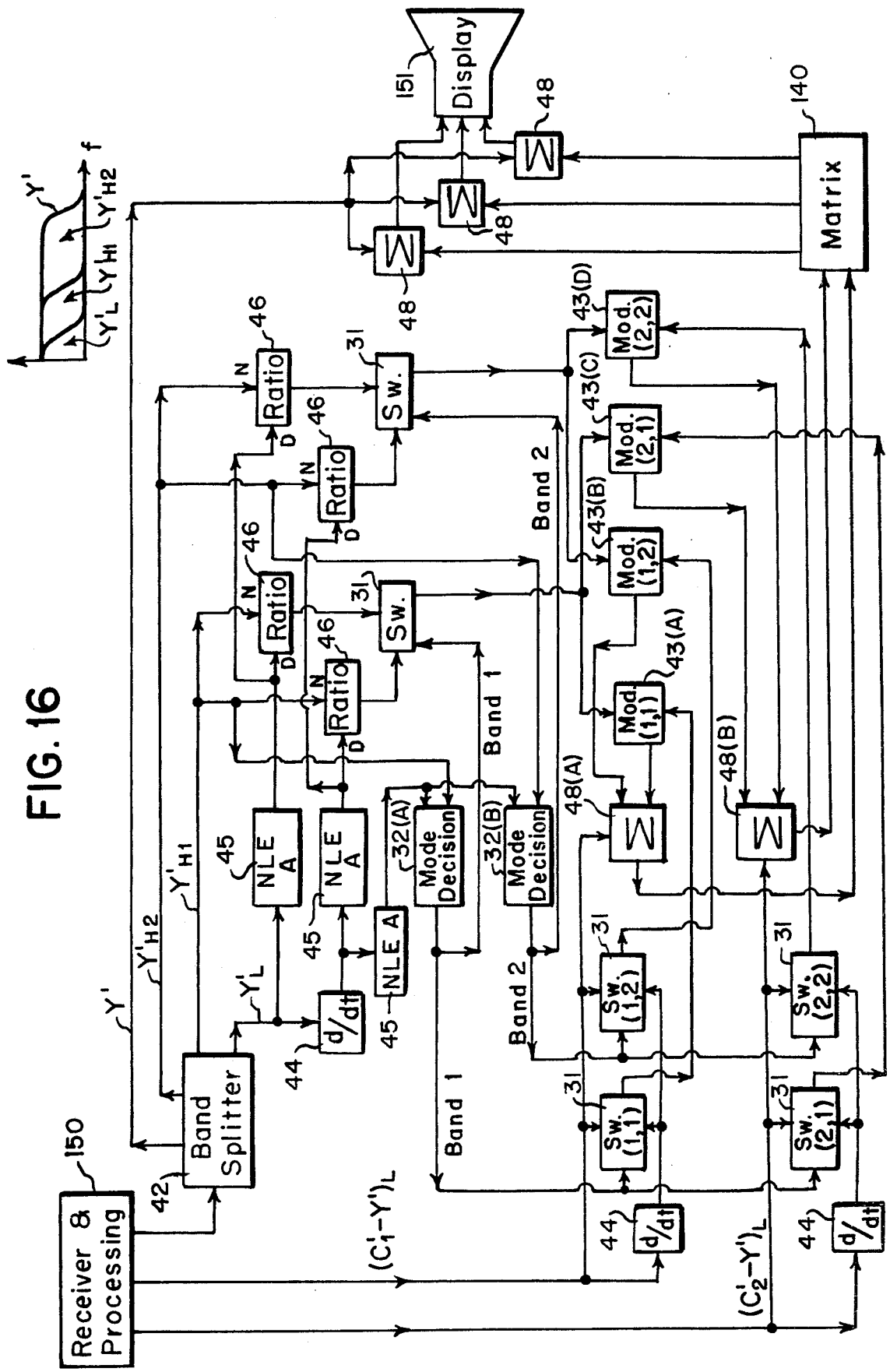

(k) Multimode Multiband Inferred Highs Receiving System (FIG. 16)

FIG. 16 is a block diagram of a receiving system having multimode, multiband correction in accordance with the invention. Here the monochrome highs are filtered into at least two frequency portions, $Y_{H1}'$ and $Y_{H2}'$, by band splitter 42; mode decisions are separately made for $Y_{H1}'$ and $Y_{H2}'$ in mode decision circuits 32(A) and 32(B), respectively; and inferred high frequency correction components are separately scaled from each of bands $Y_{H1}'$ and $Y_{H2}'$ for each chrominance axis in modulators 43(A) through 43(D).

For purposes of simplicity, FIG. 16 shows mode decision circuitry of the type which does not add delay. Alternatively, any of the mode decision systems described with regard to FIGS. 6, 7, 8, 9, 10 and 13 may be used, with appropriate delay compensation (not shown).

Referring now to FIG. 16, the inferred correction components for axis 1, i.e., the correction components separately scaled from $Y_{H1}'$ and $Y_{H2}'$, are added together with the received chrominance lows for axis 1 in summing circuit 48(A) to produce a composite corrected chrominance signal for axis 1. Similarly, a composite corrected chrominance signal for axis 2 is produced in summing circuit 48(B). The two corrected composite signals are matrixed in matrix circuit 140 to provide three corrected color difference or chrominance signals which are separately combined with Y′ in summing elements 48 to produce primary color signals for display by element 151.

The mode decision and control system operates similarly to that described above in connection with FIG. 15 and in accordance with FIG. 13(A). Mode decision circuits 32(A) and 32(B) can be any one of the forms previously described and the mode decisions are effectuated through switches 31 which, for each of modulators 43(A) through (C), switchably control and determine whether the chrominance signal or the chrominance rate signal is applied to one input terminal and whether the ratio applied to the other terminal is the ratio of a Y′ highs component to the Y′ lows or the ratio of the Y′ highs component to rate of change for the Y′ lows. Extension to unequal I′, Q′ passbands may be accomplished as taught herein and illustrated in FIG. 13(C).

While a single control lead is illustrated as coming from each of elements 32(A) and 32(B), to provide operation alternatively in step or independent mode, dual controls [$\beta_s$] and [$\beta_I$] may be advantageously used to provide dual enabling.

Figure 17:
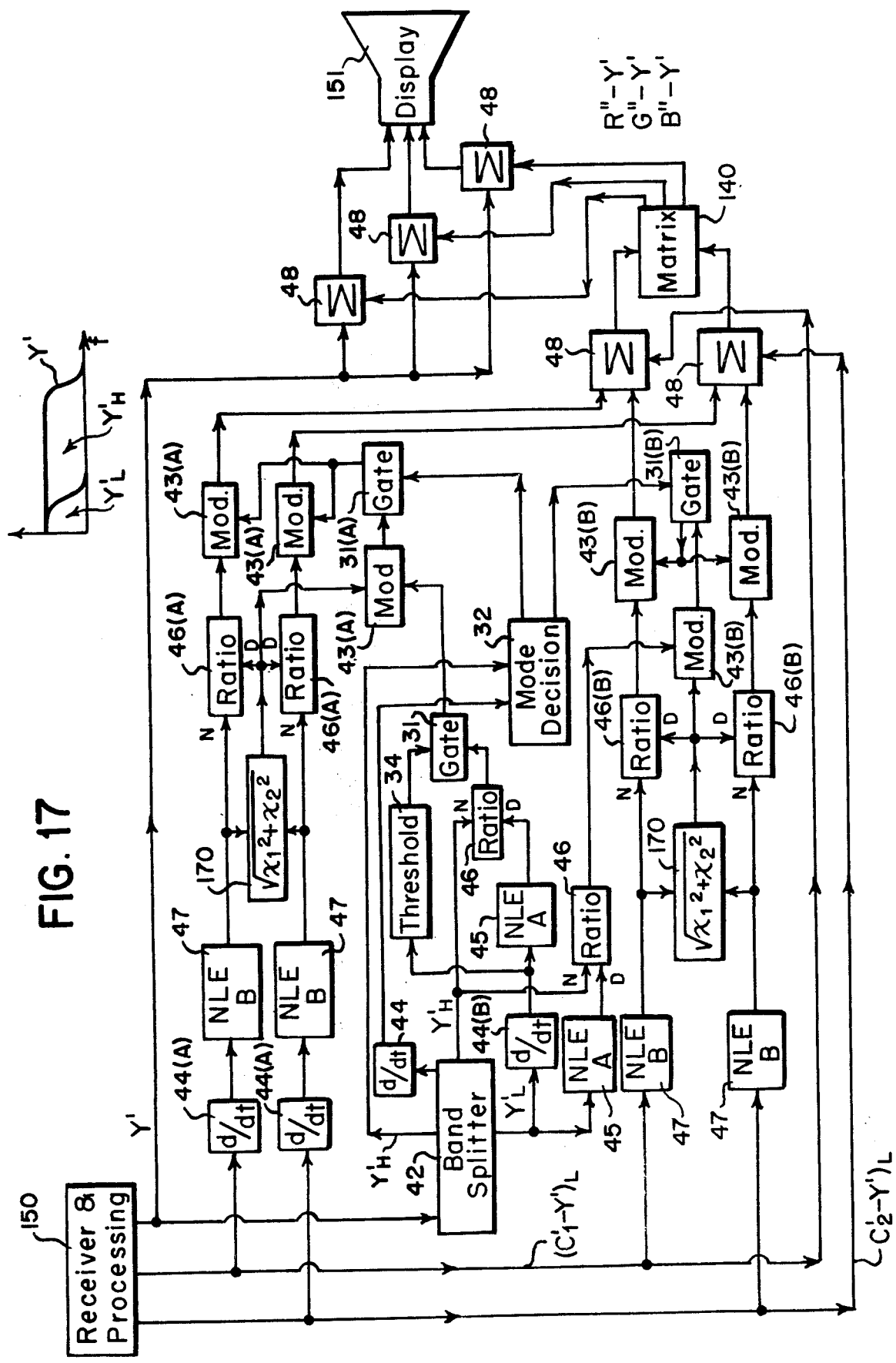

(l) Multimode Adaptive Axis Processor (FIG. 17)

FIG. 17 illustrates a receiving system having a multimode adaptive axis inferred highs correction circuit in accordance with the invention. Here inferred step highs for first and second chrominance axes in quadrature are processed in respective modulators 43(A); and inferred independent highs for the first and second axes are processed in respective modulators 43(B).

In the processing of step inferred highs, a plurality of chrominance signals defining quadrature chrominance axes from a preceding receiver 150 are applied to respective differentiating circuits 44(A) to produce output chrominance rate-of-change signals. These output signals, in turn, are applied through optional type-B threshold circuits 47 to the input terminals of root-sum-square circuits means 170 for processing a chrominance rate magnitude signal equal to the square root of the sum of the squares of the input chrominance rate-of-change signals. Each chrominance rate-of-change signal is also applied to the numerator input terminals of respective ratio circuits 46(A), and the output signal of circuit 170 is applied to the denominator input of each respective ratio circuit. The outputs of the respective ratio circuits 46(A) are respective chrominance rate-of-change signals normalized with respect to the rate-of-change signals on the adaptive chrominance rate-of-change axis to provide instantaneous sine and cosine terms.

The monochrome signal Y′ is applied to band splitter 42 wherein it is split into a low frequency portion $Y_L'$ comparable to the chrominance signals and a complementary high frequency portion $Y_H'$. The Y′ highs are applied to the numerator input terminal of a ratio circuit 46(B), and the Y′ lows are differentiated in differentiating circuit 44(B) and, through type-A threshold 45, the resulting Y′ lows rate-of-change signal is applied to the denominator input terminal of ratio circuit 46(B). The resultant threshold ratio of the Y′ highs to the rate-of-change of the Y′ lows is applied through gate 31 to modulator 43(A) along with the output of normalizing circuit 170 to provide an output product signal. Gate 31 is activated to an on condition when (d/dt) $Y_L'$ through B-type threshold 34 exceeds a minimum magnitude. This feature is optional, and may be included in any of the embodiments. The product signal is, in turn, used to modulate the normalized chrominance rate signals from respective ratio circuits 46(A) in respective modulators 43(A), to thereby produce respective inferred high frequency step correction components in proper proportions.

In processing inferred independent highs, substantially identical circuitry is used to perform substantially the same processing steps preliminary to modulation in respective modulators 43(B) except that all differentiators and differentiation steps are omitted.

Mode decisions, which can be based on various signals representative of a comparison of Y′ highs to the Y′ lows rate as previously described, can be effectuated by element 32 through gates 31(A) and 31(B). Specifically, if the step correction mode is deemed appropriate, gate 31(A) is enabled, and gate 31(B) is diabled. In such instance, only the step correction modulators 43(A) can have inferred highs outputs for subsequent summing, matrixing and display. One, the other, or both modes can be disabled concurrently in this embodiment. The embodiment of FIG. 17 processes video components effectively as though they were still on a chrominance subcarrier.

Figure 18:
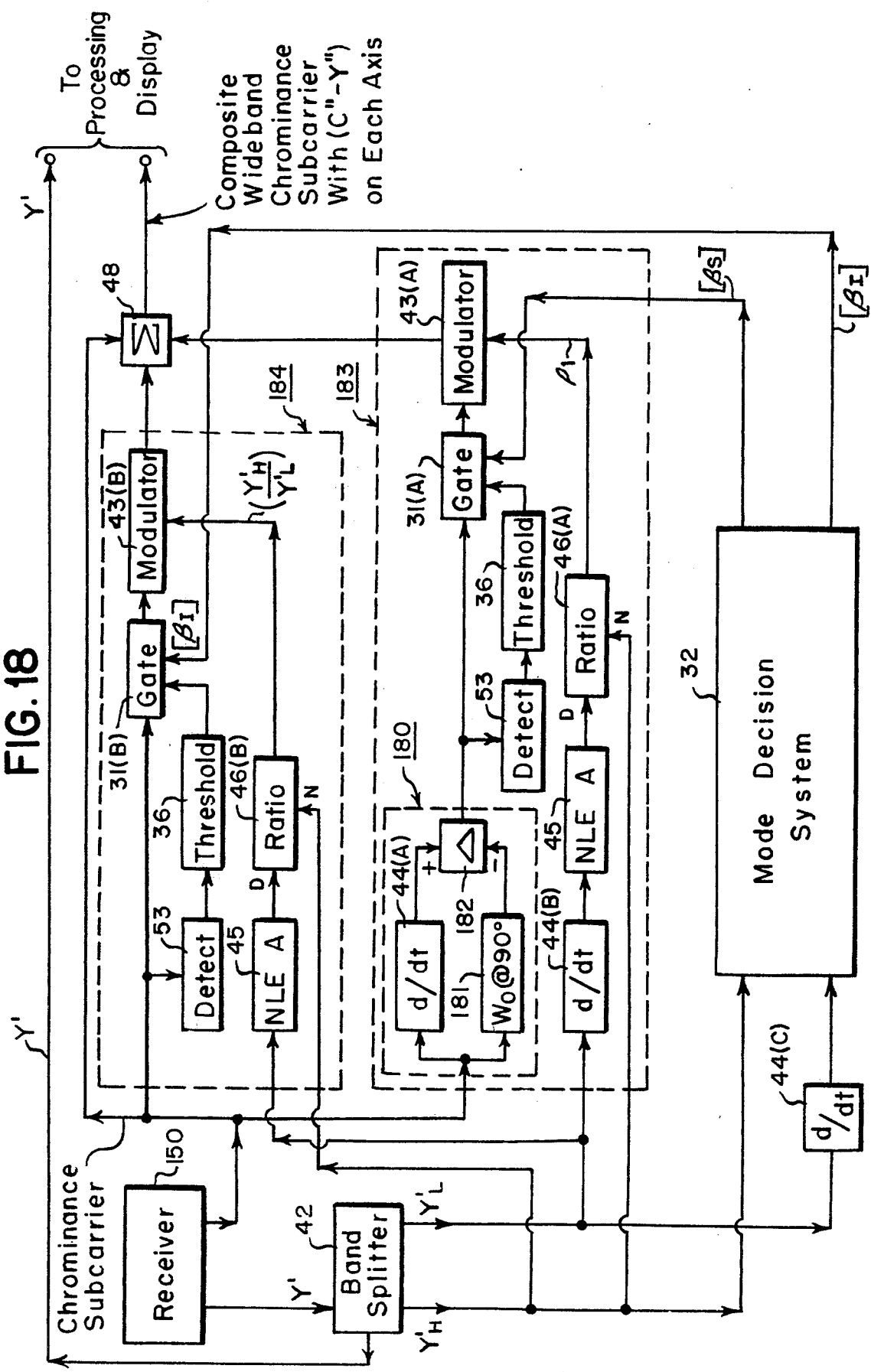

(m) Receiver with Multimode Inferred Highs Correction on the Subcarrier (FIG. 18)

FIG. 18 illustrates a receiving system having multimode inferred highs correction circutry for correcting the chrominance signals while they are on a subcarrier. Inferred chrominance subcarrier supplements for inferred step mode operation and inferred independent mode operation are processed in modulators 43(A) and 43(B) respectively. Signals Y′ and a chrominance subcarrier are provided from receiver 150 as video components Y' with appropriate delay is supplied to processing and display. The Y' signal is split in band splitter 42 and provided to elements 183, 184, and 32. Element 184 processes supplementary carrier components for the independent mode. Element 183 processes supplementary carrier components for step mode operation. Element 32 provides mode decisions and control and may be any of the forms presented earilier. Element 32 is then generally represented as having $Y_H'$ and $(d/dt)Y_L'$ as inputs, and providing $[\beta_s]$ and $[\beta_I]$ as outputs. Compensating delay elements which may be required with some forms of element 32 are not shown.

In the processing of the inferred subcarrier supplements for step correction, a chrominance subcarrier signal comprising the chrominance signals on quadrature axes is provided by receiver 150 are applied to subcarrier differentiating circuit 180 for differentiating with respect to time the chrominance signal on the subcarrier. In a preferred form of the invention, circuit 180 comprises a differentiating circuit 44(A) for differentiating the subcarrier by gain constant $W_o$ and for providing it with a 90° phase delay, and a subtracting circuit 182 for subtracting the output of the phase delay circuit from the output of the differentiating circuit.

The principle of operation of differentiating circuit 180 can be explained by reference to the following algebraic demonstration wherein the chrominance on subcarrier signal S is of the form:

$$S = a \cos W_o t + b \sin W_o t,$$

where a and b represent chrominance signals. Specifically, it can be shown that $$da/dt \cos W_o t + db/dt \sin W_o t$$

$$= d/dt (a \cos W_o t + b \sin W_o t)$$

$$- W_o[a \cos(w_o t - 90°) + b \sin(W_o t - 90°)]$$

$$= d/dt S - W_o S(W_o t - 90°)$$

Thus circuit 180 differentiates the I' and Q' signals on the subcarrier without altering the subcarrier phase. As shown the differentiated subcarrier signal is applied to one input terminal of modulator 43(A) through gate 31(A).

The monochrome signal Y' is applied to band splitter 42 for division into a low frequency portion $Y_L'$ comparable in bandwidth to the chrominance signals and a complementary high frequency portion $Y_H'$. The Y' lows are differentiated in time differentiation circuit 44(B), and the resulting Y' lows rate-of-change signal is applied, through a type-A threshold 45 to the denominator input terminal of ratio circuit 46(A). The ratio of Y' highs to the thresholded rate-of-change of Y' lows is applied to the other input terminal of modulator 43(A) and designated $\rho_1$. The output of modulator 43(A) is an inferred chrominance subcarrier supplement for step correction which supplement is directly proportional to the product of (1), a signal comprising the time differentiated reduced chrominance signals, (2) the high frequency portion of the monochrome signal exceeding the bandwdith of the chrominance signals and is inversely proportional to the thresholded, time differentiated Y' lows.

An inferred chrominance subcarrier supplement for independent highs correction is processed in modulator 43(B). Substantially identical circuitry and processing steps are used except the differentiators 180 and 44(B) are omitted. This output is of form $(Y_H'/Y_L')$.

Gates 31(A) and 31(B) can be concurrently controlled by optional thresholds 36 responsive to detected carrier components having amplitudes proportional to chrominance or chrominance rate, as shown.

Mode decisions from decision circuit 32, which can be selected from the several forms presented earlier, or concurrent combinations thereof, control the operation of gates 31(A) and 31(B) as shown. One or the other or neither may be enabled by signals $[\beta_I]$ or $[\beta_s]$, as previously explained. The one or more inferred chrominance subcarrier supplements and the unaltered subcarrier are combined in summing circuit 48(B). The thus-supplemented signal is transmitted on for conventional processing for display.

(n) Receiver with a Multimode Correction System for Generating and Applying Separate Inferred Step and Independent High Frequency Chrominance Components Concurrently in the Same Frequency Band [FIG. 19(A)]

FIG. 19(A) illustrates a color television receiver system with a multimode correction system for generating and applying separate inferred step and independent high frequency chrominance components concurrently in the same frequency band. It is based on an inferred division of $Y_H'$ into two components, an inferred and then reconstituted signal $Y_{HS}''$ and then use of the residual $Y_{HI}' = Y_H' - Y_{HS}''$ to concurrently provide and add other components to more fully reproduce the full inferred chrominance content. Since plural band systems have been previously described, as have unequal band receivers, the receiver of FIG. 19(A) introduces and illustrates circuit means and methods for this new processing in an equiband environment with a single $Y_H'$ band. Extension to other modes of operation is straightforward as taught herein. FIG. 19(A) uses reconstitution of a detected component, specifically a step waveform which may be detected and timed with the aid of elements such as 61, 67 or 80 as previously taught. Once the presence of a step with significant components in the band of $Y_H'$ under evaluation has been determined, it is possible to reconstitute an alternating bi-polar component $$\left( \frac{Y_H}{\frac{d}{dt} Y_{Lnominal}} \right)$$

wherein the $Y_H'$ component has approximately the bandwidth measured and found to be so occupied. When this is multiplied by the actual measured value of $[(d/dt) Y_L']$, the result is $Y_{HS}''$ having the shape, amplitude, polarity timing and general bandwidth of the received component of step highs. The independent highs portion of the received Y' highs, $Y_{HI}'$ can then be readily processed as the residual portion of Y' highs, i.e., $Y_{HI}' = Y' - Y_{HS}'$. High frequency step and independent highs correction components can then be separately inferred for $Y_{HS}'$ and $Y_{HI}'$, respectively. FIG. 19(A) then illustrates a receiving system including multimode high frequency correction circuitry using one or more reconstituted signal components. Specifically, receiver 150 supplies the monochrome signal to band splitter 42 which splits Y' into a low frequency signal component $Y_L'$ comparable in frequency range to the reduced bandwidth chrominance signals and a complementary high frequency portion, $Y_H'$. The Y' highs and Y' lows are then applied to a mode decision circuit 32 which, through mode controls circuitry 31, controls an inferred step highs generator 10, an inferred independent highs generator 20, and a $Y_{HS}''$ source 190 which reconstitutes the portion of the Y' highs attributable to the step content of a signal. Such a source is described in greater detail in connection with FIG. 19(B) hereinbelow.

Upon decision that a step exists at a particular time, mode decision circuit 32 activates source 190 to produce a $Y_{HS}''$ signal of the form $$Y_{HS}'' = \left[ \frac{Y_H}{d/dt(Y_L)} \right]_{nominal} \times d/dt(Y_L)_{actual}$$

It also enables generators 10 and 20. The $Y_{HS}''$ signal, in turn, is applied to inferred step highs generator 10, wherein inferred step highs $(C_{HS}'' - Y')$ are processed from it in accordance with the relation:

$$(C_{HS}'' - Y_H') = \frac{d/dt(C - Y)_L}{d/dt(Y_L)} \cdot Y_{HS}''$$

Alternatively, it is possible to derive the same signal in the form:

$$(C_{HS}'' - Y_H') = \left[ \frac{Y_H}{\frac{d}{dt}Y_L} \right]_{nominal} \times \frac{d}{dt}(C - Y)_{L actural}$$

$$= [[\rho_1]]_{nominal} \times \frac{d}{dt}(C - Y)_{L actual}$$

Both forms are indicated in FIG. 19(A) and both are provided in the circuit of FIG. 19(B).

The $Y_{HS}''$ signal is also applied to subtraction circuit 191 for subtraction from the $Y_H'$ signal, thus producing an output signal $Y_{HI}' = Y_H' - Y_{HS}''$ attributable to the independent highs content of the received signal.

The $Y_{HI}'$ signal, in turn, is applied to the inferred independent highs generator 20 wherein inferred independent highs $C_{HI}' - Y'$) are processed from it in accordance with the relation:

$$(C_{HI}' - Y') = \frac{(C - Y)_L}{Y_L} \cdot Y_{HI} = \frac{(C - Y)_L}{Y_L}(Y_H - Y_{HS})$$

The inferred step highs and the inferred independent highs for each chrominance axis are then added to the reduced bandwidth chrominance signals for the axis in summing circuits (not shown), and the thus-corrected signals are processed for display, otherwise conventionally.

If decision circuit 32 determines a step does not exit, source 190 and inferred step generator 10 are effectively disabled. In such instance, only inferred independent highs scaled from $Y_H'$ are added to the chrominance lows; these may be independently disabled. Optionally, $H_{HS}'$ may be fed back to the mode decision circuit 32 from 190 (as might $Y_{HI}'$ from 191) to refine decision capability for control of element 20. Appropriate equalizing time delays (not shown) may be provided as required.

(o) Circuit Means and Methods for Bandwidth-Controlled Signal Reconstitution (FIGS. 19(B), 19(C), 19(D)

FIG. 19(B) illustrates a $Y_{HS}''$ regenerator useful, for example, as source 190 in the receiving system of FIG. 19(A). Specifically, a step mode decision circuit (not shown) supplies a step mode decision signal [[$\beta_s$]] constrained to the time epoch, $T_s$, of a detected step. In response to [[$\beta_s$]], a keyed waveform generator 193 produces a nominal [[$\rho_1$]] waveform representative of $$\left[\left[ \frac{Y_H}{d/dt(Y_L)} \right]\right]$$

for a step of the indicated bandwidth and applies it to one input terminal of multiplier 111. Such a waveform is illustrated in relation to $T_s$ in diagrams (1) and (2). This waveform can be linearly generated by appropriately band splitting the output of a step generator (not shown) and taking the ratio of the highs to the time differentiated lows. The actual $Y_L'$ signal is time differentiated by differentiation circuit 44 and applied when appropriate through equalization delay 194 to the other input of multiplier 111. The output of multiplier 111. represents a reconstituted or regenerated portion of the Y' highs attributable to the step content of the signal. It is valid only during the time epoch of a step, and it can be further constrained to the step time epoch by optional gate 195 responsive to [[$\beta_s$]]. Alternatively, [[$\rho_1$]] comparably timed is available as an output. '

FIG. 19(C) illustrates a regenerator for reconstituting inferred step highs which can be used as inferred step generator 10 in FIG. 19(A) or in other embodiments such as that of FIG. 20 or element 190 of FIG. 19(B). Here the time constrained step mode decision signal [[$\beta_s$]] is received by keyed generator 193. The [[$\rho_1$]] output signal is applied to one input terminal of multiplier 111. The chrominance lows are applied to differentiator 44 and the resulting chrominance lows rate signal is applied, through optional equalization delay 194, to the other input of multiplier 111. The multiplier output is a time-constrained inferred high frequency step correction component [[$C_H'' - Y_H'$]] of the form:

$$[[C_H'' - Y_H']] = [[\rho_1]]_{nominal} d/dt(C - Y)_{L \ actual}$$

It is valid only during the time eoch of a step, and it can be further constrained to the step time epoch by optional gate 195 responsive to [[$\beta_s$]]. For example, if $(C' - Y')_L = I_L'$, then the inferred $I_H'$ is generated during the step.

FIG. 19(D) shows a generalized combination of a mode decision system for specified waveform recognition and control comprising elements 42, 32 and 31, keyed waveform generator 196A, a chrominance input supplied to modulator 43 along with the output of 196, and optional supplementary time gating means 195. This circuit may be used to derive components of independent highs for which $$\frac{Y_H}{\frac{d}{dt}Y_L}$$

has a ratio not incompatible with a step but the $Y_H'$ signal may be substantially different from a step such as in quadrature or antiphase therewith. Thus, use of reconstituted inferred chrominance of controlled shape amplitude, polarity, timing and bandwidth may also be applied to any selected components of independent highs.

(p) Cross Talk Neutralization (FIG. 20)

In accordance with a further embodiment of the invention, crosstalk into the Y' signal from the I' single sideband signal on the subcarrier is effectively neutralized in signal regions adjacent chrominance steps. Optionally, this method can be extended to any specifically recognized components of independent highs.

Referring next to frequency response curves (1), (2) and (3) of FIG. 20, curve (1) shows regions of the frequency spectrum with double sideband chrominance, and with significant single sideband chrominance due to the I' components. Curve (2) shows the low frequency portion of the spectrum for which Q' and I' may be measured as unequal band components, and corresponding comparable $Y_{LQ}'$ and $Y_{LI}'$ components are also identified. Curve (3) shows possible separate inferred I' highs components utilizing equiband signal processing. Since compensation on steps is described here for illustration, the component scaled from $Y_{H1}'$ is denoted $I_{S1}'$ and the component denoted $I_{S2}'$ is scaled from $Y_{H2}'$. The bulk of visible cross-talk from I' to Y' is due to $I_{S1}'$.

In this equiband embodiment, the preceding receiver circuits 150 provide Y', $Q_L'$ and $I_{LQ}'$. Inferred highs are generated in 10 and 20, and mode controlled by 32 and 34 as previously described. Element 32 also functions as an inferred crosstalk detector. Band splitter 42 supplies all components appropriately time delayed. All I' and Q' highs components from 10 and 20 are supplied to summing circuits 48 for further use as $I_H''$ and $Q_H''$. These are combined with $I_{LQ}'$ and $C_L'$ in matrix and delay 140 to provide $R''-Y'$, $G''-Y'$, and $B''-Y'$ as previously explained. Component $I_{S1}'$ as shown is also supplied to neutralization generator 204, and is translated in gate 31 when it is keyed on by mode control 34. A subcarrier reference for the receiver is reversed in polarity by 180° in phase shifter 201 and modulated by $I_{S1}'$ when it exists. The output of 200 is single sideband filtered in SSB filter 203 and combined with delayed Y' to neutralize I' subcarrier cross-talk in 48. The inferred independent high frequency components are processed in the manner taught herein and the several inferred components are combined into composite correction components in summing circuits 48.

The component $I_{S1}'$ may be either directly generated or reconstituted components may be used. In accordance with techniques described earlier, a preferred bandwidth may be selected for the neutralization, which need be only partial to produce noticeable improvement. In an alternative form of this embodiment, the components $Y_{H2}'$ supplied to the inferred highs generators 10 and 20 may also be derived from the neutralized components of Y'. In all other respects, the multimode correction circuitry operates in substantially the same fashion as the embodiments described hereinabove.

The visibility of cross-talk on colored steps or stripe edges in colors with substantial I' may normally be increased in effective visibility by rectification due to display non-linearities. Thus, even partial neutralization may be effective to reduce visibility of residual patterns, and the methods provided herein may be applied to reduce cross-talk of single sideband I' components into the Y' channel for both color and monochrome television receivers. This improvement may also be applied for any individually recognizable component of independent highs.

While the invention has been described in connection with only a small number of specific embodiments, it is to be understood that these are merely illustrative of many other specific embodiments which can also utilize the principles of the invention. For example, while the preferred embodiments herein have been described using standard signal terminology of the NTSC system used in the United States, it should be understood that the inventive concepts are equally applicable to NTSC derived systems such as the well-known PAL and SECAM systems. And while the operating concepts of the invention have been primarily explained in the environment of a conventional home television receiver, it should be appreciated that the same signal processing methods and circuits can also be advantageously used to enhance the quality of image reproduction at any stage of signal transmission or reception where the bandwidths of the chrominance signals have been restricted compared to the bandwidth of the monochrome video signal, but subsequent to which this bandwidth restriction can be removed. Accordingly, the expression "color television receiving system" as used herein is meant to generally define and embrace color television signals at some stage prior to image display. Examples of such systems in which the present invention may be advantageously employed include video recording and recording playback apparatus, large screen theater displays, cable television systems and off-the-air receivers such as home television receivers. Signal processing circuits such as video detectors, chrominance subcarrier synchronous detectors and video signal matrixing circuits currently used in such receiving systems are well known in the art and may be utilized to supply the wideband monochrome and restricted bandwidth chrominance input signals for processing in accordance with the concepts of of the invention. Thus, numerous and varied devices can be made by those skilled in the art without departing from the spirit and scope of the present invention.

I claim:

1. In a television system utilizing a composite color television signal including a wide bandwidth monochrome video signal and a plurality of narrow bandwidth chrominance signals relatively limited to low frequencies so as to produce undesired image display distortions and deficient high frequency color response, multimode inferred signal correction means comprising:
   receiving circuit means responsive to said composite color television signal for processing therefrom a wideband monochrome signal and a plurality of reduced bandwidth chrominance signals;
   multimode inferred highs correction circuit means for effectively supplementing each chrominance signal to be corrected in plural signal-controlled modes of operation providing inferred components of correction differing in frequency or time;
   mode decision means responsive to a plurality of selected components in said composite signal for producing one or more mode control signals indicating an inferred need for inferred highs correction in one or more of said signal controlled modes of operation; and
   mode control means operatively responsive to said mode control signals for either enabling or disabling the operation of said multimode inferred highs correction circuit in each of its plural signal controlled modes of operation.

2. Inferred signal correction means according to claim 1, wherein said multimode inferred highs correction circuit generates for each chrominance signal to be corrected inferred step high frequency chrominance components which in a first operating mode are generally proportional in instantaneous value to the product of (1) a signal representative of a first high frequency portion $Y_{H1}'$ of said monochrome signal; and (2) a scaling factor; and which in a second operating mode are generally proportional in instantaneous value to the product of (1) a signal representative of a second high frequency portion $Y_{H2}'$ of said monochrome signal and (2) a scaling factor; said scaling factor in each mode being generally proportional to the product of a signal representative of the time rate-of-change of chrominance signal being corrected and the inverse of a signal representative of the time rate-of-change of a low frequency portion of said monochrome signal.

3. Inferred signal correction means according to claim 1, wherein said multimode inferred highs correction circuit generates for each chrominance signal to be corrected inferred independent high frequency chrominance components which in a first mode are generally proportional in value to the product of (1) a signal representative of a first high frequency portion of $Y_{H1}'$ of said monochrome signal and (2) a scaling factor; and which in a second mode are generally proportional in value to the product of (1) a signal representative of a second high frequency portion $Y_{H2}'$ of said monochrome signal and (2) a scaling factor; said scaling factor in each mode being generally proportional to the product of a signal representative of the chrominance signal being corrected and the inverse of a signal represenative of a low frequency portion of said monochrome signal.

4. Inferred signal correction means according to claim 1, wherein said multimode inferred highs correction circuit includes an inferred step highs correction circuit operative in a first mode to effectively supplement each of the chrominance signals to be corrected with inferred high frequency components for reducing said color and luminance display errors in image regions having color step transitions; and an inferred independent highs correction circuit operative in a second mode to effectively supplement each of the chrominance signals to be corrected with inferred high frequency components for enhancing high frequency response and reducing color and luminance display errors in significantly colored image areas.

5. Inferred signal correction means in accordance with claim 1, wherein said multimode inferred highs correction circuit means generates for each chrominance signal to be corrected reconstituted alternating bipolar pulses which in a first operating mode are proportional in instantaneous value to the product of a signal representative of a first high frequency portion $Y_{H1}'$ of said monochrome signal and the inverse of a signal representative of the time rate-of-change of a low frequency portion of said monochrome signal and a scaling factor; and which in a second operating mode are proportional in instantaneous value to the product of a signal representative of a second high frequency portion $Y_{H2}'$ of said monochrome signal and the inverse of a signal representative of the time rate-of-change of a low frequency portion of said monochrome signal and a scaling factor, said scaling factor in each mode being a signal representative of the time rate-of-change of the chrominance signal being corrected.

6. Inferred signal correction means according to claim 1, wherein said multimode circuit includes an inferred step highs correction circuit which operating in a first mode generates for each chrominance signal to be corrected inferred step high frequency chrominance components which are generally proportional in instantaneous value to the product of (1) a signal representative of a high frequency portion $Y_{HS}''$ of the monochrome mixed highs attributable to color step transitions and (2) a scaling factor proportional to the ratio of a signal representative of the time rate-of-change of the chrominance signal being corrected and the time rate-of-change of a signal representative of a low frequency portion of said monochrome signal; and an inferred independent highs correction circuit which operating in a second mode generates for each chrominance signal to be corrected inferred independent high frequency chrominance components which are proportional in amplitude to the product of (1) a signal representative of a remainder high frequency portion of the monochrome mixed highs $(Y_H' - Y_{HS}'')$ attributable to independent highs; and (2) a scaling factor proportional to the ratio of a signal representative of the chrominance signal being corrected relative to a signal representative of a low frequency portion of said monochrome signal.

7. Inferred signal correction means according to claim 1, wherein said multimode correction circuit includes an inferred highs correction circuit which operating in a first mode generates for each chrominance signal to be corrected inferred high frequency chrominance components which are generally proportional in value to the product of (1) a signal representative of a high frequency portion of the monochrome mixed highs exceeding the frequency bandwidth of the chrominance signal being corrected; and (2) a scaling factor proportional to the ratio of a signal representative of said chrominance signal and a signal representative of a low frequency portion of said monochrome signal; and said inferred highs circuit which operating in a second mode generates an inferred highs cross-talk neutralization signal proportional to the product of (1) a signal representative of a selected high frequency portion of the monochrome mixed highs containing undesired color cross-talk components; and a scaling factor proportional to the ratio of a signal representative of the rate-of-change of the chrominance signal producing cross-talk to the rate-of-change of a signal representative of a low frequency portion of said monochrome signal.

8. Inferred signal correction means according to claim 1, wherein said multimode correction circuit includes an inferred highs correction circuit which operating in a first mode generates for each chrominance signal to be corrected inferred step high frequency chrominance components which are proportional in instantaneous value to the product of (1) a signal representative of a high frequency portion of the monochrome mixed highs exceeding the frequency bandwidth of the chrominance signal being corrected; and a scaling factor proportional to the ratio of a signal representative of the time rate-of-change of said chrominance signal and a signal representative of the time rate-of-change of a low frequency portion of said monochrome signal; and said inferred highs circuit which operating in a second mode generates an inferred highs cross-talk neutralization signal proportional to the product of (1) a signal representative of a selected high frequency portion of the monochrome mixed highs containing undesired color cross-talk components and (2) a scaling factor proportional to the ratio of a signal representative of the rate-of-change of the chrominance signal producing cross-talk to the rate-of-change of a signal representative of a low frequency portion of said monochrome signal.

9. Inferred signal correction means according to claim 1, wherein said multimode correction circuit includes an inferred highs correction circuit which operating in a first mode generates for each chrominance signal to be corrected inferred independent high frequency chrominance components which are proportional in value to the product of (1) a signal representative of a high frequency portion of the monochrome mixed highs exceeding the frequency bandwidth of the chrominance signal being corrected; and (2) a scaling factor proportional to the ratio of a signal representative of said chrominance signal and a signal representative of a low frequency portion of said monochrome signal; and said inferred highs circuit which operating in a second mode generates an inferred highs cross-talk neutralization signal proportional to the product of (1) a signal representative of a selected high frequency portion of the monochrome mixed highs containing undesired color cross-talk components; and a scaling factor proportional to the ratio of a signal representative of the chrominance signal producing cross-talk to a signal representative of a low frequency portion of said monochrome signal.

10. Inferred signal correction means according to claim 2, wherein said mode decision means includes first inferred step detector means responsive to component portions of said composite signal including the monochrome high frequency portion $Y_{H1}'$ to produce a first mode control signal $[\beta_s]_1$; second inferred step detector means responsive to component portions of said composite signal including the monochrome high frequency portion $Y_{H2}'$ to produce a second mode control signal $[\beta_s]_2$; and said mode control means includes separate switch control means responsive to mode control signals $[\beta_s]_1$ and $[\beta_s]_2$ to control the operation of said inferred signal correction means in the respective first and second modes.

11. Inferred signal correction means according to claim 2, wherein said mode decision means includes first inferred step detector means responsive to component portions of said composite signal including the monochrome high frequency portion $Y_{H1}'$ to produce a first mode step transition gating signal $[[\beta_s]]_1$; second inferred step detector means responsive to component portions of said composite signal including the high frequency portion $Y_{H2}'$ to produce a second mode step transistion gating signal $[[\beta_s]]_2$; and said mode control means includes separate gate control means responsive to gating signals $[[\beta_s]]_1$ and $[[\beta_s]]_2$ to gate enable the inferred signal correction means in the respective first and second modes.

12. Inferred signal correction means according to claim 3, wherein said mode decision means includes first inferred independent high detector means responsive to component portions of said composite signal including the monochrome high frequency portion $Y_{H1}'$ to produce a first mode control signal $[\beta_I]_1$; second inferred independent highs detector means responsive to component portions of said composite signal including the monochrome high frequency portion $Y_{H2}'$ to produce a second mode control signal $[\beta_I]_2$; and said mode conrol means includes separate switch control means responsive to mode control signals $[\beta_I]_1$ and $[\beta_I]_2$ to control the operation of said inferred signal correction means in the respective first and second modes.

13. Inferred signal correction means in accordance with claim 5, wherein said mode decision means includes first inferred step detector means responsive to component portions of said composite signal including the monochrome high frequency portion $Y_{H1}'$ to produce a first mode control signal $[\beta_s]_1$; second inferred step detector means responsive to component portions of said composite signal including the monochrome high frequency portion $Y_{H2}'$ to produce a second mode control signal $[\beta_s]_2$; and said mode control means includes separate switch control means responsive to mode control signals $[\beta_s]_1$ and $[\beta_s]_2$ to control the operation of said inferred signal correction means in the respective first and second modes.

14. Inferred signal correction means in accordance with claim 5, wherein said mode decision means includes first detector means responsive to component portions of said composite signal including the monochrome high frequency portion $Y_{H1}'$ to produce a first mode step transition gating signal $[[\beta_s]]_1$; second detector means responsive to component portions of said composite signal including the monochrome high frequency portion $Y_{H2}'$ to produce a second mode step transition gating signal $[[\beta_s]]_2$; and said mode control means includes separate gate control means responsive to gating signals $[[\beta_s]]_1$ and $[[\beta_s]]_2$ to gate enable the inferred signal correction means in the respective first and second modes.

15. Inferred signal correction means according to claim 6, wherein said mode decision means includes first inferred step detector means responsive to component portions of said composite signal including the monochrome high frequency portion $Y_{HS}'$ attributable to color step transitions to produce complementary first and second mode control signals $[[\beta_s]]$ and $(1-[[\beta_s]])$ respectively; and said mode control means includes switch means responsive to the said complementary mode control signals to control the operation of said inferred signal correction means in the respective first and second modes.

16. Inferred signal correction means according to claim 6, wherein said mode decision means includes first inferred step detector means responsive to component portions of said composite signal including the monochrome high frequency portion $Y_{HS}'$ attributable to color step transitions to produce a first mode control signal $[\beta_s]$; second inferred independent highs detector means responsive to component portions of said composite signal including the remainder high frequency portion of the monochrome mixed highs $(Y_H' - Y_{HS}')$ to produce a second mode control signal $[\beta_I]$; and said mode control means includes switch means operable by signals $[\beta_s]$ and $[\beta_I]$ to enable and disable the inferred signal correction means in the respective first and second modes.

17. Inferred signal correction means according to claim 7, wherein said mode decision means includes first inferred highs detector means responsive to component portions of said composite signal including high frequency components of the monochrome signal exceeding the bandwidth of the chrominance signal being corrected to produce a first mode control signal; second inferred cross-talk detector means responsive to component portions of said composite signal including a selected high frequency portion of the monochrome mixed highs containing undesired color cross-talk components to generate a second mode control signal; and said mode control means includes separate switch control means responsive to said first and second mode control signals to operatively enable and disable the respective first and second modes of operation.

18. Inferred signal correction means according to claim 8, wherein said mode decision means includes first inferred highs detector means responsive to component portions of said composite signal including high frequency components of the monochrome signal exceeding the bandwidth of the chrominance signal being corrected to produce a first mode control signal; second inferred cross-talk detector means responsive to component portions of said composite signal including a selected high frequency portion of the monochrome mixed highs containing undesired color cross-talk components to generate a second mode control signal; and said mode control means includes separate switch control means responsive to said first and second mode control signals to operatively enable and disable the respective first and second modes of operation.

19. Inferred signal correction means according to claim 9, wherein said mode decision means includes first inferred highs detector means responsive to component portions of said composite signal including high frequency components of the monochrome signal exceeding the bandwidth of the chrominance signal being corrected to produce a first mode control signal; second inferred cross-talk detector means responsive to component portions of said composite signal including a selected high frequency portion of the monochrome mixed highs containing undesired color cross-talk components to generate a second mode control signal; and said mode control means includes separate switch control means responsive to said first and second mode control signals to operatively enable and disable the respective first and second modes of operation.

20. Inferred signal correction means according to claim 1, wherein said correction circuit includes means for maintaining substantial fidelity of the monochrome components of pictures displayed from the multimode corrected signals with respect to the received monochrome signal.

21. Inferred signal correction means according to claim 1, wherein said correction circuit includes means for maintaining substantial fidelity of the monochrome components of pictures displayed from the multimode corrected signals with respect to the received monochrome mixed highs.

22. Inferred signal correction means according to claim 1, wherein said correction means includes means for maintaining substantial fidelity of the monochrome components of pictures displayed from the multimode corrected signals with respect to the low frequency portion of the received monochrome signal.

23. In a television system utilizing a composite color television signal including a wide bandwidth monochrome video signal and a plurality of narrow bandwidth chrominance signals relatively limited to low frequencies so as to produce undesired image display errors and deficient high frequency color response, multimode inferred signal correction means comprising:
receiving circuit means responsive to said composite color television signal for processing therefrom a wideband monochrome signal and a plurality of reduced bandwidth chrominance signals;
multimode inferred highs correction means which operates in a first mode to generate one or more inferred step highs correction signals for each chrominance signal to be corrected and in a second mode to generate one or more inferred independent highs correction signals for each chrominance signal to be corrected;
mode decision circuit means responsive to selected components in the received signals for generating one or more mode control signals indicating the inferred need for one or more inferred highs correction signals generated in said first and second modes; and
mode control means responsive to said mode control signals for selectively enabling or disabling the multimode inferred highs correction means in each of its operation modes.

24. Multimode inferred signal correction means according to claim 23, wherein said mode decision circuit includes means for producing a mode control signal in response to components in the received signal that are characteristic of the existence of a step transition; and mode control circuit means responsive to said mode control signal for time gate enabling the first mode of operation.

25. Multimode inferred signal correction means according to claim 23, wherein said mode decision circuit includes means for producing a mode control signal in response to components in the received signal that are compatible with the existence of a step transition; and said mode control circuit means are responsive to said mode control signal for effectively enabling the correction means in said first operating mode.

26. Multimode inferred signal correction means according to claim 23, wherein said mode decision circuit includes means for producing a mode control signal in response to components in the received signals that are incompatible with the dominant existence of a step transition; and said mode control circuit means are responsive to said mode control signal for effectively disabling the correction means in said first operating mode.

27. Multimode inferred signal correction means according to claim 23, wherein said correction circuit includes means for maintaining substantial fidelity of the monochrome components of pictures displayed from the multimode corrected signals with respect to the received monochrome signal.

28. Multimode inferred signal correction means according to claim 23, wherein said correction circuit includes means for maintaining substantial fidelity of the monochrome components of pictures displayed from the multimode corrected signals with respect to the received monochrome mixed highs.

29. Multimode inferred signal correction means according to claim 23, wherein said correction means includes means for maintaining substantial fidelity of the monochrome components of pictures displayed from the multimode corrected signals with respect to the low frequency portion of the received monochrome signal.

30. Multimode inferred signal correction means according to claim 23, wherein said mode decision circuit additionally produces an output control signal in response to excess signal noise and said mode control circuit disables said correction circuit for relative noise levels above a selected value.

31. Multimode inferred signal correction means according to claim 23, which includes bandlimiting means for reducing the bandwidth of at least one of said chrominance signals to effectively reduce unwanted monochrome to color cross-talk.

32. Multimode inferred signal correction means according to claim 23, wherein the inferred independent high frequency correction signals generated substantially restore the amplitude of high frequency signal components in image areas having intensity modulated colors.

33. Multimode inferred signal correction means according to claim 23, wherein the inferred independent high frequency correction signals generated in said second mode cause the net color highs for any primary to approach zero vaule when the color lows for that primary approach zero value.

34. Multimode inferred signal correction means according to claim 23, wherein said mode decision circuit includes means for signal comparison and normalization of a signal derived from the monochrome highs and a signal derived from the rate-of-change of the monochrome lows for producing one or more waveform signatures representative thereof; with signature evaluation means responsive thereto to apply preselected evaluation criteria related to signature shape, amplitude and polarity for effective recognition of said waveform signatures being either characteristic of, compatible with or incompatible with the existence of a ratio of monochrome highs to the rate-of-change of monochrome lows characteristic of a step transition; and mode control means responsive to a control signal output of said mode decision circuit for either (1) time-gating, (2) enabling, or (3) disabling said inferred signal correction means in the first operating mode.

35. Multimode inferred signal correction means according to claim 23, wherein said first operating mode is normally off except when keyed on or enabled; said mode decision circuit includes means responsive to components in the received signals for detecting a signal relationship characteristic of step transitions; and said mode control means comprises circuit means responsive to said mode decision circuit for time-gate enabling the inferred signal correction means in said first mode during substantially only the epoch of said step transitions.

36. Multimode inferred signal correction means according to claim 23, wherein the first mode of operation is normally on except when disabled; said mode decision circuit includes circuit means responsive to components in the received signal for detecting a signal relationship incompatible with the existence of step transitions; and said mode control includes means for disabling inferred signal correction means in said first mode of operation during periods of a signal relationship incompatible with the existence of step transitions.

37. Multimode inferred signal correction means according to claim 23, wherein the second operating mode of the inferred signal correction means is normally off except when enabled; said mode decision means includes circuit means responsive to components in the received signals for detecting signal characteristics compatible with the existence of inferred independent highs; and said mode control means comprises circuit means responsive to said mode decision circuit for enabling inferred signal correction means in said second mode during signal intervals in which signal characteristics compatible with the existence of independent highs are detected.

38. Multimode inferred signal correction means according to claim 23, wherein the second operating mode of the inferred signal correction means is normally on except when disabled; said mode decision circuit includes circuit means responsive to components in the received signal for detecting a signal relationship incompatible with the existence of independent highs; and said mode control circuit comprises means for disabling inferred signal correction means in said second mode during periods of a signal relationship incompatible with the existence of independent highs.

39. Multimode inferred signal correction means according to claim 23, wherein said mode decision circuit includes circuit means responsive to components of said monochrome signal for processing a comparison signal derived from the comparison of a signal representative of a high frequency portion of the monochrome signal with a dynamic signal derived from the low frequency portion of said monochrome signal; and evaluation circuit means for determining whether or not said comparison signal has a signal signature compatible or incompatible with the inferred existence of independent highs.

40. Multimode inferred signal correction means according to claim 39, wherein said evaluation circuit includes an amplitude window which produces a second mode enabling control signal when the amplitude of the comparison signal equals or exceeds the threshold of said amplitude window and filter means are provided for rejecting narrow output pulses from the amplitude window having a time duration less than a predetermined minimum.

41. Multimode inferred signal correction means according to claim 39, wherein said comparison signal is generated by comparing an integrated rectified measure of the monochrome highs with an integrated rectified measure of the time rate-of-change of the monochrome lows and an amplitude window responsive to said comparison signal is provided to produce a second mode enabling control signal when the comparison signal exceeds a predetermined threshold level.

42. Inferred signal correction means according to claim 23, wherein the inferred highs correction means is normally operatively enabled in the step highs first mode and disabled in the second mode by said mode control means; and said mode decision circuit includes an independent highs detector for generating a switching control signal $\beta_I$ for automatically enabling the independent highs second mode of operation and disabling the step highs first mode of operation.

43. Inferred signal correction means according to claim 23, wherein the inferred highs correction means is normally operatively disabled in the step highs first mode and enabled in the second mode by said mode control means; and said mode decision circuit includes a step highs detector for generating a switching control signal $\beta_s$ for automatically enabling the step highs first mode of operation and disabling the independent highs second mode of operation.

44. Inferred signal correction means according to claim 23, wherein said mode control means includes separately and independently operable mode enabling and disabling means for each mode of operation; and said mode decision circuit includes an independent highs detector responsive to selected components in said composite signal for generating switching control signals $\beta_I$ and $(1-\beta_I)$ for automatically enabling and disabling the operation of said inferred signal correction means in said first mode; and a step highs detector responsive to selected components in said composite signal for generating switching control signals $\beta_s$ and $(1-\beta_s)$ for automatically enabling and disabling the operation of said inferred signal correction means in said second mode.

45. Inferred signal correction means according to claim 23, wherein said mode decision circuit includes an independent highs detector responsive to selected components in said composite signal for generating complementary switch control signals $\beta_I$ $(1-\beta_I)$; and a step highs detector responsive to selected components in said composite signal for generating complementary switch control signals $\beta_s$ and $(1-\beta_s)$ and said mode control means includes switch means concurrently responsive to switch control signals $(\beta_s)(1-\beta_I)$ to enable and disable said second mode of operation; and switch means concurrently responsive to switch control signals $(\beta_I)(1-\beta_s)$ to enable and disable said first mode of operation.

46. Inferred signal correction means according to claim 23, wherein said multimode inferred highs correction means operates in a first mode to selectively generate inferred step highs correction signals in at least first and second frequency bands $Y_{H1}'$ and $Y_{H2}'$ for each chrominance signal to be corrected, and which operates in a second mode to selectively generate inferred independent highs correction signals in at least first and second frequency bands $Y_{H1}'$ and $Y_{H2}'$ for each chrominance signal to be corrected;
  mode decision means responsive to selected components in the received signals for generating switching control signals $[\beta_s]_1$ and $[\beta_s]_2$ indicating an inferred signal requirement for step highs correction signals generated in band one or two respectively of mode 1;
  second mode decision means responsive to selected components in the received signals for generating switching control signals $[\beta_I]_1$ and $[\beta_I]_2$ indicating an inferred signal requirement for independent highs correction signals generated in band one or two respectively of mode 2; and mode control means responsive to said mode control signals $[\beta_s]_1$, $[\beta_s]_2$, $[\beta_I]_1$, $[\beta_I]_2$ for selectively enabling or disabling the multimode inferred highs correction means in each of the operating mode bands.

47. Mode control signal generator means for use in automatically controlling the operation of a color television multimode inferred highs signal correction means, said mode signal generator comprising:
  an inferred independent highs detector having integrator means responsive to the wideband monochrome signal to produce an output signal $Z_H$ respresentative of an integrated monopolar measure of the monochrome mixed highs;
  circuit means responsive to the low frequency portion of the monochrome signal to produce an output signal $Z_L$ representative of a monopolar measure of the time rate-of-change of the monochrome lows;
  ratio circuit means responsive to said signals $Z_H$ and $Z_L$ to produced an output signal $Z_I$ representative of the signal ratio of $Z_H/Z_L$; and
  switch control generator means responsive to signal $Z_I$ having an operating threshold for producing an independent highs switch control signal $\beta_I$ and $Z_I$ exceeds said operating threshold.

48. Mode control generator means according to claims 47, wherein said switching signal generator includes circuit means for producing a complementary independent highs disabling signal $(1-\beta_I)$.

49. Mode control signal generator means for use in automatically controlling the operation of a color television multimode inferred highs signal correction means, said mode signal generator comprising:
  an inferred highs detector means responsive to the wideband monochrome signal to produce a normalized signal $\rho_{11}$ generally proportional in amplitude to the ratio of a signal representative of the rate-of-change of monochrome high frequency components with respect to a signal representative of the rate-of-change of monochrome low frequency components; non-linear integrator means for producing an output signal representative of an integrated monopolar measure of signal $\rho_{11}$;
  first amplitude window means responsive to said integrated monopolar measure of $\rho_{11}$ for producing a step mode enabling signal $\beta_s$ or an independent mode disabling signal $(1-\beta_I)$ for input measures less than the window threshold; and
  complementary amplitude window means for producing a step highs disabling signal $(1-\beta_s)$ or an independent highs enabling signal $(\beta_I)$ for input measures greater than the complementary window threshold.

50. Mode control signal generator means for use in automatically controlling the operation of a color television multimode inferred signal correction means, said mode signal generator comprising:
  an inferred highs detector means responsive to the wideband monochrome signal to produce a normalized comparison signal $\rho_1$ generally proportional in amplitude to the ratio of a signal representative of monochrome high frequency components with respect to a signal representative of the rate-of-change of monochrome low frequency components;
  non-linear integrator means for producing an output signal representative of an integrated monopolar measure of signal $\rho_1$;
  first amplitude window means responsive to said integrated monopolar measure of $\rho_1$ for producing a step mode enabling signal $\beta_s$ or an independent mode disabling signal $(1-\beta_I)$ for input measures less than the window threshold; and
  complementary amplitude window means for producing a step highs disabling signal $(1-\beta_s)$ or an independent highs enabling signal $(\beta_I)$ for input measures greater than the complementary window threshold.

51. Mode control signal generator means for use in automatically controlling the operation of a color television multimode inferred highs signal correction means, said mode signal generator comprising:
  an inferred highs detector responsive to a selected high frequency portion of the monochrome mixed highs having a first non-linear integrator for producing an output signal representative of an integrated monopolar measure of selected monochrome mixed high frequency components;
  a second non-linear integrator for producing an output signal representative of an integrated monopolar measure of a signal representative of the rate-of-change of monochrome low frequency components;

ratio circuit means for producing a normalized comparison signal proportional to the ratio of the integrated monopolar measure of monochrome mixed highs with respect to the integrated monopolar measure of the rate-of-change of monochrome lows; and amplitude window means having an operating threshold responsive to said comparison signal for producing a step mode disabling signal $(1-\beta_s)$ or an independent mode enabling signal $\beta_I$ for comparison signals having amplitudes at least equal to said operating threshold.

52. Mode control generator means according to claim 51, which further includes threshold means for constraining the amplitude of the signal representative of the rate-of-change of monochrome low frequency components prior to processing by said second non-linear integrator.

53. Mode control generator means according to claim 52, wherein said inferred highs detector further includes a complementary amplitude window responsive to said comparison signal for producing a complementary step mode enabling signal $\beta_s$ or an independent mode disabling signal $(1-\beta_I)$.

54. Mode control signal generator means for use in automatically controlling the operation of a color television multimode inferred highs signal correction means, said mode signal generator comprising:

an inferred step highs detector means responsive to the wideband monochrome signal to produce a normalized comparison signal $\rho_1$ generally proportional in amplitude to the ratio of a signal representative of selected monochrome high frequency components relative to a signal representative of the rate-of-change of monochrome low frequency components;

circuit means for processing said $\rho_1$ comparison signal including a limited range translator and a near matched filter the output of which is supplied to a threshold amplitude window for generating a step timing and enabling signal in response to an incoming signal having a step characteristic waveform.

55. Mode control signal generator means for use in automatically controlling the operation of a color television multimode inferred highs signal correction means, said mode signal generator comprising:

an inferred step highs detector responsive to the wideband monochrome signal to produce a normalized comparison signal $\rho_{11}$ generally proportional in amplitude to the ratio of a signal representative of the rate-of-change of selected monochrome high frequency components with respect to a signal representative of the rate-of-change of monochrome low frequency components;

signature evaluation means for dynamically comparing the waveform shape and amplitude with a reference waveform source to produce a gate trigger signal identifying the inferred incidence of a step transition; and a keyed time gate responsive to said trigger signal for producing an inferred step mode gate enabling control signal [[$\beta_{s11}$]] having a time initiation and time duration substantially time correllated with the epoch of a step transition.

56. Mode control generator means according to claim 55, wherein said mode decision means further includes means responsive to the wideband monochrome signal to produce a second normalized comparison signal $\rho_1$ generally proportional in amplitude to the ratio of a signal representative of selected monochrome high frequency components relative to a signal representative of the rate-of-change of monochrome low frequency components; second signature evaluation means for dynamically comparing the waveform shape and amplitude with a reference waveform source identifying the inferred incidence of a step transition; second keyed gate means responsive to said trigger signal for producing a concurrent confirming inferred step mode gate enabling control signal; and circuit means including an AND gate responsive to said enabling control signals to produce a confirmed step mode decision control signal having a time initiation and time duration substantially correllated with the epoch of a step transition.

57. Mode control signal generator means for use in automatically controlling the operation of a color television multimode inferred highs signal correction means, said mode signal generator comprising:

an inferred highs detector responsive to the wideband monochrome signal to produce a first normalized comparison signal $\rho_{11}$ generally proportional in amplitude to the ratio of a signal representative of the rate-of-change of selected monochrome high frequency components with respect to a signal representative of the rate-of-change of monochrome low frequency components and a second normalized comparison signal $\rho_1$ generally proportional in amplitude to the ratio of a signal representative of selected monochrome high frequency components relative to a signal representative of the rate-of-change of monochrome low frequency components;

first signature evaluation means including an amplitude window responsive to said $\rho_{11}$ comparison signal to produce an inferred independent highs enabling signal $\beta_{I11}$;

second signature evaluation means including an amplitude window responsive to said $\rho_1$ comparison signal to produce a confirmation enabling signal $\beta_{I1}$; and circuit means including an AND gate responsive to said enabling control signals $\beta_{I11}$ and $\beta_{I1}$ to produce a confirmed inferred independent highs mode decision control signal $(\beta_{I11})(\beta_{I1})$.

58. Mode control generator means according to claim 57, which further includes pulse width discriminator means for rejecting narrow pulses produced at the respective outputs of said first and second signature evaluation amplitude windows.

59. Mode control signal generator means for use in automatically controlling the operation of a color television multimode inferred highs signal correction means, said mode signal generator comprising:

an inferred highs detector responsive to the wideband monochrome signal to produce a first normalized comparison signal $\rho_{11}$ generally proportional in amplitude to the ratio of a signal representative of the rate-of-change of selected monochrome high frequency components with respect to a signal representative of the rate-of-change of monochrome low frequency components and a second normalized comparison signal $\rho_1$ generally proportional in amplitude to the ratio of a signal representative of selected monochrome high frequency components relative to a signal representative of the rate-of-change of monochrome low frequency components;

first signature evaluation means including an amplitude window responsive to said $\rho_{11}$ comparison signal to produce an inferred step highs disabling signal $(1-\beta_{s11})$;

second signature evaluation means including an amplitude window responsive to said $\rho_1$ comparison signal to produce a confirmation disabling signal, $(1-\beta_{s1})$; and circuit means including an AND gate responsive to said disabling control signals $(1-\beta_{s11})$ and $(1-\beta_{s1})$ to produce a confirmed inferred step highs mode decision control signal $(1-\beta_{s11})(1-\beta_{s1})$.

60. Mode control signal generator means for use in automatically controlling the operation of a color television multimode inferred highs signal correction means, said mode signal generator comprising:

an inferred highs detector responsive to the wideband monochrome signal to produce a first normalized comparison signal $\rho_{11}$ generally proportional in amplitude to the ratio of a signal representative of the rate-of-change of selected monochrome high frequency components with respect to a signal representative of the rate-of-change of monochrome low frequency components and a second normalized comparison signal $\rho_1$ generally proportional in amplitude to the ratio of a signal representative of selected monochrome high frequency components relative to a signal representative of the rate-of-change of monochrome low frequency components;

first amplitude window means responsive to said $\rho_{11}$ signal to produce a first inferred step transition trigger signal;

second amplitude window means responsive to said $\rho_1$ signal to produce a second inferred step transition trigger signal;

circuit means including an AND gate responsive to said first and second step transition trigger signals to produce a confirmed step transition trigger signal;

first reference generator means operatively controlled by said confirmed step transition trigger signal for generating a $\rho_{11}$ comparison reference signal;

second reference generator means operatively controlled by said confirmed step transition trigger signal for generating a $\rho_1$ comparison reference signal;

first comparator means for comparing said $\rho_{11}$ signal with said $\rho_{11}$ comparison reference signal to generate a first comparator gate trigger signal;

second comparator means for comparing signal $\rho_1$ with said $\rho_1$ comparison reference signal to generate a second comparator gate trigger signal;

concurrence detector means responsive to said first and second comparator gate trigger signals to produce a concurrence gate control signal; and confirmation gate means responsive to said concurrence gate control signal and said confirmed step transition trigger signal to produce a verified inferred step enabling pulse.

61. Mode control signal generator means for use in automatically controlling the operation of a color television multimode inferred highs signal correction means, said mode signal generator comprising:

an inferred independent highs detector having a non-linear matrix for combining signals representative of the respective chrominance signals to produce a color space contour control signal; and non-linear translator means responsive to said contour control signal to produce an independent mode control signal for enabling or disabling an inferred independent highs operating mode.

62. Mode control signal generator means for use in automatically controlling the operation of a color television multimode inferred highs signal correction means, said mode signal generator comprising:

an inferred step highs detector having a non-linear matrix for combining signals representative of the rate-of-change of the respective chrominance signals to produce a color rate contour control signal; and non-linear translator means responsive to said color rate contour control signal to produce a step mode control signal for enabling or disabling an inferred step highs operating mode.

63. Mode control signal generator means for use in automatically controlling the operation of a color television multimode inferred highs signal correction means, said mode signal generator comprising:

an inferred step highs detector means responsive to selected components of said wideband monochrome signal to generate a step mode enabling signal $\beta_S$;

non-linear matrix means for combining signals representative of the rate-of-change of the respective chrominance signals to produce a color rate contour control signal;

non-linear translator means responsive to said color rate contour control signal to produce a step mode control signal $\beta_{SC}$; and concurrence detector means responsive to said $\beta_S$ and $\beta_{SC}$ control signals to produce an inferred step highs enabling signal $[\beta_S](\beta_{SC})$.

64. Mode control signal generator means for use in automatically controlling the operation of a color television multimode inferred highs signal correction means, said mode signal generator comprising:

an inferred independent highs detector means responsive to selected components of said wideband monochrome signal to generate an independent mode enabling signal $\beta_I$;

non-linear matrix means for combining signals representative of the respective chrominance signals to produce a color contour control signal;

non-linear translator means responsive to said color contour signal to produce an independent mode control signal $\beta_{IC}$; and concurrence detector means responsive to said $\beta_I$ and $\beta_{IC}$ control signals to produce an inferred independent highs enabling signal $[\beta_I](\beta_{IC})$.

65. In a color television system utilizing a composite color television signal including a wide bandwidth monochrome video signal and a pluralitu of narrow bandwidth chrominance signals relatively limited to low frequencies so as to produce undesired image display distortions and deficient high frequency color response, multimode inferred signal correction means comprising:

circuit means responsive to said wide bandwidth monochrome signal for processing for each chrominance signal to be corrected a low frequency monochrome signal component having a bandwidth substantially comparable to that of the chrominance signal to be corrected, and a high frequency monochrome signal component having a bandwidth substantially complementary to that of said low frequency monochrome component;

circuit means for effectively separating the complementary high frequency monochrome component into a first component portion inferred to be attributable to step highs and a second component portion attributable to independent highs;

inferred step highs correction circuit means for each chrominance signal to be corrected, said means being responsive to plural signal components including said first portion of the high frequency monochrome component attributable to step highs to generate in a first operating mode inferred step highs correction signals;

inferred independent highs correction circuit means for each chrominance signal to be corrected, said means being responsive to plural signal components including said second portion of the high frequency monochrome component to generate in a second operating mode inferred independent highs correction signals; and means for effectively combining said inferred correction signals with the signals to be displayed.

66. Inferred signal correction means according to claim 65, which further include circuit means responsive to selected components of said composite signal for detecting the presence of color step transitions and producing an output signal representative of high frequency components in the complementary high frequency monochrome signal that are inferred to be attributable to step highs; circuit means for removing the inferred components attributable to step highs from the band of components in said complementary high frequency monochrome signal to produce a remainder second portion of signal components attributable to independent highs.

67. Inferred signal correction means according to claim 65, which further include circuit means responsive to selected components of said composite signal to produce a step transition timing control signal; circuit means responsive to said step transition control signal for generating reconstituted alternating bipolar pulses corresponding in waveform, amplitude and polarity to a signal representative of the ratio of selected monochrome mixed highs divided by a signal representative of the rate-of-change of monochrome lows; circuit means for multiplying said reconstituted alternating bipolar pulses with a signal derived from the monochrome signal which is representative of the rate-of-change of monochrome lows to produce an output signal representative of said monochrome high frequency components inferred to be attributable to step highs.

68. Inferred signal correction means in accordance with claim 65, wherein said inferred step highs correction circuit generates for each chrominance signal to be corrected reconstituted alternating bi-polar pulses which are proportional in instantaneous value to the product of a first signal representative of a selected high frequency portion of said monochrome signal, a second signal representative of the time rate-of-change of the chrominance signal being corrected and the inverse of a third signal representative of a low frequency portion of said monochrome signal.

69. Inferred signal correction means according to claim 65, which further includes mode decision means responsive to a plurality of selected components in said composite signal for producing one of more mode control signals indicating an inferred need for inferred highs correction in either of said first or second modes of operation; and mode control means operatively responsive to said mode control signals for either enabling or disabling the operation of said inferred highs correction circuit in said first and second modes.

70. Multimode inferred signal correction means according to claim 69, wherein said mode decision circuit includes means for producing a mode control signal in response to components in the received signal that are characteristic of the existence of a step transition; and mode control circuit means responsive to said mode control signal for time gate enabling the first mode of operation.

71. Multimode inferred signal correction means according to claim 69, wherein said mode decision circuit includes means for producing a mode control signal in response to components in the received signal that are compatible with the existence of a step transition; and said mode control circuit means are responsive to said mode control signal for effectively enabling the correction means in said first operating mode.

72. Multimode inferred signal correction means according to claim 69, wherein said mode decision circuit includes means for producing a mode control signal in response to components in the received signals that are incompatible with the dominant existence of a step transition; and said mode control circuit means is responsive to said mode control signal for effectively disabling the correction means in said first operating mode.

73. Multimode inferred signal correction means according to claim 65, wherein said correction circuit includes means for maintaining substantial fidelity of the monochrome components of pictures displayed from the multimode corrected signals with respect to the received monochrome signal.

74. Multimode inferred signal correction means according to claim 65, wherein said correction circuit includes means for maintaining substantial fidelity of the monochrome components of pictures displayed from the multimode corrected signals with respect to the received monochrome mixed highs.

75. Multimode inferred signal correction means according to claim 65, wherein said correction means includes means for maintaining substantial fidelity of the monochrome components of pictures displayed from the multimode corrected signals with respect to the low frequency portion of the received monochrome signal.

76. Multimode inferred signal correction means according to claim 65, which includes bandlimiting means for reducing the bandwidth of at least one of said chrominance signals to effectively reduce unwanted monochrome to color cross-talk.

77. Multimode inferred signal correction means according to claim 65, wherein the inferred independent high frequency correction signals generated substantially restore the amplitude of high frequency signal components in image areas having intensity modulated colors.

78. Multimode inferred signal correction means according to claim 65, wherein the inferred independent high frequency correction signals generated in said second mode cause the net color highs for any primary to approach zero value when the color lows for that primary approach zero value.

79. Multimode inferred signal correction means according to claim 69, wherein said mode decision circuit includes means for signal comparison and normalization of a signal derived from the monochrome highs and a signal derived from the rate-of-change of the monochrome lows for producing one or more waveform signatures representative thereof; with signature evaluation means responsive thereto to apply preselected evaluation criteria related to signature shape, amplitude and polarity for effective recognition of said waveform signatures being either characteristic of, compatible with or incompatible with the existence of a ratio of monochrome highs to the rate-of-change of monochrome lows characteristic of a step transition; and mode control means responsive to a control signal output of said mode decision circuit for either (1) time-gating, (2) enabling, or (3) disabling said inferred signal correction means in the first operating mode.

80. Multimode inferred signal correction means according to claim 69, wherein said first operating mode is normally off except when keyed on or enabled; said mode decision circuit includes means responsive to components in the received signals for detecting a signal relationship characteristic of step transitions; and said mode control means comprises circuit means responsive to said mode decision circuit for time-gate enabling the inferred signal correction means in said first mode during substantially only the epoch of said step transitions.

81. Multimode inferred signal correction means according to claim 69, wherein the first mode of operation is normally on except when disabled; said mode decision circuit includes circuit means responsive to components in the received signal for detecting a signal relationship incompatible with the existence of step transitions; and said mode control includes means for disabling inferred signal correction means in said first mode of operation during periods of a signal relationship incompatible with the existence of step transitions.

82. Multimode inferred signal correction means according to claim 69, wherein the second operating mode of the inferred signal correction means is normally off except when enabled; said mode decision means includes circuit means responsive to components in the received signals for detecting signal characteristics compatible with the existence of inferred independent highs; and said mode control means comprises circuit means responsive to said mode decision circuit for enabling inferred signal correction means in said second mode during signal intervals in which signal characteristics compatible with the existence of independent highs are detected.

83. Multimode inferred signal correction means according to claim 69, wherein the second operating mode of the inferred signal correction means is normally on except when disabled; said mode decision circuit includes circuit means responsive to components in the received signal for detecting a signal relationship incompatible with the existence of independent highs; and said mode control circuit comprises means for disabling inferred signal correction means in said second mode during periods of a signal relationship incompatible with the existence of independent highs.

84. Multimode inferred signal correction means according to claim 69, wherein said mode decision circuit includes circuit means responsive to components of said monochrome signal for processing a comparison signal derived from the comparison of a signal representative of a high frequency portion of the monochrome signal with a dynamic signal derived from the low frequency portion of said monochrome signal; and evaluation circuit means for determining whether or not said comparison signal has a signal signature compatible or incompatible with the inferred existence of independent highs.

85. Multimode inferred signal correction means according to claim 84, wherein said evaluation circuit includes an amplitude window which produces a second mode enabling control signal when the amplitude of the comparison signal equals or exceeds the threshold of said amplitude window and filter means are provided for rejecting narrow output pulses from the amplitude window having a time duration less than a predetermined minimum.

86. Multimode inferred signal correction means according to claim 84, wherein said comparison signal is generated by comparing an integrated rectified measure of the monochrome highs with an integrated rectified measure of the time rate-of-change of the monochrome lows and an amplitude window responsive to said comparison signal is provided to produce a second mode enabling control signal when the comparison signal exceeds a predetermined threshold level.

87. A receiving system according to claim 69, wherein said decision circuit includes means for generating a control signal in response to a comparison of at least two quadrature related signal components derived from said monochrome signal.

88. A receiving system acording to claim 69, wherein said decision circuit includes means for generating a control signal in response to a concurrent comparison of at least two quadrature related signal components derived from said monochrome signal.

89. Multimode inferred signal correction means according to claim 39, which further includes means for constraining the respective high and low frequency portions of said monochrome signal which are compared to substantially non-overlapping frequency bands.

90. Multimode inferred signal correction means according to claim 39, which further includes means for constraining the respective high and low frequency portions of said monochrome signal which are compared to partially overlapping frequency bands.

91. Inferred signal correction means according to claim 69, wherein the inferred highs correction means is normally operatively enabled in the step highs first mode and disabled in the second mode by said mode control means; and said mode decision circuit includes an independent highs detector for generating a switching control signal $\beta_I$ for automatically enabling the independent highs second mode of operation and disabling the step highs first mode of operation.

92. Inferred signal correction means according to claim 69, wherein the inferred highs correction means is normally operatively disabled in the step highs first mode and enabled in the second mode by said mode control means; and said mode decision circuit includes a step highs detector for generating a switching control signal $\beta_s$ for automatically enabling the step highs first mode of operation and disabling the independent highs second mode of operation.

93. Inferred signal correction means according to claim 69, wherein said mode control means includes separately and independently operable mode enabling and disabling means for each mode of operation; and said mode decision circuit includes an independent highs detector responsive to selected components in said composite signal for generating switching control signals $\beta_I$ and $(1-\beta_I)$ for automatically enabling or disabling the operation of said inferred signal correction means in said first mode; and a step highs detector responsive to selected components in said composite signal for generating switching control signals $\beta_s$ and $(1-\beta_s)$ for automatically enabling or disabling the operation of said inferred signal correction means in said second mode.

94. Inferred signal correction means according to claim 69, wherein said mode decision circuit includes an independent highs detector responsive to selected components in said composite signal for generating complementary switch control signals $\beta_I$ and $(1-\beta_I)$; and a step highs detector responsive to selected components in said composite signal for generating complementary switch control signals $\beta_s$ and $(1-\beta_s)$; and said mode control means includes switch means concurrently responsive to switch control signals $(\beta_s)$ $(1-\beta_I)$ to enable and disable said second mode of operation; and switch means concurrently responsive to switch control signals $(\beta_I)$ $(1-\beta_s)$ to enable and disable said first mode of operation.

95. In a television system utilizing a composite color television signal including a wideband monochrome video signal and a plurality of narrow bandwidth chrominance signals relatively limited to low frequencies so as to produce undesired image display distortions and deficient high frequency color response, multimode inferred signal correction means comprising:

receiving circuit means responsive to said composite color television signal for processing therefrom a wideband monochrome signal and a plurality of reduced bandwidth chrominance signals;

multimode inferred highs correction circuit means for effectively supplementing each chrominance signal to be corrected in plural signal-controlled modes of operation providing plural inferred components of correction;

inferred step highs correction circuit means for each chrominance signal to be corrected operative in a first mode to generate one or more inferred step high frequency chrominance components which are generally proportional in instantaneous value to the product of a first signal representative of a selected high frequency portion of said monochrome signal, a second signal representative of the time rate-of-change of the chrominance signal to be corrected and the inverse of a third signal representative of the time rate-of-change of a low frequency portion of said monochrome signal;

inferred independent highs correction circuit means for each chrominance signal to be corrected operative in a second mode to generate one or more inferred independent high frequency components which are generally proportional in value to the product of a first signal representative of a selected high frequency portion of said monochrome signal, a second signal representative of the chrominance signal to be corrected, and the inverse of a third signal representative of a low frequency portion of said monochrome signal;

mode decision means responsive to a plurality of selected components in said composite signal for producing one or more mode control signals indicating an inferred need for inferred high correction in either of said first or second modes of operation; and mode control means operatively responsive to said mode control signal for either enabling or disabling the operation of said inferred highs correction circuit in said first and second modes of operation.

96. Multimode inferred signal correction means according to claim 95, wherein said mode decision circuit includes means for producing a mode control signal in response to components in the received signal that are characteristic of the existence of a step transition; and mode control circuit means responsive to said mode control signal for time gate enabling the first mode of operation.

97. Multimode inferred signal correction means according to claim 95, wherein said mode decision circuit includes means for producing a mode control signal in response to components in the received signal that are compatible with the existence of a step transition; and said mode control circuit means are responsive to said mode control signal for effectively enabling the correction means in said first operating mode.

98. Multimode inferred signal correction means according to claim 95, wherein said mode decision circuit includes means for producing a mode control signal in response to components in the received signals that are incompatible with the dominant existence of a step transition; and said mode control circuit means are responsive to said mode control signal for effectively disabling the correction means in said first operating mode.

99. Multimode inferred signal correction means according to claim 95, wherein said correction circuit includes means for maintaining substantial fidelity of the monochrome components of pictures displayed from the multimode corrected signals with respect to the received monochrome signal.

100. Multimode inferred signal correction means according to claim 95, wherein said correction circuit includes means for maintaining substantial fidelity of the monochrome components of pictures displayed from the multimode corrected signals with respect to the received monochrome mixed highs.

101. Multimode inferred signal correction means according to claim 95, wherein said correction means includes means for maintaining substantial fidelity of the monochrome components of pictures displayed from the multimode corrected signals with respect to the low frequency portion of the received monochrome signal.

102. Multimode inferred signal correction means according to claim 95, wherein said mode decision circuit additionally produces an output control signal in response to excess signal noise and said mode control circuit disables said correction circuit for relative noise levels above a selected value.

103. Multimode inferred signal correction means according to claim 95, which includes bandlimiting means for reducing the bandwidth of at least one of said chrominance signals to effectively reduce unwanted monochrome to color cross-talk.

104. Multimode inferred signal correction means according to claim 95, wherein the inferred independent high frequency correction signals generated substantially restore the amplitude of high frequency signal components in image areas having intensity modulated colors.

105. Multimode inferred signal correction means according to claim 95, wherein the inferred independent high frequency correction signals generated in said second mode cause the net color highs for any primary to approach zero value when the color lows for that primary approach zero value.

106. Multimode inferred signal correction means according to claim 95, wherein said mode decision circuit includes means for signal comparison and normalization of a signal derived from the monochrome highs and a signal derived from the rate-of-change of the monochrome lows for producing one or more waveform signatures representative thereof; with signature evaluation means responsive thereto to apply preselected evaluation criteria related to signature shape, amplitude and polarity for effective recognition of said waveform signatures being either characteristic of, compatible with or incompatible with the existence of a ratio of monochrome highs to the rate-of-change of monochrome lows characteristic of a step transition; and mode control means responsive to a control signal output of said mode decision circuit for either (1) time-gating, (2) enabling, or (3) disabling said inferred signal correction means in the first operating mode.

107. Multimode inferred signal correction means according to claim 95, wherein said first operating mode is normally off except when keyed on or enabled; said mode decision circuit includes means responsive to components in the received signals for detecting a signal relationship characteristic of step transitions; and said mode control means comprises circuit means responsive to said mode decision circuit for time-gate enabling the inferred signal correction means in said first mode during substantially only the epoch of said step transitions.

108. Multimode inferred signal correction means according to claim 95, wherein the first mode of operation is normally on except when disabled; said mode decision circuit includes circuit means responsive to components in the received signal for detecting a signal relationship incompatible with the existence of step transitions; and said mode control includes means for disabling inferred signal correction means in said first mode of operation during periods of a signal relationship incompatible with the existence of step transitions.

109. Multimode inferred signal correction means according to claim 95, wherein the second operating mode of the inferred signal correction means is normally off except when enabled; said mode decision means includes circuit means responsive to components in the received signals for detecting signal characteristics compatible with the existence of inferred independent highs; and said mode control means comprises circuit means responsive to said mode decision circuit for enabling inferred signal correction means in said second mode during signal intervals in which signal characteristics compatible with the existence of independent highs are detected.

110. Multimode inferred signal correction means according to claim 95, wherein the second operating mode of the inferred signal correction means is normally on except when disabled; said mode decision circuit includes circuit means responsive to components in the received signal for detecting a signal relationship incompatible wth the existence of independent highs; and said mode control circuit comprises means for disabling inferred signal correction means in said second mode during periods of a signal relationship incompatible with the existence of independent highs.

111. Multimode inferred signal correction means according to claim 95, wherein said mode decision circuit includes circuit means responsive to components of said monochrome signal for processing a comparison signal derived from the comparison of a signal representative of a high frequency portion of the monochrome signal with a dynamic signal derived from the low frequency portion of said monochrome signal; and evaluation circuit means for determining whether or not said comparison signal has a signal signature compatible or incompatible with the inferred existence of independent highs.

112. Multimode inferred signal correction means according to claim 95, wherein said evaluation circuit includes an amplitude window which produces a second mode enabling control signal when the amplitude of the comparison signal equals or exceeds the threshold of said amplitude window and filter means are provided for rejecting narrow output pulses from the amplitude window having a time duration less than a predetermined minimum.

113. Multimode inferred signal correction means according to claim 95, wherein said comparison signal is generated by comparing an integrated rectified measure of the monochrome highs with an integrated rectified measure of the time rate-of-change of the monochrome lows and an amplitude window responsive to said comparison signal is provided to produce a second mode enabling control signal when the comparison signal exceeds a predetermined threshold value.

114. A receiving system according to claim 95, wherein said decision circuit includes means for generating a control signal in response to a comparison of at least two quadrature related signal components derived from said monochrome signal.

115. A receiving system according to claim 95, wherein said decision circuit includes means for generating a control signal in response to a concurrent comparison of at least two quadrature related signal components derived from said monochrome signal.

116. Inferred signal correction means according to claim 95, wherein the inferred highs correction means is normally operatively enabled in the step highs first mode and disabled in the second mode by said mode control means; and said mode decision circuit includes an independent highs detector for generating a switching control signal $\beta_I$ for automatically enabling the independent highs second mode of operation and disabling the step highs first mode of operation.

117. Inferred signal correction means according to claim 95, wherein the inferred highs correction means is normally operatively disabled in the step highs first mode and enabled in the second mode by said mode control means; and said mode decision circuit includes a step highs detector for generating a switching control signal $\beta_s$ for automatically enabling the step highs first mode of operation and disabling the independent highs second mode of operation.

118. Inferred signal correction means according to claim 95, wherein said mode control means includes separately and independently operable mode enabling and disabling means for each mode of operation; and said mode decision circuit includes an independent highs detector responsive to selected components in said composite signal for generating switching control signals $\beta_I$ and $(1-\beta_I)$ for automatically enabling and disabling the operation of said inferred signal correction means in said first mode; and a step highs detector responsive to selected components in said composite signal for generating switching control signals $\beta_s$ and $(1-\beta_s)$ for automatically enabling and disabling the operation of said inferred signal correction means in said second mode.

119. Inferred signal correction means according to claim 95, wherein said mode decision circuit includes an independent highs detector responsive to selected components in said composite signal for generating complementary switch control signals $\beta_I$ and $(1-\beta_I)$; and a step highs detector responsive to selected components in said composite signal for generating complementary switch control signals $\beta_s$ and $(1-\beta_s)$; and said mode control means includes switch means concurrently responsive to switch control signals $(\beta_s)(1-\beta_I)$ to enable and disable said second mode of operation; and switch means concurrently responsive to switch control signals $(\beta_I)(1-\beta_s)$ to enable and disable said first mode of operation.

120. Inferred signal correction means according to claim 95, wherein said multimode inferred highs correction means operates in a first mode to selectively generate inferred step highs correction signals in at least first and second frequency bands $Y_{H1}'$ and $Y_{H2}'$ for each chrominance signal to be corrected, and which operates in a second mode to selectively generate inferred independent highs correction signals in at least first and second frequency bands $Y_{H1}'$ and $Y_{H2}'$ for each chrominance signal to be corrected;

mode decision means responsive to selected components in the received signals for generating switching control signals $[\beta_s]_1$ and $[\beta_s]_2$ indicating an inferred signal requirement for step highs correction signals generated in band one or two respectively of mode 1;

second mode decision means responsive to selected components in the received signals for generating switching control signals $[\beta_I]_1$ and $[\beta_I]_2$ indicating an inferred signal requirement for independent highs correction signals generated in band one or two respectively of mode 2; said mode control means being responsive to said mode control signals $[\beta_s]_1$, $[\beta_s]_2$, $[\beta_I]_1$, $[\beta_I]_2$ for selectively enabling or disabling the multimode inferred highs correction means in each of the operating mode bands.

121. In a television system utilizing a composite color television signal including a wideband monochrome video signal and a plurality of narrow bandwidth chrominance signals relatively limited to low frequencies so as to produce undesired image display distortions and deficient high frequency color response, multimode inferred signal correction means comprising:

receiving circuit means responsive to said composite color television signal for processing therefrom a wideband monochrome signal and a plurality of reduced bandwidth color signals;

multimode inferred highs correction circuit means for effectively supplementing each color signal to be corrected in plural signal-controlled modes of operation providing plural inferred components of correction;

inferred step highs correction circuit means for each color signal to be corrected operative in a first mode to generate one or more inferred step high frequency color components which are generally proportional in instantaneous value to the product of a first signal representative to a selected high frequency portion of said monochrome signal, a second signal representative to the time rate-of-change of the color signal to be corrected and the inverse of a third signal representative of the time rate-of-change of a low frequency portion of said monochrome signal;

inferred independent highs correction circuit means for each color signal to be corrected operative in a second mode to generate one or more inferred independent high frequency color components which are generally proportional in value to the product of a first signal representative of a selected high frequency portion of said monochrome signal, a second signal representative of the color signal to be corrected, and the inverse of a third signal representative of a low frequency portion of said monochrome signal;

mode decision means responsive to a plurality of selected components in said composite signal for producing one or more mode control signals indicating an inferred need for inferred highs correction in either of said first or second modes of operation; and mode control means operatively responsive to said mode control signals for either enabling or disabling the operation of said inferred highs correction circuit in said first and second modes of operation.

122. Multimode inferred signal correction means according to claim 121, wherein said mode decision circuit includes means for producing a mode control signal in response to components in the received signal that are characteristic of the existence of a step transition; and mode control circuit means responsive to said mode control signal for time gate enabling the first mode of operation.

123. Multimode inferred signal correction means according to claim 121, wherein said mode decision circuit includes means for producing a mode control signal in response to components in the received signal that are compatible with the existence of a step transition; and said mode control circuit means are responsive to said mode control signal for effectively enabling the correction means in said first operating mode.

124. Multimode inferred signal correction means according to claim 121, wherein said mode decision circuit includes means for producing a mode control signal in response to components in the received signals that are incompatible with the dominant existence of a step transition; and said mode control circuit means are responsive to said mode control signal for effectively disabling the correction means in said first operating mode.

125. Multimode inferred signal correction means according to claim 121, wherein said correction circuit includes means for maintaining substantial fidelity of the monochrome components of pictures displayed from the multimode corrected signals with respect to the received monochrome signal.

126. Multimode inferred signal correction means according to claim 121, wherein said correction circuit includes means for maintaining substantial fidelity of the monochrome components of pictures displayed from the multimode corrected signals wih respect to the received monochrome mixed highs.

127. Multimode inferred signal correction means according to claim 121, wherein said correction means includes means for maintaining substantial fidelity of the monochrome components of pictures displayed from the multimode corrected signals with respect to the low frequency portion of the received monochrome signal.

128. Multimode inferred signal correction means according to claim 121, wherein said mode decision circuit additionally produces an output control signal in response to excess signal noise and said mode control circuit disables said correction circuit for relative noise levels above a selected value.

129. Multimode inferred signal correction means according to claim 121, which includes bandlimiting means for reducing the bandwidth of at least one of said chrominance signals to effectively reduce unwanted monochrome to color cross-talk.

130. Multimode inferred signal correction means according to claim 121, wherein the inferred independent high frequency correction signals generated substantially restore the amplitude of high frequency signal components in image areas having intensity modulated colors.

131. Multimode inferred signal correction means according to claim 121, wherein the inferred independent high frequency correction signals generated in said second mode cause the net color highs for any primary to approach zero value when the color lows for that primary approach zero value.

132. Multimode inferred signal correction means according to claim 121, wherein said mode decision circuit includes means for signal comparison and normalization of a signal derived from the monochrome highs and a signal derived from the rate-of-change of the monochrome lows for producing one or more waveform signatures representative thereof; with signature evaluation means responsive thereto to apply preselected evaluation criteria related to signature shape, amplitude and polarity for effective recognition of said waveform signatures being either characteristic of, compatible with or incompatible with the existence of a ratio of monochrome highs to the rate-of-change of monochrome lows characteristic of a step transition; and mode control means responsive to a control signal output of said mode decision circuit for either (1) time-gating, (2) enabling, or (3) disabling said inferred signal correction means in the first operating mode.

133. Multimode inferred signal correction means according to claim 121, wherein said first operating mode is normally off except when keyed on or enabled; said mode decision circuit includes means responsive to components in the received signals for detecting a signal relationship characteristic of step transitions; and said mode control means comprises circuit means responsive to said mode decision circuit for time-gate enabling the inferred signal correction means in said first mode during substantially only the epoch of said step transitions.

134. Multimode inferred signal correction means according to claim 121, wherein the first mode of operation is normally on except when disabled; said mode decision circuit includes circuit means responsive to components in the received signal for detecting a signal relationship incompatible with the existence of step transitions; and said mode control includes means for disabling inferred signal correction means in said first mode of operation during periods of a signal relationship incompatible with the existence of step transitions.

135. Multimode inferred signal correction means according to claim 121, wherein the second operating mode of the inferred signal correction means is normally off except when enabled; said mode decision means includes circuit means responsive to components in the received signals for detecting signal characteristics compatible with the existence of inferred independent highs; and said mode control means comprises circuit means responsive to said mode decision circuit for enabling inferred signal correction means in said second mode during signal intervals in which signal characteristics compatible with the existence of independent highs are detected.

136. Multimode inferred signal correction means according to claim 121, wherein the second operating mode of the inferred signal correction means is normally on except when disabled; said mode decision circuit includes circuit means responsive to components in the received signal for detecting a signal relationship incompatible with the existence of independent highs; and said mode control circuit comprises means for disabling inferred signal correction means in said second mode during periods of a signal relationship incompatible with the existence of independent highs.

137. Multimode inferred signal correction means according to claim 121, wherein said mode decision circuit includes circuit means responsive to components of said monochrome signal for processing a comparison signal derived from the comparison of a signal representative of a high frequency portion of the monochrome signal with a dynamic signal derived from the low frequency portion of said monochrome signal; and evaluation circuit means for determining whether or not said comparison signal has a signal signature compatible or incompatible with the inferred existence of independent highs.

138. Multimode inferred signal correction means according to claim 121, wherein said evaluation circuit includes an amplitude window which produces a second mode enabling control signal when the amplitude of the comparison signal equals or exceeds the threshold of said amplitude window and filter means are provided for rejecting narrow output pulses from the amplitude window having a time duration less than a predetermined minimum.

139. Multimode inferred signal correction means according to claim 121, wherein said comparison signal is generated by comparing an integrated rectified measure of the monochrome highs with an integrated rectified measure of the time rate-of-change of the monochrome lows and an amplitude window responsive to said comparison signal is provided to produce a second mode enabling control signal when the comparison signal exceeds a predetermined threshold level.

140. A receiving system according to claim 121, wherein said decision circuit includes means for generating a control signal in response to a comparison of at least two quadrature related signal components derived from said monochrome signal.

141. A receiving system according to claim 121, wherein said decision circuit includes means for generating a control signal in response to a concurrent comparison of at least two quadrature related signal components derived from said monochrome signal.

142. Inferred signal correction means according to claim 121, wherein the inferred highs correction means is normally operatively enabled in the step highs first mode and disabled in the second mode by said mode control means; and said mode decision circuit includes an independent highs detector for generating a switching control signal $\beta_I$ for automatically enabling the independent highs second mode of operation and disabling the step highs first mode of operation.

143. Inferred signal correction means according to claim 121, wherein the inferred highs correction means is normally operatively disabled in the step highs first mode and enabled in the second mode by said mode control means; and said mode decision circuit includes a step highs detector for generating a switching control signal $\beta_s$ for automatically enabling the step highs first mode of operation and disabling the independent highs second mode of operation.

144. Inferred signal correction means according to claim 121, wherein said mode control means includes separately and independently operable mode enabling and disabling means for each mode of operation; and said mode decision circuit includes an independent highs detector responsive to selected components in said composite signal for generating switching control signals $\beta_I$ and $(1-\beta_I)$ for automatically enabling and disabling the operation of said inferred signal correction means in said first mode; and a step highs detector responsive to selected components in said composite signal for generating switching control signals $\beta_s$ and $(1-\beta_s)$ for automatically enabling and disabling the operation of said inferred signal correction means in said second mode.

145. Inferred signal correction means according to claim 121, wherein said mode decision circuit includes an independent highs detector responsive to selected components in said composite signal for generating complementary switch control signals $\beta_I$ and $(1-\beta_I)$; and a step highs detector responsive to selected components in said composite signal for generating complementary switch control signals $\beta_s$ and $(1-\beta_s)$; and said mode control means includes switch means concurrently responsive to switch control signals $(\beta_s)(1-\beta_I)$ to enable and disable said second mode of operation; and switch means concurrently responsive to switch control signals $(\beta_I)(1-\beta_s)$ to enable and disable said first mode of operation.

146. Inferred signal correction means according to claim 121, wherein said multimode inferred highs correction means operates in a first mode to selectively generate inferred step highs correction signals in at least first and second frequency bands $Y_{H1}'$ and $Y_{H2}'$ for each color signal to be corrected, and which operates in a second mode to selectively generate inferred independent highs correction signals in at least first and second frequency bands $Y_{H1}'$ and $Y_{H2}'$ for each color signal to be corrected;

mode decision means responsive to selected components in the received signals for generating switching control signals $[\beta_s]_1$ and $[\beta_s]_2$ indicating an inferred signal requirement for step highs correction signals generated in band one or two respectively of mode 1;

second mode decision means responsive to selected components in the received signals for generating switching control signals $[\beta_I]_1$ and $[\beta_I]_2$ indicating an inferred signal requirement for independent highs correction signals generated in band one or two respectively of mode 2; said mode control means being responsive to said mode control signals $[\beta_s]_1$, $[\beta_s]_2$, $[\beta_I]_1$, $[\beta_I]_2$ for selectively enabling or disabling the multimode inferred highs correction means in each of the operating mode bands.

147. In a television system utilizing a composite color television signal including a wide bandwidth monochrome video signal and a plurality of narrow bandwidth chrominance signals relatively limited to a low frequencies so as to produce undesired image display distortions and deficient high frequency color response, multimode inferred signal correction means comprising:

receiving circuit means responsive to said composite color television signal for processing therefrom a wideband monochrome signal and a plurality of reduced bandwidth color signals;

multimode inferred highs correction circuit means for effectively supplementing each color signal to be corrected in plural signal-controlled modes of operation providing plural inferred components of correction;

first inferred correction circuit means operative in a first mode for effectively processing for each color signal to be corrected one or more respective inferred step high frequency color components which are proportional in instantaneous value to the product of (1) a signal representative of a selected high frequency portion of said monochrome signal (2) a signal representative of the time rate-of-change of a reduced bandwith color signal to be corrected and (3) the inverse of a signal representative of the time rate-of-change of a low frequency portion of said monochrome signal;

second inferred correction circuit means operative in a second mode for effectively processing for each chrominance signal to be corrected one or more inferred independent high frequency color components wich are proportional in amplitude to the product of (1) a first signal representative of a selected high frequency portion of said monochrome signal, (2) a second signal monotonically representative of at least thhe color lows of the signal to be corrected, the amplitude of said product signal tending towards zero value when said color lows go to zero; and proportioning circuit means effectively responsive to said first and second signals for relatively proportioning the amplitude of the inferred high frequency color components to maintain substantial fidelity of the monochrome components of pictures displayed from corrected signals with respect to the received monochrome mixed highs;

mode decision means responsive to a plurality of selected components in said composite signal for producing one or more mode control signals indicating an inferred need for inferred highs correction in either of said first or second modes of operation; and mode control means operatively responsive to said mode control signals for either enabling or disabling the operation of said inferred highs correction circuit in said first and second modes of operation.

148. Multimode inferred signal correction means according to claim 147, wherein said mode decision circuit includes means for producing a mode control signal in response to components in the received signal that are characteristic of the existence of a step transition; and mode control circuit means responsive to said mode control signal for time gate enabling th first mode of operation.

149. Multimode inferred signal correction means according to claim 147, wherein said mode decision circuit includes means for producing a mode control signal in response to components in the received signal that are compatible with the existence of a step transition; and said mode control circuit means are responsive to said mode control signal for effectively enabling the correction means in said first operating mode.

150. Multimode inferred signal correction means according to claim 147, wherein said mode decision circuit includes means for producing a mode control signal in response to components in the received signals that are incompatible with the dominant existence of a step transition; and said mode control circuit means are responsive to said mode control signal for effectively disabling the correction means in said first operating mode.

151. Multimode inferred signal correction means according to claim 147, wherein said correction circuit includes means for maintaining substantial fidelity of the monochrome components of pictures displayed from the multimode corrected signals with respect to the received monochrome signal.

152. Multimode inferred signal correction means according to claim 147, wherein said correction circuit includes means for maintaining substantial fidelity of the monochrome components of pictures displayed from the multimode corrected signals with respect to the received monochrome mixed highs.

153. Multimode inferred signal correction means according to claim 147, wherein said correction means includes means for maintaining substantial fidelity of the monochrome components of pictures displayed from the multimode corrected signals with respect to the low frequency portion of the received monochrome signal.

154. Multimode inferred signal correction means according to claim 147, wherein said mode decision circuit additionally produces an output control signal in response to excess signal noise and said mode control circuit disables said correction circuit for relative noise levels above a selected value.

155. Multimode inferred signal correction means according to claim 147, which includes bandlimiting means for reducing the bandwidth of at least one of said chrominance signals to effectively reduce unwanted monochrome to color cross-talk.

156. Multimode inferred signal correction means according to claim 147, wherein the inferred independent high frequency correction signals generated substantially restore the amplitude of high frequency signal components in image areas having intensity modulated colors.

157. Multimode inferred signal correction means according to claim 147, wherein the inferred independent high frequency correction signals generated in said second mode cause the net color highs for any primary to approach zero value when the color lows for that primary approach zero value.

158. Multimode inferred signal correction means according to claim 147, wherein said mode decision circuit includes means for signal comparison and normalization of a signal derived from the monochrome highs and a signal derived from the rate-of-change of the monochrome lows for producing one or more waveform signatures representative thereof; with signature evaluation means responsive thereto to apply preselected evaluation criteria related to signature shape, amplitude and polarity for effective recognition of said waveform signatures being either characteristic of, compatible with or incompatible with the existence of a ratio of monochrome highs to the rate-of-change of monochrome lows characteristic of a step transition; and mode control means responsive to a control signal output of said mode decision circuit for either (1) time-gating, (2) enabling, or (3) disabling said inferred signal correction means in the first operating mode.

159. Multimode inferred signal correction means according to claim 147, wherein said first operating mode is normally off except when keyed on or enabled; said mode decision circuit includes means responsive to components in the received signals for detecting a signal relationship characteristic of step transitions; and said mode control means comprises circuit means responsive to said mode decision circuit for time-gate enabling the inferred signal correction means in said first mode during substantially only the epoch of said step transitions.

160. Multimode inferred signal correction means according to claim 147, wherein the first mode of operation is normally on except when disabled; said mode decision circuit includes circuit means responsive to components in the received signal for detecting a signal relationship incompatible with the existence of step transitions; and said mode control includes means for disabling inferred signal correction means in said first mode of operation during periods of a signal relationship incompatible with the existence of step transitions.

161. Multimode inferred signal correction means according to claim 147, wherein th second operating mode of the inferred signal correction means is normally off except when enabled; said mode decision means includes circuit means responsive to components in the received signals for detecting signal characteristics compatible with the existence of inferred independent highs; and said mode control means comprises circuit means responsive to said mode decision circuit for enabling inferred signal correction means in said second mode during signal intervals in which signal characteristics compatible with the existence of independent highs are detected.

162. Multimode inferred signal correction means according to claim 147, wherein the second operating mode of the inferred signal correction means is normally on except when disabled; said mode decision circuit includes circuit means responsive to components in the received signal for detecting a signal relationship incompatible with the existence of independent highs; and said mode control circuit comprises means for disabling inferred signal correction means in said second mode during periods of a signal relationship incompatible with the existence of independent highs.

163. Multimode inferred signal correction means according to claim 147, wherein said mode decision circuit includes circuit means responsive to components of said monochrome signal for processing a comparison signal derived from the comparison of a signal representative of a high frequency portion of the monochrome signal with a dynamic signal derived from the low frequency portion of said monochrome signal; and evaluation circuit means for determining whether or not said comparison signal has a signal signature compatible or incompatible with the inferred existence of independent highs.

164. Multimode inferred signal correction means according to claim 163, which further includes means for constraining the respective high and low frequency portions of said monochrome signal which are compared to substantially non-overlapping frequency bands.

165. Multimode inferred signal correction means according to claim 163, which further includes means for constraining the respective high and low frequency portions of said monochrome signal which are compared to partially overlapping frequency bands.

166. Multimode inferred signal correction means according to claim 147, wherein said evaluation circuit includes an amplitude window which produces a second mode enabling control signal when the amplitude of the comparison signal equals or exceeds the threshold of said amplitude window and filter means are provided for rejecting narrow output pulses from the amplitude window having a time duration less than a predetermined minimum.

167. Multimode inferred signal correction means according to claim 147, wherein said comparison signal is generated by comparing an integrated rectified measure of the monochrome highs with an integrated rectified measure of the time rate-of-change of the monochrome lows and an amplitude window responsive to said comparison signal is provided to produce a second mode enabling control signal when the comparison signal exceeds a predetermined threshold level.

168. A receiving system according to claim 147, wherein said decision circuit includes means for generating a control signal in response to a comparison of at least two quadrature related signal components derived from said monochrome signal.

169. A receiving system according to claim 147, wherein said decision circuit includes means for generating a control signal in response to a concurrent comparison of at least two quadrature related signal components derived from said monochrome signal.

170. Inferred signal correction means according to claim 147, wherein the inferred highs correction means is normally operatively enabled in the step highs first mode and disabled in the second mode by said mode control means; and said mode decision circuit includes an independent highs detector for generating a switching control signal $\beta_I$ for automatically enabling the independent highs second mode of operation and disabling the step highs first mode of operation.

171. Inferred signal correction means according to claim 147, wherein the inferred highs correction means is normally operatively disabled in the step highs first mode and enabled in the second mode by said mode control means; and said mode decision circuit inludes a step highs detector for generating a switching control signal $\beta_s$ for automatically enabling the step highs first mode of operation and disabling the independent highs second mode of operation.

172. Inferred signal correction means according to claim 147, wherein said mode control means includes separately and independently operable mode enabling and disabling means for each mode of operation; and said mode decision circuit includes an independent highs detector responsive to selected components in said composite signal for generating switching control signals $\beta_I$ and $(1-\beta_I)$ for automatically enabling and disabling the operation of said inferred signal correction means in said first mode; and a step highs detector responsive to selected components in said composite signal for generating switching control signals $\beta_s$ and $(1-\beta_s)$ for automatically enabling and disabling the operation of said inferred signal correction means in said second mode.

173. Inferred signal correction means according to claim 147, wherein said mode decision circuit includes an independent highs detector responsive to selected components in said composition signal for generating complementary switch control signals $\beta_I$ and $(1-\beta_I)$; and a step highs detector responsive to selected components in said composite signal for generating complementary switch control signals $\beta_s$ and $(1-\beta_s)$; and said mode control means includes switch means concurrently responsive to switch control signals $(\beta_s)(1-\beta_I)$ to enable and disable said second mode of operation; and switch means concurrently responsive to switch control signals $(\beta_I)(1-\beta_s)$ to enable and disable said first mode of operation.

174. Inferred signal correction means according to claim 147, wherein said multimode inferred highs correction means operates in a first mode to selectively generate inferred step highs correction signals in at least first and second frequency bands $Y_{H1}'$ and $Y'H2'$ for each color signal to be corrected, and which operates in a second mode to selectively generate inferred independent highs correction signals in at least first and second frequency bands $Y_{H1}'$ and $Y_{H2}'$ for each color signal to be corrected;
mode decision means responsive to selected components in the received signals for generating switching control signals $[\beta_s]_1$ and $[\beta_s]_2$ indicating an inferred signal requirement for step highs correction signals generated in band one or two respectively of mode 1;
second mode decision means responsive to selected components in the received signals for generating switching control signals $[\beta_I]_1$ and $[\beta_I]_2$ indicating an inferred signal requirement for independent highs correction signals generated in band one or two respectively of mode 2; said mode control means being responsive to said mode control signals $[\beta_s]_1$, $[\beta_s]_2$, $[\beta_I]_1$, $[\beta_I]_2$ for selectively enabling or disabling the multimode inferred highs correction means in each of the operating mode bands.

175. A television receiving system for receiving a composite NTSC-type signal comprising a wide bandwidth monochrome video signal and I' and Q' subcarrier modulated chrominance signals, wherein the single sideband component of the I' signal can produce undesired cross-talk in the monochrome signal, circuit means for effectively neutralizing said cross-talk comprising:
correction circuit means responsive to said wideband monochrome signal and to said I' chrominance signal for effectively processing an inferred cross-talk component proportional to the product of a first signal representative of a high frequency portion of the monochrome signal containing undesired cross-talk; a second signal representative of the rate-of-change of a low frequency portion of the I' chrominance signal; and the inverse of a third signal representative of the rate-of-change of a low frequency portion of the monochrome signal;
means for modulating a derived reference chrominance subcarrier with said corrective inferred cross-talk component to effectively produce a phase inverted single sideband cross-talk neutralization signal; and
circuit means for combining said inferred cross-talk neutralization signal with the wideband monochrome signal to effectively neutralize cross-talk in signal regions adjacent chrominance step transitions.

176. In a television system utilizing a composite color television signal including a wideband monochrome video signal and a plurality of narrow bandwidth chrominance signals relatively limited to low frequencies so as to produce undesired image display distortions and deficient high frequency color response, multimode multiband inferred signal correction means comprising:

receiving circuit means responsive to said composite color television signal for processing therefrom a wideband monochrome signal and a plurality of reduced bandwidth chrominance signals;

multimode inferred highs correction circuit means for effectively supplementing each chrominance signal to be corrected in at least two signal-controlled modes of operation providing at least two frequency bands of inferred components of correction in each mode;

inferred step highs correction means for each chrominance signal to be corrected operative in a first mode and first band to generate an inferred step high frequency chrominance component generally proportional in instantaneous value to the product of (1) a signal representative of a first high frequency portion $Y_{H1}'$ of said monochrome signal and (2) a scaling factor; and which in a second operating band are generally proportional in instantaneous value to the product of (1) a signal representative of a second high frequency portion $Y_{H2}'$ of said monochrome signal and (2) a scaling factor; said scaling factor in each band being generally proportional to the product of a signal representative of the time rate-of-change of the chrominance signal being corrected and the inverse of a signal representative of the time rate-of-change of a low frequency portion of said monochrome signal;

inferred independent highs correction means for each chrominance signal to be corrected operative in a second mode and first band to generate an inferred independent high frequency chrominance component which generally proportional in value to the product of (1) a signal representative of a first high frequency portion of $Y_{H1}'$ of said monochrome signal and (2) a scaling factor; and which operating in a second band are generally proportional in value to the product of (1) a signal representative of a second high frequency portion $Y_{H2}'$ of said monochrome signal and (2) a scaling factor; said scaling factor in each band being generally proportional to the product of a signal representative of the chrominance signal being corrected and the inverse of a signal representative of a low frequency portion of said monochrome signal;

mode decision means responsive to a plurality of selected components in said composite signal for producing one or more mode control signals indicating an inferred need for inferred highs correction in each band of said first or second modes of operation; and mode control means operatively responsive to said mode control signals for either enabling or disabling the operation of said inferred highs correction circuit in each operating band of said first and second modes of operation.

177. Inferred signal correction means according to claim 176, wherein said mode decision means includes first inferred step detector means responsive to component portions of said composite signal including the monochrome high frequency portion $Y_{H1}'$ to produce a first band first mode control signal $[\beta_s]_1$; second inferred step detector means responsive to component portions of said composite signal including the monochrome high frequency portion $Y_{H2}'$ to produce a second band first mode control signal $[\beta_s]_2$; and said mode control means includes separate switch control means responsive to mode control signals $[\beta_s]_1$ and $[\beta_s]_2$ to control the operation of said inferred signal correction means in the respective first and second bands of said first mode.

178. Inferred signal correction means according to claim 176, wherein said mode decision means includes first inferred step detector means responsive to component portions of said composite signal including the monochrome high frequency portion $Y_{H1}'$ to produce a first band first mode step transition gating signal $[[\beta_s]]_1$; second inferred step detector means responsive to component portions of said composite signal including the high frequency portion $Y_{H2}'$ to produce a second band first mode step transition gating signal $[[\beta_s]]_2$; and said mode control means includes separate gate control means responsive to gating signals $[[\beta_s]]_1$ and $[[\beta]]_2$ to gate enable the inferred signal correction means in the respective first and second bands of said first mode.

179. Inferred signal correction means according to claim 176, wherein said mode decision means includes first inferred independent high detector means responsive to component portions of said composite signal including the monochrome high frequency portion $Y_{H1}'$ to produce a first band second mode control signal $[\beta_I]_1$; second inferred independent highs detector means responsive to component portions of said composite signal including the monochrome high frequency portion $Y_{H2}'$ to produce a second band second mode control signal $[\beta_I]_2$; and said mode control means includes separate switch control means responsive to mode control signals $[\beta_I]_1$ and $[\beta_I]_2$ to control the operation of said inferred signal correction means in the respective first and second bands.

180. Inferred signal correction means according to claim 176, wherein said correction circuit includes means for maintaining substantial fidelity of the monochrome components of pictures displayed from the multimode corrected signals with respect to the received monochrome signal.

181. Inferred signal correction means according to claim 176, wherein said correction circuit includes means for maintaining substantial fidelity of the monochrome components of pictures displayed from the multimode corrected signals with respect to the received monochrome mixed highs.

182. Inferred signal correction means according to claim 176, wherein said correction means includes means for maintaining substantial fidelity of the monochrome components of pictures displayed from the multimode corrected signals with respect to the low frequency portion of the received monochrome signal.

183. Multimode inferred signal correction means according to claim 176, which includes bandlimiting means for reducing the bandwidth of at least one of said chrominance signals to effectively reduce unwanted monochrome to color cross-talk.

184. Multimode inferred signal correction means according to claim 176, wherein the inferred independent high frequency correction signals generated substantially restore the amplitude of high frequency signal components in image areas having intensity modulated colors.

185. Multimode inferred signal correction means according to claim 176, wherein the inferred independent high frequency correction signals generated in said second mode cause the net color highs for any primary to approach zero value when the color lows for that primary approach zero value.

186. Multimode inferred signal correction means according to claim 23, which includes a waveform generator operatively controlled by said mode control means to selectively generate one or more inferred highs correction signals in said first and second modes for each chrominance signal to be corrected.

187. Inferred signal correction means in accordance with claims 186, wherein said waveform generator includes an inferred step highs generator for producing reconstituted alternating bipolar pulses which are proportional in instantaneous value to the product of a first signal representative of a selected high frequency portion of said monochrome signal, a second signal representative of the time rate-of-change of the chrominance signal being corrected and the inverse of a third signal representative of a low frequency portion of said monochrome signal; and said mode decision circuit includes step transition detector means responsive to selected components of said composite signal to produce a step transition timing control signal for time enabling said step highs generator.

188. Inferred signal correction means according to claim 187, which further includes gate means operatively responsive to said step transition timing control signal to time constrain the duration of the corrective alternating bipolar pulses to time intervals corresponding to those of incoming color step transitions.

189. In a color television system utilizing a composite color television signal including a wide bandwidth monochrome video signal and a plurality of narrow bandwidth chrominance signals relatively limited to low frequencies so as to produce undesired image display distortions, inferred signal correction means comprising:
receiving circuit means responsive to said composite color television signal for processing therefrom a wideband monochrome signal and a plurality of reduced bandwidth chrominance signals;
waveform generator means responsive to a time keying control signal for generating reconstituted alternating bipolar pulses which are proportional in instantaneous value to the product of a (1) first signal representative of a selected high frequency portion of said monochrome signal, (2) a second signal representative of the time rate-of-change of the chrominance signal being corrected and (3) the inverse of a third signal representative of the time rate-of-change of a low frequency portion of said monochrome signal; and
step transition detector means responsive to selected components of said composite signal to produce a time keying control signal for controlling the operation of said waveform generator in response to inferred signal correction requirements.

190. Inferred signal correction means in accordance with claim 189, wherein said step transition detector includes means for comparing the relative amplitudes of a signal representative of a high frequency portion of the monochrome signal with a signal derived from a low frequency portion of the monochrome signal.

191. Inferred signal correction means in accordance with claim 189, wherein said step transition detector includes means for comparing the relative amplitudes of a signal representative of said selected high frequency portion of the monochrome signal with the time rate-of-change of a signal representative of a low frequency portion of the monochrome signal.

192. In a television system utilizing a composite NTSC-type color television signal, discriminator means for detecting the inferred need for inferred step highs and inferred independent highs chrominance correction signals, said means comprising:
circuit means for signal comparison and normalization of a signal derived from selected monochrome highs and a signal derived from the rate-of-change of monochrome lows for producing one or more representative waveform signatures;
means for comparing said waveform signature to preselected waveform reference criteria to produce an output inferred step highs indicator control signal for waveform comparisons compatible with or characteristic of color step transitions;
circuit means for processing an independent highs signature signal derived from a comparison of a signal representative of a selected high frequency portion of the monochrome signal with a dynamic signal derived from the low frequency portion of said monochrome signal; and
evaluation circuit means for comparing said independent highs signature signal with preselected reference criteria to produce an output independent highs indicator control signal for signature signal comparisons compatible with the inferred existence of independent highs.

193. Multimode inferred signal correction means according to claim 163, which further includes means for constraining the respective high and low frequency portions of said monochrome signal which are compared to complementary frequency bands with the low frequency portion having a bandwidth comparable to that of the color signal to be corrected.

194. Multimode inferred signal correction means according to claim 39, which further includes means for constraining the respective high and low frequency portions of said monochrome signal which are compared to complementary frequency bands with the low frequency portion having a bandwidth comparable to that of the chrominance signal to be controlled.

* * * * *